(12) United States Patent
Kadono et al.

(10) Patent No.: US 10,831,025 B2
(45) Date of Patent: Nov. 10, 2020

(54) DIMMING DEVICE, IMAGE DISPLAY DEVICE, AND DISPLAY DEVICE

(71) Applicant: SONY CORPORATION, Tokyo (JP)

(72) Inventors: Koji Kadono, Kanagawa (JP); Akio Machida, Kanagawa (JP); Ryosuke Sawano, Aichi (JP)

(73) Assignee: Sony Corporation, Toyko (JP)

( * ) Notice: Subject to any disclaimer, the term of this patent is extended or adjusted under 35 U.S.C. 154(b) by 15 days.

(21) Appl. No.: 16/315,080

(22) PCT Filed: May 19, 2017

(86) PCT No.: PCT/JP2017/018828
§ 371 (c)(1),
(2) Date: Jan. 3, 2019

(87) PCT Pub. No.: WO2018/012108
PCT Pub. Date: Jan. 18, 2018

(65) Prior Publication Data
US 2019/0227309 A1 Jul. 25, 2019

(30) Foreign Application Priority Data

Jul. 12, 2016 (JP) .................................. 2016-137798

(51) Int. Cl.
G02B 27/01 (2006.01)
G02F 1/157 (2006.01)
(Continued)

(52) U.S. Cl.
CPC ......... G02B 27/0101 (2013.01); G02B 27/02 (2013.01); G02F 1/1336 (2013.01);
(Continued)

(58) Field of Classification Search
CPC ..................................................... G02B 27/01
See application file for complete search history.

(56) References Cited

U.S. PATENT DOCUMENTS

| 6,927,765 | B1 * | 8/2005 | Masazumi | G09G 3/36 345/204 |
| 2006/0077145 | A1 * | 4/2006 | Floyd | B81C 1/00269 345/85 |

(Continued)

FOREIGN PATENT DOCUMENTS

| JP | S61-018925 | 1/1986 |
| JP | S62-100732 | 5/1987 |

(Continued)

OTHER PUBLICATIONS

International Search Report prepared by the Japan Patent Office dated Jul. 31, 2017, for International Application No. PCT/JP2017/018828.

Primary Examiner — Roy P Rabindranath
(74) Attorney, Agent, or Firm — Sheridan Ross P.C.

(57) ABSTRACT

An image display device includes: an image forming device; an optical device having a virtual image forming region where a virtual image is formed on the basis of light emitted from the image forming device; and a dimming device for adjusting the amount of external light incident from the outside, disposed so as to face the virtual image forming region and to be away from the optical device. The dimming device includes: a transparent protective substrate on which external light is incident; a dimming layer formed on a surface of the protective substrate facing the optical device; and a moisture-retaining layer formed on the dimming layer.

20 Claims, 28 Drawing Sheets

(51) Int. Cl.
  *G02F 1/153* (2006.01)
  *H04N 5/64* (2006.01)
  *G02B 27/02* (2006.01)
  *G02F 1/13357* (2006.01)
  *G02F 1/1362* (2006.01)
  *G02F 1/15* (2019.01)
  *G09G 3/36* (2006.01)
  *G02B 26/10* (2006.01)

(52) U.S. Cl.
  CPC ............. *G02F 1/1362* (2013.01); *G02F 1/15* (2013.01); *G02F 1/153* (2013.01); *G02F 1/157* (2013.01); *G09G 3/36* (2013.01); *H04N 5/64* (2013.01); *G02B 26/10* (2013.01); *G02B 2027/0118* (2013.01); *G02F 2001/133601* (2013.01); *G02F 2001/1536* (2013.01)

(56) References Cited

U.S. PATENT DOCUMENTS

| | | | |
|---|---|---|---|
| 2009/0202747 A1* | 8/2009 | Yukinobu | H01B 1/20 428/1.1 |
| 2009/0251644 A1 | 10/2009 | Park et al. | |
| 2012/0092313 A1* | 4/2012 | Choi | H01L 27/3276 345/206 |
| 2013/0140347 A1 | 6/2013 | Friedl et al. | |
| 2015/0169111 A1* | 6/2015 | Hashimoto | G06F 3/044 345/174 |
| 2015/0192835 A1* | 7/2015 | Kim | G09G 3/3208 345/589 |
| 2015/0317007 A1* | 11/2015 | Yanagawa | G06F 1/1652 463/37 |
| 2015/0355521 A1* | 12/2015 | Alton | G02F 1/172 250/214 AL |
| 2015/0370075 A1* | 12/2015 | Ato | G02B 27/017 359/240 |
| 2016/0005375 A1* | 1/2016 | Naijo | G09G 3/38 345/690 |

FOREIGN PATENT DOCUMENTS

| | | |
|---|---|---|
| JP | 2004-309717 | 11/2004 |
| JP | 2007-047253 | 2/2007 |
| JP | 2007-101947 | 4/2007 |
| JP | 2009-302029 | 12/2009 |
| JP | 2009-545767 | 12/2009 |
| JP | 2012-042814 | 3/2012 |
| JP | 2012-252091 | 12/2012 |
| JP | 2014-160169 | 9/2014 |
| WO | WO 2011/083734 | 7/2011 |
| WO | WO 2016/104279 | 6/2016 |

* cited by examiner

DIMMING DEVICE, IMAGE DISPLAY DEVICE, AND DISPLAY DEVICE

CROSS REFERENCE TO RELATED APPLICATIONS

This application is a national stage application under 35 U.S.C. 371 and claims the benefit of PCT Application No. PCT/JP2017/018828 having an international filing date of 19 May 2017, which designated the United States, which PCT application claimed the benefit of Japanese Patent Application No. 2016-137798 filed 12 Jul. 2016, the entire disclosures of each of which are incorporated herein by reference.

TECHNICAL FIELD

The present disclosure relates to a dimming device, an image display device including the dimming device, and a display device including the image display device, and more specifically relates to a display device used for a head mounted display (HMD).

BACKGROUND ART

In recent years, augmented reality (AR) technology that synthesizes and presents a virtual object and various kinds of information in a form of electronic information to a real environment (or a part thereof) as additional information has attracted attention. In order to achieve the augmented reality technology, for example, a head mounted display has been studied as a device for presenting visual information. In addition, as an application field, work support in a real environment has been expected, and examples thereof include provision of road guidance information and provision of technical information to an engineer who performs maintenance or the like, for example. Particularly, a head mounted display is very convenient because of not occupying hands. Furthermore, even in a case where a person wants to enjoy videos and images while moving outdoors, the person can capture videos, images, and an external environment at the same time in the field of view. Therefore, the person can move smoothly.

A virtual image display device (display device) for causing an observer to observe a two-dimensional image formed by an image forming device as an enlarged virtual image by a virtual image optical system is well known. In addition, by forming a virtual image based on a two-dimensional image in the display device, an observer can view the formed virtual image superimposed on an image of an outside world. By the way, in a case where an environment around the display device is very bright or depending on contents of the formed virtual image, a sufficient contrast cannot be imparted to a virtual image observed by an observer disadvantageously. Therefore, a means for solving such a problem, that is, a virtual image display device (display device) including a dimming device is well known from, for example, Japanese Patent Application Laid-Open No. 2012-252091.

However, in a case where a dimming layer constituting a dimming device is constituted by an electrochromic material and light transmittance is changed by applying a color change of a substance generated by a redox reaction of the electrochromic material, if moisture disappears in the dimming layer, a phenomenon that a color change does not occur in the dimming layer occurs.

Claim 1 of Japanese Patent Application Laid-Open No. 2007-101947 discloses a transmission type electrochromic element obtained by sequentially laminating a first transparent conductive film, a porous electron-leaking solid electrolyte film, an electron-leaking electrochromic film, and a second transparent conductive film on a transparent substrate and sticking a transparent sealing substrate onto the second transparent conductive film via a transparent sealing material. In addition, furthermore, the sealing material is a hygroscopic sealing material, the thickness of the sealing material is 50 µm or more, and preferably 50 to 500 µm (refer to claim 6 of Japanese Patent Application Laid-Open No. 2007-101947), and the hygroscopic sealing material is any one of an epoxy resin, PVA, and PVB (refer to claim 7 of Japanese Patent Application Laid-Open No. 2007-101947).

CITATION LIST

Patent Document

Patent Document 1: Japanese Patent Application Laid-Open No. 2012-252091
Patent Document 2: Japanese Patent Application Laid-Open No. 2007-101947

SUMMARY OF THE INVENTION

Problems to be Solved by the Invention

In the technology disclosed in Japanese Patent Application Laid-Open No. 2007-101947, the sealing material can internally hold $H_2O$, $H^+$, and $OH^-$. As a result, a part of $O_2$ gas or $H_2$ gas generated from the solid electrolyte film by coloring/decoloring of the electrochromic element passes through the electrochromic film and the transparent conductive film or a reflective film/electrode film and are taken into $H_2O$ in the sealing material that internally holds $H_2O$, $H^+$, and $OH^-$. Therefore, it is considered that $O_2$ gas or $H_2$ gas generated from the solid electrolyte film is hardly accumulated at an interface between the solid electrolyte film and the electrochromic film, and film peeling at the interface between the solid electrolyte film and the electrochromic film hardly occurs. However, the sealing material disclosed in Japanese Patent Laid-Open No. 2007-101947 merely takes in a part of $O_2$ gas or $H_2$ gas generated in the electrochromic element. Japanese Patent Application Laid-Open No. 2007-101947 does not mention any means for suppressing occurrence of a phenomenon that a color change does not occur in the electrochromic element when moisture disappears in the electrochromic element.

Therefore, an object of the present disclosure is to provide a dimming device having a configuration and structure capable of suppressing occurrence of a phenomenon that a color change does not occur in a dimming layer when moisture disappears inside a dimming layer, an image display device including the dimming device, and a display device including the image display device.

Solutions to Problems

An image display device of the present disclosure for achieving the above object includes:
(a) an image forming device;
(b) an optical device having a virtual image forming region where a virtual image is formed on the basis of light emitted from the image forming device; and (c) a dimming device for adjusting the amount of external light incident from the outside, disposed so as to face the virtual image forming region and to be away from the optical device.

The dimming device includes:

(c-1) a transparent protective substrate on which external light is incident;

(c-2) a dimming layer formed on a surface of the protective substrate facing the optical device; and (c-3) a moisture-retaining layer formed on the dimming layer.

A display device of the present disclosure for achieving the above object includes:

(A) a frame to be mounted on a head of an observer; and (B) an image display device attached to the frame.

The image display device includes:

(a) an image forming device;

(b) an optical device having a virtual image forming region where a virtual image is formed on the basis of light emitted from the image forming device; and (c) a dimming device for adjusting the amount of external light incident from the outside, disposed so as to face the virtual image forming region and to be away from the optical device.

The dimming device includes:

(c-1) a transparent protective substrate on which external light is incident;

(c-2) a dimming layer formed on a surface of the protective substrate facing the optical device; and (c-3) a moisture-retaining layer formed on the dimming layer.

A dimming device of the present disclosure for achieving the above object includes:

a transparent protective substrate on which external light is incident;

a dimming layer formed on the protective substrate;

a moisture-retaining layer formed on the dimming layer; and a water vapor transmissive transparent substrate disposed on or above the moisture-retaining layer.

Effects of the Invention

Each of the dimming device, the image display device, and the display device of the present disclosure includes the moisture-retaining layer. Therefore, it is possible to suppress a phenomenon that a color change does not occur in the dimming device when moisture disappears in the dimming device. Note that effects described here are merely illustrative, and are not restrictive. Furthermore, an additional effect may be present.

MODE FOR CARRYING OUT THE INVENTION

Figure 1A:
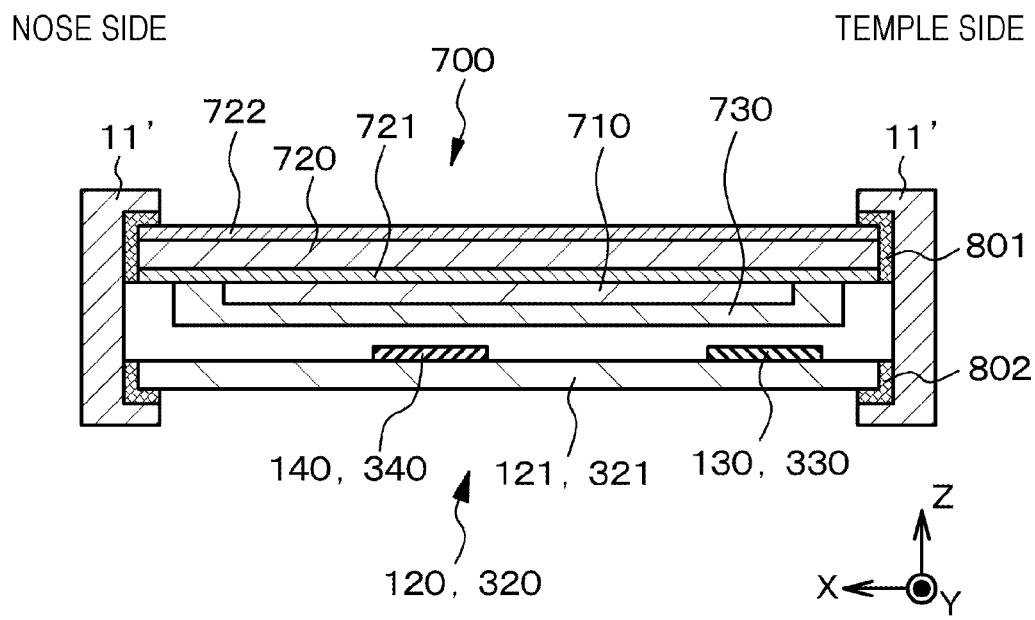
FIGS. 1A and 1B are schematic cross-sectional views obtained by cutting a part of an image display device of Example 1 and a part of a modified example thereof along an XZ plane, respectively.

Hereinafter, the present disclosure will be described on the basis of Examples with reference to the drawings.

However, the present disclosure is not limited to Examples, and various numerical values and materials in Examples are illustrative. Note that description will be made in the following order.

1. General description of dimming device, image display device, and display device of the present disclosure
2. Example 1 (image display device and display device of the present disclosure, optical device with structure 1-B/image forming device with first configuration, and dimming device of the present disclosure)
3. Example 2 (modification of Example 1, optical device with structure 1-B/image forming device with second configuration)
4. Example 3 (modification of Examples 1 and 2, optical device with structure 1-A/image forming devices with first and second configurations)
5. Example 4 (modification of Examples 2 and 3, optical device with second structure/image forming device with second configuration)
6. Example 5 (modification of Examples 1 to 4)
7. Example 6 (modification of Examples 1 to 5)
8. Example 7 (modification of Examples 1 to 6)
9. Example 8 (modification of Examples 1 to 7)
10. Example 9 (modification of Example 4)
11. Example 10 (dimming device of the present disclosure)
12. Others <General Description of Dimming Device, Image Display Device, and Display Device of the Present Disclosure>

In a display device of the present disclosure, at least an edge portion of a protective substrate may be fixed to a frame (specifically, for example, a rim portion). In addition, in this case, the edge portion of the protective substrate may be fixed to a frame (specifically, for example, a rim portion) via an adhesive capable of transmitting water vapor. Alternatively, a space between a dimming device and an optical device may communicate with the outside. Examples of the adhesive capable of transmitting water vapor include an adhesive mainly containing a nonpolar material such as a silicone-based material or an ethylene vinyl alcohol-based copolymer having high water vapor diffusibility, or styrene-based butadiene. A value of moisture transmittance of the adhesive is, for example, $2 \times 10$ g/m$^2$·day to $1.1 \times 10^3$ g/m$^2$·day. Note that moisture transmittance can be measured on the basis of JIS K7129:2008, and a test piece of 50 mm×50 mm is subjected to a test under conditions of a test temperature of 25° C.±0.5° C. and a relative humidity of 90±2%. Measurement is performed using a dry/wet sensor.

In a dimming device of the present disclosure, an outer edge of a protective substrate and an outer edge of a water vapor transmissive transparent substrate may be sealed to each other with a sealing member. In addition, in the dimming device of the present disclosure including this preferable form, the water vapor transmissive transparent substrate may be disposed above a moisture-retaining layer. In other words, a space may be present between the water vapor transmissive transparent substrate and the moisture-retaining layer. The sealing member can be constituted by the above-described adhesive capable of transmitting water vapor. Alternatively, the space present between the water vapor transmissive transparent substrate and the moisture-retaining layer may communicate with the outside. In this case, a through hole may be formed in the sealing member. Examples of the sealing member also referred to as a seal agent include various resins such as a thermosetting resin, a photocurable resin, a moisture-curable resin, and an anaerobic curing resin, such as an epoxy-based resin, a urethane-based resin, an acrylic resin, a vinyl acetate-based resin, an ene-thiol-based resin, a silicone-based resin, or a modified polymer resin.

In an image display device of the present disclosure, an image display device constituting the display device of the present disclosure including the above preferable form, or the dimming device of the present disclosure including the above preferable form (hereinafter, these may be collectively referred to as "image display device or the like of the present disclosure"), moisture transmittance of a material constituting a protective substrate may be $10^{-2}$ g/m$^2$·day or less. Measurement of the moisture transmittance of a material constituting the protective substrate or measurement of moisture transmittance of a material constituting a water vapor transmissive transparent substrate described later can be performed on the basis of the above JIS standard.

Furthermore, in the image display device of the present disclosure including the above preferable form and the display device of the present disclosure including the above preferable form, the dimming device may further include (c-4) a water vapor transmissive transparent substrate disposed on the moisture-retaining layer. In addition, in this case, the moisture transmittance of a material constituting the water vapor transmissive transparent substrate is preferably 10 times or more the moisture transmittance of a material constituting the protective substrate. Furthermore, in these cases, the water vapor transmissive transparent substrate may contain a polycarbonate resin, a polyethylene terephthalate resin, a polyethylene naphthalate resin, a cycloolefin-based resin, an acrylate-based resin, a urethane-based resin, a styrene-based resin, a polymethyl methacrylate resin, or a polyimide resin.

Furthermore, in the image display device or the like of the present disclosure including the above-described preferable form, the moisture-retaining layer may contain at least one material selected from the group consisting of an epoxy-based resin, a polyvinyl-based resin such as polyvinyl alcohol or polyvinyl butyral, a moisture-containing gel, and a porous material. Examples of the moisture-containing gel include a mixture of sodium polyacrylate and polyethylene glycol having a dendron group at a terminal thereof. Examples of the porous material include silica surface-modified with an organosilane compound and the like.

Furthermore, in the image display device or the like of the present disclosure including the above-described preferable form, a water vapor barrier layer may be disposed between the protective substrate and a dimming layer. In addition, in this case, the water vapor barrier layer may contain at least one material selected from the group consisting of an inorganic material such as aluminum oxide, silicon oxide, silicon nitride, or niobium oxide, an organic material such as vinylidene chloride or polyacrylate, and an aluminum foil. Formation of the water vapor barrier layer can be performed, for example, on the basis of a PVD method, a CVD method, a laser ablation method, or an atomic layer deposition method (ALD method).

Furthermore, in the image display device or the like of the present disclosure including the above-described preferable form, the dimming layer may include an electrochromic material layer. In addition, in this case, the dimming layer may have a laminated structure of a first electrode, the electrochromic material layer, and a second electrode, and the electrochromic material layer may have a laminated structure of a reduction coloring layer, an electrolyte layer, and an oxidation coloring layer. For example, a light shielding ratio can be controlled on the basis of a simple matrix method. In other words, the first electrode may include a plurality of band-shaped first electrode segments extending in a first direction, the second electrode may include a plurality of band-shaped second electrode segments extending in a second direction different from the first direction, and a light shielding ratio of a portion of the dimming device corresponding to overlap regions between the first electrode segments and the second electrode segments (minimum unit regions in which the light shielding ratio of the dimming device changes) may be controlled on the basis of control of voltages applied to the first electrode segments and the second electrode segments. The first direction and the second direction may be orthogonal to each other, for example. Alternatively, in order to control the light shielding ratios of the minimum unit regions in which the light shielding ratio of the dimming device changes, a thin film transistor (TFT) may be disposed in each of the minimum unit regions. In other words, the light shielding ratio may be controlled on the basis of an active matrix method. Alternatively, at least one of the first electrode or the second electrode may be a so-called solid electrode (electrode not patterned).

Furthermore, in the image display device or the like of the present disclosure including the above-described preferable form, the protective substrate may be constituted by a transparent glass substrate such as a soda-lime glass or a white plate glass, a plastic substrate, a plastic sheet, or a plastic film. Here, examples of the plastic include polyethylene terephthalate, polyethylene naphthalate, polycarbonate, a cellulose ester such as cellulose acetate, a fluorocarbon polymer such as polyvinylidene fluoride or a copolymer of polytetrafluoroethylene and hexafluoropropylene, a polyether such as polyoxymethylene, polyacetal, polystyrene, a polyolefin such as polyethylene, polypropylene, or a methylpentene polymer, a polyimide such as polyamideimide or polyetherimide, polyamide, polyether sulfone, polyphenylene sulfide, polyvinylidene fluoride, tetraacetyl cellulose, brominated phenoxy, polyarylate, polysulfone, and the like. Note that if necessary, as described above, it is only required to dispose the water vapor barrier layer between the protective substrate and the dimming layer. This makes it difficult for the protective substrate to transmit water vapor as a whole. In other words, the protective substrate as a whole satisfies that moisture transmittance is $10^{-2}$ g/m$^2$·day or less. On an outer surface of the protective substrate, a hard coat layer constituted by an organic/inorganic mixed layer or an anti-reflection film containing a fluorine-based resin may be formed.

Furthermore, in the image display device of the present disclosure including the above-described preferable form and the display device of the present disclosure including the above-described preferable form, the optical device may include:

(b-1) a light guide plate in which light incident from the image forming device is propagated by total reflection through the inside, and then the light is emitted toward an observer;

(b-2) a first deflecting unit for deflecting light incident on the light guide plate such that the light incident on the light guide plate is totally reflected inside the light guide plate; and (b-3) a second deflecting unit for deflecting light propagated by total reflection through the inside of the light guide plate and emitting the light from the light guide plate, and the second deflecting unit may form a virtual image forming region of the optical device. Such an optical device is referred to as "optical device with first structure" for convenience. Note that the term "total reflection" means total internal reflection or total reflection inside the light guide plate. The second deflecting unit (virtual image forming region) is located in a projection image of the dimming device.

A region in which a high light shielding ratio is set in the dimming device may be a partial region of the dimming device. In other words, the light shielding ratio of a region of the dimming device facing a region of the second deflecting unit (for example, a partial region of the second deflecting unit) where a virtual image is actually formed may be controlled. In other words, if a virtual image is formed in a part of the virtual image forming region on the basis of light emitted from the image forming device, the dimming device may perform control such that the light shielding ratio of a virtual image projection region (region of the dimming device corresponding to the virtual image forming region in the optical device) of the dimming device including a projected image of a virtual image on the dimming device is higher than the light shielding ratio of another region of the dimming device. Note that the position of the virtual image projection region does not have to be fixed in the dimming device but may vary depending on the formation position of a virtual image. Furthermore, the number of the virtual image projection regions may also vary depending on the number of virtual images (the number of a series of virtual image groups, the number of blocked virtual image groups, or the like).

During operation of the dimming device, if the light shielding ratio of the virtual image projection region of the dimming device including a projected image of a virtual image on the dimming device is assumed to be "1", the light shielding ratio of another region of the dimming device is, for example, 0.95 or less. Alternatively, the light shielding ratio of another region of the dimming device is, for example, 30% or less. Meanwhile, during operation of the dimming device, the light shielding ratio of the virtual image projection region of the dimming device is 35% to 99%, for example, 80%. As described above, the light shielding ratio of the virtual image projection region may be constant or may vary depending on illuminance of an environment in which the display device is placed.

If the number of pixels of the virtual image forming region in a transverse direction in the optical device is represented by $M_0$ and the number of pixels thereof in a longitudinal direction is represented by $N_0$, the number $M_1 \times N_1$ of minimum unit regions in which the light shielding ratio of the dimming device changes can satisfy, for example, $M_0 = M_1$ (that is, k=1) and $N_0 = N_1$ (that is, k'=1) provided that $M_1/M_0 = k$ and $N_1/N_0 = k'$. However, the present disclosure is not limited thereto, but may satisfy $1.1 \leq k$, preferably $1.1 \leq k \leq 1.5$, and more preferably $1.15 \leq k \leq 1.3$, and may satisfy $1.1 \leq k'$, preferably $1.1 \leq k' \leq 1.5$, and more preferably $1.15 \leq k' \leq 1.3$. Values of k and k' may be the same as or different from each other.

The dimming device can be constituted by an optical shutter to which a color change of a substance generated by a redox reaction of an electrochromic material layer containing an inorganic or organic electrochromic material is applied. Specifically, the dimming layer may include an electrochromic material layer containing an inorganic or organic electrochromic material. As described above, the electrochromic material layer may be constituted by a reduction coloring layer, an electrolyte layer, and an oxidation coloring layer. Examples of the reduction coloring layer include an inorganic material such as tungsten oxide, molybdenum oxide, or vanadium oxide, and an organic material such as a viologen derivative, a polythiophene derivative, or a Prussian blue derivative. Examples of the electrolyte layer include tantalum oxide, propylene carbonate, an ionic liquid, and an ionic polymer. Examples of the oxidation coloring layer include an inorganic material such as an iridium oxide-based material, nickel oxide, zirconium oxide, zirconium phosphate, nickel hydroxide, chromium oxide, or copper chloride, an organic material such as an amine derivative, phenazine, or a viologen derivative, a polymer, an organic-metal mixture, and the like. More specifically, for example, from the first electrode side, the dimming layer may have a laminated structure of inorganic electrochromic material layers such as $WO_3$ layer/$Ta_2O_5$ layer/$Ir_xSn_{1-x}O$ layer, or a laminated structure of inorganic electrochromic material layers such as $WO_3$ layer/$Ta_2O_5$ layer/$IrO_x$ layer. Instead of the $WO_3$ layer, as described above, a $MoO_3$ layer or a $V_2O_5$ layer can be used. Furthermore, instead of the $IrO_x$ layer, as described above, a $ZrO_2$ layer or a zirconium phosphate layer can be used, or a Prussian blue complex/nickel substituted Prussian blue complex or the like can also be used. As a material constituting the organic electrochromic material layer, for example, electrochromic materials disclosed in Japanese Patent Laid-Open Nos. 2014-111710 and 2014-159385 can also be used.

The first electrode may be patterned or does not have to be patterned. The second electrode may be patterned or does not have to be patterned. Examples of a material constituting the first electrode and the second electrode include a transparent conductive material. More specific examples thereof include an indium-tin composite oxide (indium tin oxide (ITO), including Sn-doped $In_2O_3$, crystalline ITO, and amorphous ITO), fluorine-doped $SnO_2$ (FTO), F-doped $In_2O_3$ (IFO), antimony-doped $SnO_2$ (ATO), $SnO_2$, ZnO (including Al-doped ZnO and B-doped ZnO), indium-zinc composite oxide (indium zinc oxide (IZO)), a spinel type oxide, an oxide having a $YbFe_2O_4$ structure, and a conductive polymer such as polyaniline, polypyrrole, or polythiophene, and the like, but are not limited thereto. Furthermore, two or more kinds thereof can be used in combination. Alternatively, the first electrode and the second electrode in a thin line shape can be constituted by metal such as gold, silver, copper, aluminum, nickel, or titanium, or alloy. The first electrode and the second electrode can be formed on the basis of a physical vapor deposition method (PVD method) such as a vacuum vapor deposition method or a sputtering method, various chemical vapor deposition methods (CVD methods), various kinds of coating, and the like. Patterning of an electrode can be performed by any method such as an etching method, a lift-off method, or a method using various masks.

In the display device of the present disclosure including the above-described various preferable forms (hereinafter, these may be collectively referred to as "display device or the like of the present disclosure"), a frame includes a front portion disposed in front of an observer, two temple portions rotatably attached to both ends of the front portion via hinges, and a nose pad. The dimming device may be disposed in the front portion. In addition, in this case, the optical device may be attached to the dimming device, or may be attached to the front portion. Furthermore, in these cases, the front portion may have a rim portion, and the dimming device may be fitted in the rim portion, or the optical device may be fitted in the rim portion. In the display device or the like of the present disclosure, from an observer side, the optical device and the dimming device may be disposed in this order, or the dimming device and the optical device may be disposed in this order.

In the display device or the like of the present disclosure, the light shielding ratio may change gradually (that is, may change continuously), may change stepwise depending on the disposition state and shapes of electrodes, or may change continuously or stepwise from a constant value. In other words, the dimming device may be in a state with color gradation, may be in a state in which a color changes gradually, or may be in a state in which a color changes continuously or stepwise from a state with a constant color. The light shielding ratio can be controlled by voltages applied to the first electrode and the second electrode. A potential difference between the first electrode and the second electrode may be controlled, or a voltage applied to the first electrode and a voltage applied to the second electrode may be independently controlled. In a case of adjusting the light shielding ratio, a test pattern may be displayed on the optical device.

The display device or the like of the present disclosure may further include an environmental illuminance measuring sensor for measuring the illuminance of an environment in which the display device is placed, and may control the light shielding ratio of the dimming device on the basis of a measurement result of the environmental illuminance measuring sensor. Alternatively, the display device or the like may further include an environmental illuminance measuring sensor for measuring the illuminance of an environment in which the display device is placed, and may control the brightness of an image formed by the image forming device on the basis of a measurement result of the environmental illuminance measuring sensor. These forms may be combined with each other.

Alternatively, the display device or the like may further include a transmitted light illuminance measuring sensor for measuring illuminance based on light which has passed through the dimming device from an external environment, and may control the light shielding ratio of the dimming device on the basis of a measurement result of the transmitted light illuminance measuring sensor. Alternatively, the display device or the like may further include a transmitted light illuminance measuring sensor for measuring illuminance based on light which has passed through the dimming device from an external environment, and may control the brightness of an image formed by the image forming device on the basis of a measurement result of the transmitted light illuminance measuring sensor. The transmitted light illuminance measuring sensor is desirably disposed closer to an observer than the optical device. At least two transmitted light illuminance measuring sensors may be disposed, and illuminance based on light which has passed through a portion with a high light shielding ratio and illuminance based on light which has passed through a portion with a low light shielding ratio may be measured. These forms may be combined with each other. Furthermore, these forms may be combined with the above-described form in which control is performed on the basis of a measurement result of the environmental illuminance measuring sensor.

The illuminance sensor (environmental illuminance measuring sensor or transmitted light illuminance measuring sensor) only needs to be constituted by a well-known illuminance sensor, and only needs to be controlled on the basis of a well-known control circuit.

The maximum light transmittance of the dimming device may be 50% or more, and the minimum light transmittance of the dimming device may be 30% or less. An upper limit value of the maximum light transmittance of the dimming device may be 99%, and a lower limit value of the minimum light transmittance of the dimming device may be 1%. Here, there is a relationship of (light transmittance)=1−(light shielding ratio).

It is only required to attach a connector to the dimming device, and to electrically connect the dimming device to a control circuit (for example, included in a control device for controlling an image forming device) for controlling the light shielding ratio (light transmittance) of the dimming device via the connector and wiring.

In some cases, light passing through the dimming device may be colored in a desired color by the dimming device. In addition, in this case, a color in which light is colored by the dimming device may be variable or fixed. In the former case, for example, it is only required to laminate a dimming device for coloring light in red, a dimming device for coloring light in green, and a dimming device for coloring light in blue. Furthermore, in the latter case, a color in which light is colored by the dimming device is not limited, but may be brown, for example.

Furthermore, in some cases, the dimming device may be detachably disposed. In order to detachably dispose the dimming device, for example, the dimming device may be attached, for example, to a frame using a screw manufactured from a transparent plastic. Alternatively, the dimming device may be attached to a frame by forming a groove in the frame and engaging the dimming device with the groove or by attaching a magnet to the frame. Alternatively, the dimming device may be fitted in a slide portion by forming the slide portion in a frame.

The optical device is a semi-transmission type (see-through type) device. Specifically, at least a portion of the optical device facing an eyeball (pupil) of an observer is made semi-transmissive (see-through), and an outside scene can be viewed through this portion of the optical device and the dimming device. The light shielding ratio can be controlled and adjusted manually by observation of the lightness of light which has passed through the dimming device and the optical device by an observer and operation of a switch, a button, a dial, a slider, a knob, or the like by the observer. Alternatively, the light shielding ratio can be controlled and adjusted on the basis of a measurement result of the above-described transmitted light illuminance measuring sensor for measuring illuminance based on light which has passed through the dimming device from an external environment. Specifically, control and adjustment of the light shielding ratio only need to be performed by controlling voltages applied to the first electrode and the second electrode. At least two transmitted light illuminance measuring sensors may be disposed, and illuminance based on light which has passed through a portion with a high light shielding ratio and illuminance based on light which has passed through a portion with a low light shielding ratio may be measured. The display device may include one image display device (single eye type) or two image display devices (binocular type). In a case where the display device includes two image display devices, by adjusting voltages applied to the first electrode and the second electrode in each of one dimming device and the other dimming device, the light shielding ratios of one dimming device and the other dimming device can be equalized. The light shielding ratios in one dimming device and the other dimming device can be controlled, for example, on the basis of a measurement result of the above-described transmitted light illuminance measuring sensor for measuring illuminance based on light which has passed through the dimming device from an external environment, or can be controlled and adjusted manually by observation of the lightness of light which has passed through one dimming device and the optical device and the lightness of light which has passed through the other dimming device and the optical device by an observer and operation of a switch, a button, a dial, a slider, a knob, or the like by the observer. In a case of adjusting the light shielding ratio, a test pattern may be displayed on the optical device.

Here, the term "semi-transmissive" may be used, and the term "semi-transmissive" does not mean that a half (50%) of incident light is transmitted or reflected, but means that a part of incident light is transmitted and the remaining light is reflected.

In the optical device with first structure, as described above, the first deflecting unit may reflect light incident on the light guide plate, and the second deflecting unit may transmit and reflect light propagated by total reflection through the inside of the light guide plate (a plurality of times). In addition, in this case, the first deflecting unit may function as a reflecting mirror, and the second deflecting unit may function as a semi-transmissive mirror. Such an optical device with first structure is referred to as "optical device with structure 1-A" for convenience.

In such an optical device with structure 1-A, the first deflecting unit may be constituted by, for example, a light reflecting film (a kind of mirror) that is constituted by metal including alloy and reflects light incident on the light guide plate, or a diffraction grating (for example, a hologram diffraction grating film) that diffracts light incident on the light guide plate. Alternatively, the first deflecting unit may be constituted by a multilayer laminated structure in which many dielectric laminated films are laminated, a half mirror, or a polarization beam splitter, for example. Furthermore, the second deflecting unit may be constituted by a multilayer laminated structure in which many dielectric laminated films are laminated, a half mirror, a polarization beam splitter, or a hologram diffraction grating film. In addition, the first deflecting unit and the second deflecting unit are disposed inside the light guide plate (incorporated in the light guide plate). In the first deflecting unit, parallel light incident on the light guide plate is reflected or diffracted so as to be totally reflected inside the light guide plate. Meanwhile, in the second deflecting unit, parallel light propagated by total reflection through the inside of the light guide plate is reflected or diffracted (a plurality of times), and is emitted from the light guide plate in the state of parallel light.

Alternatively, the first deflecting unit may diffract and reflect light incident on the light guide plate, and the second deflecting unit may diffract and reflect light propagated by total reflection through the inside of the light guide plate. In addition, in this case, the first deflecting unit and the second deflecting unit may be constituted by diffraction grating elements. Furthermore, the diffraction grating elements may be constituted by reflection type diffraction grating elements or transmission type diffraction grating elements. Alternatively, one of the diffraction grating elements may be constituted by a reflection type diffraction grating element, and the other of the diffraction grating elements may be constituted by a transmission type diffraction grating element. Examples of the reflection type diffraction grating element include a reflection type volume hologram diffraction grating. The reflection type volume hologram diffraction grating means a hologram diffraction grating for diffracting and reflecting only +1st order diffracted light. A first deflecting unit constituted by a hologram diffraction grating may be referred to as a "first diffraction grating member" for convenience, and a second deflecting unit constituted by a hologram diffraction grating may be referred to as a "second diffraction grating member" for convenience. Furthermore, such an optical device with first structure is referred to as "optical device with structure 1-B" for convenience.

The image display device in the display device or the like of the present disclosure can display an image of a single color (for example, green). In addition, in this case, for example, by dividing an angle of view into two (more specifically, for example, by dividing the angle of view into two equal parts) for example, the first deflecting unit may be formed by laminating two diffraction grating members corresponding to groups of the angle of view divided into two. Alternatively, in a case where a color image is displayed, the first diffraction grating member or the second diffraction grating member may be formed by laminating P layers of diffraction grating layers each including a hologram diffraction grating so as to correspond to diffraction reflection of P types of light beams having different P types (for example, P=3, and three types of red, green, and blue) of wavelength bands (or wavelengths). In each diffraction grating layer, an interference fringe corresponding to one type of wavelength band (or wavelength) is formed. Alternatively, the first diffraction grating member or the second diffraction grating member including one diffraction grating layer may have P types of interference fringes formed so as to correspond to diffraction reflection of P types of light beams having different P types of wavelength bands (or wavelengths). Alternatively, for example, a diffraction grating member including a diffraction grating layer including a hologram diffraction grating for diffracting and reflecting light having a red wavelength band (or wavelength) may be disposed on a first light guide plate, a diffraction grating member including a diffraction grating layer including a hologram diffraction grating for diffracting and reflecting light having a green wavelength band (or wavelength) may be disposed on a second light guide plate, a diffraction grating member including a diffraction grating layer including a hologram diffraction grating for diffracting and reflecting light having a blue wavelength band (or wavelength) may be disposed on a third light guide plate, and the first light guide plate, the second light guide plate, and the third light guide plate may be stacked with a gap therebetween. Alternatively, the first diffraction grating member or the second diffraction grating member may be constituted by dividing an angle of view, for example, into three equal parts and laminating diffraction grating layers corresponding to the divided angles of view. In addition, by adopting these configurations, it is possible to increase diffraction efficiency, to increase a diffraction reception angle, and to optimize a diffraction angle when light having each wavelength band (or wavelength) is diffracted and reflected by the first diffraction grating member or the second diffraction grating member. A protective member is preferably disposed such that an observer does not touch a hologram diffraction grating.

Examples of a material constituting the first diffraction grating member and the second diffraction grating member include a photopolymer material. A constituent material and a basic structure of each of the first diffraction grating member and the second diffraction grating member including a hologram diffraction grating only need to be the same as those of a conventional hologram diffraction grating. Interference fringes are formed from the inside to a surface of a diffraction grating member. A method for forming the interference fringes themselves only needs to be the same as a conventional formation method. Specifically, for example, by irradiating a member (for example, a photopolymer member) constituting a diffraction grating member with object light from a first predetermined direction on one side, and at the same time, by irradiating the member constituting a diffraction grating member with reference light from a second predetermined direction on the other side, it is only required to record an interference fringe formed by the object light and the reference light inside the member constituting a diffraction grating member. By appropriately selecting the first predetermined direction, the second predetermined direction, and the wavelengths of the object light and the reference light, it is possible to obtain a desired pitch of an interference fringe on a surface of a diffraction grating member and a desired inclination angle (slant angle) of the interference fringe. The inclination angle of an interference fringe means an angle formed by a surface of a diffraction grating member (or diffraction grating layer) and the interference fringe. In a case where the first diffraction grating member and the second diffraction grating member are each constituted by a laminated structure of P layers of diffraction grating layers each including a hologram diffraction grating, such a lamination of diffraction grating layers only needs to be performed by manufacturing each of P layers of diffraction grating layers separately, and then laminating (bonding) the P layers of diffraction grating layers using, for example, an ultraviolet curable adhesive. Furthermore, by manufacturing a single diffraction grating layer using an adhesive photopolymer material and then sequentially sticking an adhesive photopolymer material onto the diffraction grating layer to manufacture a diffraction grating layer, the P layers of diffraction grating layers may be manufactured. By irradiating the manufactured diffraction grating layer with an energy ray, if necessary, a monomer remaining in the photopolymer material without being polymerized when the diffraction grating layer is irradiated with the object light and the reference light may be polymerized and fixed. Furthermore, if necessary, a heat treatment may be performed for stabilization.

Alternatively, in the image display device in the display device or the like of the present disclosure, the optical device may be constituted by a semi-transmissive mirror into which light emitted from the image forming device is incident and from which the light is emitted toward a pupil of an observer or may be constituted by a polarization beam splitter (PBS). The semi-transmissive mirror or the polarization beam splitter forms a virtual image forming region of the optical device. Light emitted from the image forming device may be propagated in air to be incident on the semi-transmissive mirror or the polarization beam splitter. For example, the light may be propagated through the inside of a transparent member such as a glass plate or a plastic plate (specifically, a member constituted by a similar material to a material constituting a light guide plate described later) to be incident on the semi-transmissive mirror or the polarization beam splitter. The semi-transmissive mirror or the polarization beam splitter may be attached to the image forming device via this transparent member or via a member different from this transparent member. Such an optical device is referred to as "optical device with second structure" for convenience. The semi-transmissive mirror may be constituted by the first deflecting unit in the optical device with structure 1-A, for example, a light reflecting film (a kind of mirror) that is constituted by metal including alloy and reflects light, or a diffraction grating (for example, a hologram diffraction grating film). Alternatively, the optical device may be constituted by a prism on which light emitted from the image forming device is incident and from which the light is emitted toward a pupil of an observer.

In the image display device in the display device or the like of the present disclosure including the above-described various preferable forms and configurations, the image forming device may have a plurality of pixels arranged in a two-dimensional matrix. Such a configuration of the image forming device is referred to as "image forming device with first configuration" for convenience.

Examples of the image forming device with first configuration include: an image forming device including a reflection type spatial light modulator and a light source; an image forming device including a transmission type spatial light modulator and a light source; and an image forming device including a light emitting element such as an organic electro luminescence (EL), an inorganic EL, a light emitting diode (LED), or a semiconductor laser element. Among these devices, the image forming device (organic EL display device) including an organic EL light emitting element and the image forming device including a reflection type spatial light modulator and a light source are preferable. Examples of the spatial light modulator include a light valve, a transmission type or reflection type liquid crystal display device such as a liquid crystal on silicon (LCOS), and a digital micromirror device (DMD). Examples of the light source include a light emitting element. Furthermore, the reflection type spatial light modulator may include a liquid crystal display device and a polarization beam splitter for reflecting a part of light emitted from a light source to guide the light to the liquid crystal display device and transmitting a part of the light reflected by the liquid crystal display device to guide the light to an optical device (for example, light guide plate). Examples of the light emitting element constituting the light source include a red light emitting element, a green light emitting element, a blue light emitting element, and a white light emitting element. Alternatively, white light may be obtained by mixing colors of red light, green light, and blue light emitted from the red light emitting element, the green light emitting element, and the blue light emitting element using a light pipe and uniformizing brightness. Examples of the light emitting element include a semiconductor laser element, a solid state laser, and an LED. The number of pixels only needs to be determined on the basis of specifications required for the image display device, and examples of a specific value of the number of pixels include 320×240, 432×240, 640×480, 1024×768, 1920×1080, and the like. In the image forming device with first configuration, a diaphragm may be disposed at a position of a front focal point (focal point on the image forming device side) of a lens system (described later), and this diaphragm corresponds to an image emitting portion from which an image is emitted in the image forming device.

Alternatively, in the image display device in the display device or the like of the present disclosure including the above-described preferable forms and configurations, the image forming device may include a light source and a scanning unit for scanning light emitted from the light source to form an image. Such an image forming device is referred to as "image forming device with second configuration" for convenience.

Examples of the light source in the image forming device with second configuration include a light emitting element, and specific examples thereof include a red light emitting element, a green light emitting element, a blue light emitting element, and a white light emitting element. Alternatively, white light may be obtained by mixing colors of red light, green light, and blue light emitted from the red light emitting element, the green light emitting element, and the blue light emitting element using a light pipe and uniformizing brightness. Examples of the light emitting element include a semiconductor laser element, a solid state laser, and an LED. The number of pixels (virtual pixels) in the image forming device with second configuration only needs to be determined on the basis of specifications required for the image display device, and examples of a specific value of the number of pixels (virtual pixels) include 320×240, 432×240, 640×480, 1024×768, 1920×1080, and the like. Furthermore, in a case where a color image is to be displayed and in a case where the light source includes a red light emitting element, a green light emitting element, and a blue light emitting element, color synthesis is preferably performed using, for example, a cross prism. Examples of the scanning unit include a micro electro mechanical systems (MEMS) mirror having a micro mirror rotatable in a two-dimensional direction and a galvanometer mirror, the mirrors horizontally and vertically scanning light emitted from the light source. In the image forming device with second configuration, a MEMS mirror or a galvanometer mirror may be disposed at a position of a front focal point (focal point on the image forming device side) of a lens system (described later), and the MEMS mirror or the galvanometer mirror corresponds to an image emitting portion from which an image is emitted in the image forming device.

In the image forming device with first configuration or the image forming device with second configuration in the image display device including the optical device with first structure, light converted into a plurality of parallel light beams by a lens system (an optical system for converting emitted light into parallel light) is incident on an optical device (for example, light guide plate). Such a requirement for obtaining parallel light is on the basis of necessity of saving optical wavefront information when the light is incident on the optical device even after the light is emitted from the optical device via the first deflecting unit and the second deflecting unit. In order to generate a plurality of parallel light beams, specifically, as described above, for example, it is only required to locate a light emitting portion of the image forming device at a position (location) of a focal length in the lens system. The lens system has a function of converting position information of a pixel into angle information in the optical device. Examples of the lens system include an optical system having a positive optical power as a whole, such as a convex lens, a concave lens, a free cured surface prism, a hologram lens, or a combination thereof. A light shielding portion having an opening may be disposed between the lens system and the optical device in order to prevent undesired light emitted from the lens system from being incident on the optical device.

The light guide plate has two parallel surfaces (first surface and second surface) extending parallel to an axis (longitudinal direction or horizontal direction, corresponding to an X axis direction) of the light guide plate. The width direction (height direction or vertical direction) of the light guide plate corresponds to a Y direction. If a surface of the light guide plate on which light is incident is referred to as a light guide plate incident surface and a surface of the light guide plate from which light is emitted is referred to as a light guide plate emission surface, the first surface may constitute the light guide plate incident surface and the light guide plate emission surface, or the first surface may constitute the light guide plate incident surface and the second surface may constitute the light guide plate emission surface. The first deflecting unit is disposed on the first surface or the second surface of the light guide plate, and the second deflecting unit is disposed on the first surface or the second surface of the light guide plate. An interference fringe of a diffraction grating member extends substantially parallel to the Y direction. Examples of a material constituting the light guide plate include glass including an optical glass such as a quartz glass or BK7, a soda lime glass, and a white plate glass, and a plastic material (for example, PMMA, a polycarbonate resin, a laminated structure of a polycarbonate resin and an acrylic resin, an acrylic resin, a cycloolefin polymer, an amorphous polypropylene-based resin, and a styrene-based resin including an AS resin). The shape of the light guide plate is not limited to a flat plate, and may be a curved shape. The dimming device may be curved.

In the display device or the like of the present disclosure, a light shielding member for shielding incidence of external light on the optical device may be disposed in a region of the optical device on which light emitted from the image forming device is incident. By disposing the light shielding member for shielding incidence of external light on the optical device in a region of the optical device on which light emitted from the image forming device is incident, even if the amount of incident external light changes due to operation of the dimming device, in the first place, external light is not incident on the region of the optical device on which light emitted from the image forming device is incident. Therefore, deterioration in image display quality of the display device due to generation of undesirable stray light or the like does not occur. The region of the optical device on which light emitted from the image forming device is incident is preferably included in a projected image of the light shielding member on the optical device.

Alternatively, in the display device or the like of the present disclosure, a light shielding member for shielding incidence of external light on the first deflecting unit may be disposed in a region of the first deflecting unit on which light emitted from the image forming device is incident. By disposing the light shielding member for shielding incidence of external light on the light guide device in a region of the light guide plate on which light emitted from the image forming device is incident, external light is not incident on the region of the light guide plate on which light emitted from the image forming device is incident. Therefore, deterioration in image display quality of the display device due to generation of undesirable stray light or the like does not occur. The region of the light guide plate on which light emitted from the image forming device is incident is preferably included in an orthogonally projected image of the light shielding member on the light guide plate.

The light shielding member may be disposed away from the optical device (light guide plate) on the opposite side to a side where the image forming device is disposed in the optical device (light guide plate). In the display device having such a configuration, the light shielding member only needs to be manufactured, for example, from an opaque plastic material. Such a light shielding member may integrally extend from a casing of the image forming device, may be attached to the casing of the image forming device, may integrally extend from a frame, or may be attached to the frame. Alternatively, the light shielding member may be disposed in a portion of the optical device (light guide plate) on the opposite side to a side where the image forming device is disposed, or may be disposed in the dimming device. For example, a light shielding member containing an opaque material may be formed on a surface of the optical device (light guide plate) on the basis of a physical vapor deposition method (PVD method) or a chemical vapor deposition method (CVD method), a printing method, or the like. A film, a sheet, or a foil including an opaque material (plastic material, metal material, alloy material, or the like) may be stuck to the surface of the optical device (light guide plate). A projected image of an end portion of the dimming device on the optical device (light guide plate) is preferably included in a projected image of a light shielding member on the optical device (light guide plate).

In the display device or the like of the present disclosure, as described above, the frame may include a front portion disposed in front of an observer and two temple portions rotatably attached to both ends of the front portion via hinges. A modern portion is attached to a distal end portion of each of the temple portions. The image display device is attached to the frame. Specifically, for example, it is only required to attach the image forming device to the temple portions. Furthermore, the front portion and the two temple portions may be integrally formed. In other words, when the entire display device or the like of the present disclosure is viewed, the frame has substantially the same structure as ordinary eyeglasses. A material constituting the frame including a pad portion may be the same material as a material constituting ordinary eyeglasses, such as metal, alloy, plastic, or a combination thereof. Furthermore, a nose pad may be attached to the front portion. That is, when the entire display device or the like of the present disclosure is viewed, an assembly of the frame (including a rim portion) and the nose pad has substantially the same structure as ordinary eyeglasses. The nose pad may also have a well-known configuration and structure.

Furthermore, in the display device or the like of the present disclosure, wiring (signal line, power supply line, or the like) from one or two image forming devices desirably extends from a distal end portion of a modern portion to the outside via a temple portion and the inside of the modern portion to be connected to a control device (control circuit or control unit) from a viewpoint of design or ease of mounting. Furthermore, each image forming device may include a headphone portion, and headphone portion wiring from each image forming device may extend from a distal end portion of the modern portion to the headphone portion via the temple portion and the inside of the modern portion. Examples of the headphone portion include an inner ear type headphone portion and a canal type headphone portion. More specifically, the headphone portion wiring preferably extends from a distal end portion of the modern portion to the headphone portion so as to go around a back side of the auricle (auditory capsule). Furthermore, a camera (imaging device) may be attached to the central portion of the front portion. Specifically, the camera includes, for example, a solid-state imaging element including a CCD or CMOS sensor and a lens. Wiring from the camera only needs to be connected to one of the image display devices (or the image forming devices), for example, via the front portion. Furthermore, the wiring only needs to be included in the wiring extending from the image display device (or the image forming device).

The display device of the present disclosure may receive a signal for displaying an image in the image display device (a signal for forming a virtual image in the optical device (for example, light guide plate)) from the outside. In such a form, information and data regarding an image to be displayed on the image display device is recorded, stored, and saved, for example, in a so-called cloud computer or a server. By inclusion of a communication unit such as a mobile phone or a smartphone in the display device or by combination of the display device and the communication unit, various kinds of information and data can be transmitted and exchanged between the cloud computer or the server and the display device, and a signal based on various kinds of information and data, that is, a signal for displaying an image in the image display device (a signal for forming a virtual image in the optical device) can be received. Alternatively, a signal for displaying an image in the image display device (a signal for forming a virtual image in the optical device) may be stored in the display device. An image displayed on the image display device includes various kinds of information and various kinds of data. Alternatively, the display device may include a camera (imaging device). An image imaged by the camera may be sent to a cloud computer or a server via a communication unit. The cloud computer or the server may retrieve various kinds of information and data corresponding to the image imaged by the camera. The various kinds of information and data retrieved may be sent to the display device via the communication unit. An image of the various kinds of information and data retrieved may be displayed on the image display device.

When the image imaged by the camera (imaging device) is sent to the cloud computer or the server via the communication unit, the image imaged by the camera may be displayed on the image display device and may be confirmed by the optical device (for example, light guide plate). Specifically, an outer edge of a space region imaged by the camera may be displayed in a frame shape in the dimming device. Alternatively, the light shielding ratio of a region of the dimming device corresponding to the space region imaged by the camera may be higher than the light shielding ratio of a region of the dimming device corresponding to the outside of the space region imaged by the camera. In such a form, an observer sees the space region imaged by the camera darker than the outside of the space region imaged by the camera. Alternatively, the light shielding ratio of a region of the dimming device corresponding to the space region imaged by the camera may be lower than the light shielding ratio of a region of the dimming device corresponding to the outside of the space region imaged by the camera. In such a form, an observer sees the space region imaged by the camera brighter than the outside of the space region imaged by the camera. In addition, this makes it possible for an observer to easily and reliably recognize a position in the outside to be imaged by the camera.

A position in a region of the dimming device corresponding to the space region imaged by the camera (imaging device) is preferably calibrated. Specifically, for example, by inclusion of a mobile phone or a smartphone in the display device or by combination of the display device with the mobile phone, the smartphone, or a personal computer, the mobile phone, the smartphone, or the personal computer can display a space region imaged by the camera. In addition, in a case where there is a difference between a space region displayed on the mobile phone, the smartphone, or the personal computer and a region of the dimming device corresponding to a space region imaged by the camera, by moving/rotating or enlarging/reducing a region of the dimming device corresponding to the space region imaged by the camera using a control circuit (which can be substituted by a mobile phone, a smartphone, or a personal computer) for controlling a light shielding ratio (light transmittance) of the dimming device, it is only required to eliminate the difference between the space region displayed on the mobile phone, the smartphone, or the personal computer and the region of the dimming device corresponding to the space region imaged by the camera.

The display device of the present disclosure including the above-described various modified examples can be used, for example, for receiving/displaying an electronic mail; display of various kinds of information or the like in various sites on the Internet; display of various explanations, for example, for driving, operating, maintaining, or disassembling an observation object such as various devices, a symbol, a sign, a mark, an emblem, a design, or the like; display of various explanations concerning an observation object such as a person or an article, a symbol, a sign, a mark, an emblem, a design, or the like; display of a moving image and a still image; display of subtitles of a movie and the like; display of descriptive text concerning video synchronized with video and closed caption; and display of various explanations concerning an observation object in play, Kabuki, Noh, Kyogen, opera, concert, ballet, various dramas, an amusement park, a museum, a sightseeing spot, a holiday destination, tourist information, and the like, and descriptive text or the like for explaining contents thereof, progress status thereof, backgrounds thereof, and the like, and can be used for display of closed caption. In play, Kabuki, Noh, Kyogen, opera, concert, ballet, various dramas, an amusement park, a museum, a sightseeing spot, a holiday destination, tourist information, and the like, it is only required to display characters as an image relating to an observation object on the display device at an appropriate timing. Specifically, for example, in accordance with progress status of a movie or the like, or in accordance with progress status of a play or the like, an image control signal is sent to the display device, and an image is displayed on the display device on the basis of a predetermined schedule or time allocation by operation of an operator or under control of a computer or the like. Furthermore, various kinds of explanations concerning an observation object such as various devices, a person, or an article are displayed. If the camera photographs (images) an observation object such as various devices, a person, or an article, and the display device analyzes the photographed (imaged) contents, the display device can display previously-created various explanations concerning an observation object such as various devices, a person, or an article.

An image signal to the image forming device may include not only an image signal (for example, character data) but also, for example, brightness data (brightness information) concerning an image to be displayed, chromaticity data (chromaticity information), or brightness data and chromaticity data. The brightness data may correspond to brightness of a predetermined region including an observation object viewed through the optical device (for example, light guide plate). The chromaticity data may correspond to chromaticity of a predetermined region including an observation object viewed through the optical device. In this way, by inclusion of brightness data concerning an image, brightness (lightness) of an image displayed can be controlled. By inclusion of chromaticity data concerning an image, chromaticity (color) of an image displayed can be controlled. By inclusion of brightness data and chromaticity data concerning an image, brightness (lightness) and chromaticity (color) of an image displayed can be controlled. In a case where brightness data corresponds to brightness of a predetermined region including an observation object viewed through the optical device, it is only required to set a value of brightness data such that the higher a value of brightness of a predetermined region including an observation object viewed through the optical device is, the higher a value of brightness of an image is (that is, the lighter an image is displayed). Furthermore, in a case where chromaticity data corresponds to chromaticity of a predetermined region including an observation object viewed through the optical device, it is only required to set a value of chromaticity data such that chromaticity of a predetermined region including an observation object viewed through the optical device has a roughly complementary color relationship with chromaticity of an image to be displayed. A complementary color refers to a combination of colors diametrically opposed to each other in a color circle. The complementary color also means a complementary color, for example, green for red, violet for yellow, and orange for blue. The complementary color also means a color to cause a decrease in color saturation by mixing a certain color with another color at an appropriate ratio, for example, white in a case of light and black in a case of an object. However, a complementary property in visual effects in parallel disposition is different from a complementary property in mixing. The complementary color is also referred to as a surplus color, a control color, or an opposite color. However, the opposite color directly indicates a color opposite to a complementary color, whereas a range indicated by the complementary color is slightly wider. A color combination of complementary colors has a synergistic effect for bringing mutual colors into prominence, and this is referred to as complementary color harmony.

The display device or the like of the present disclosure can constitute, for example, a head mounted display (HMD). In addition, this makes it possible to reduce the weight and size of the display device, to largely reduce discomfort when the display device is mounted, and further to reduce manufacturing cost. Alternatively, the display device or the like of the present disclosure can be applied to a head-up display (HUD) disposed in a cockpit of a vehicle or an aircraft, or the like. Specifically, in a HUD in which a virtual image forming region where a virtual image is formed on the basis of light emitted from an image forming device is disposed on a windshield of a cockpit of a vehicle or an aircraft, or the like, or in a HUD in which a combiner having a virtual image formation region where a virtual image is formed on the basis of light emitted from an image forming device is disposed on a windshield of a cockpit of a vehicle or an aircraft, or the like, the virtual image forming region and the combiner only need to overlap with at least a part of a dimming device. The display device or the like of the present disclosure can also be used as a stereoscopic displaying device. In this case, if necessary, it is only required to detachably attach a polarizing plate or a polarizing film to an optical device (for example, light guide plate), or to stick the polarizing plate or the polarizing film to the optical device.

Example 1

Figure 7A:
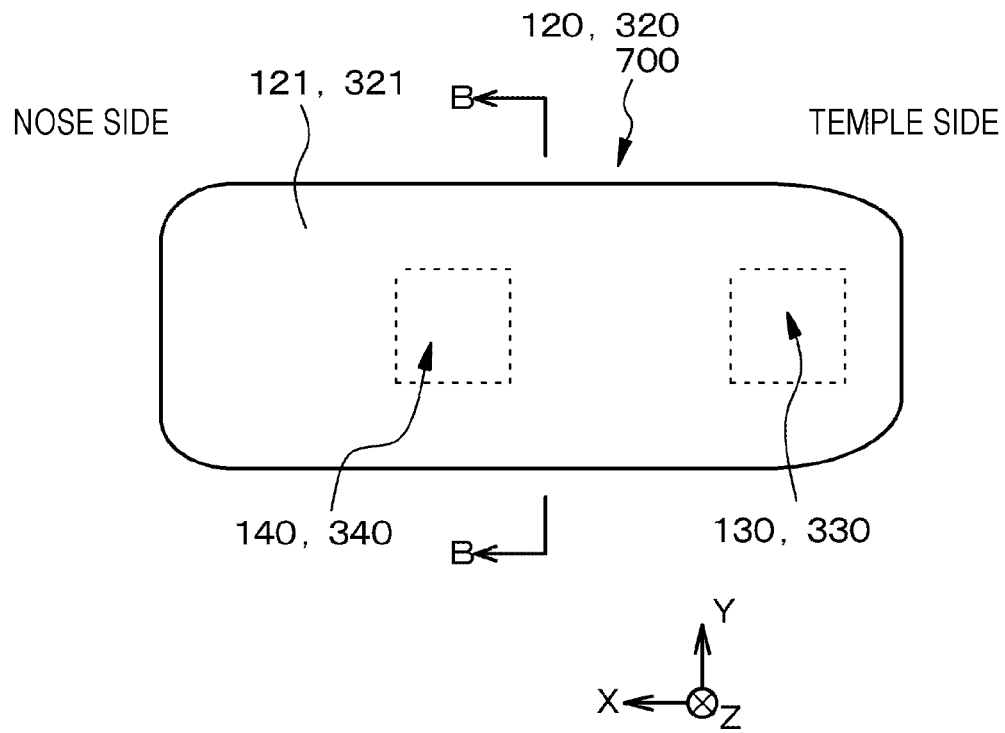
FIG. 7A is a schematic view of a dimming device as viewed from the front.
Figure 7B:
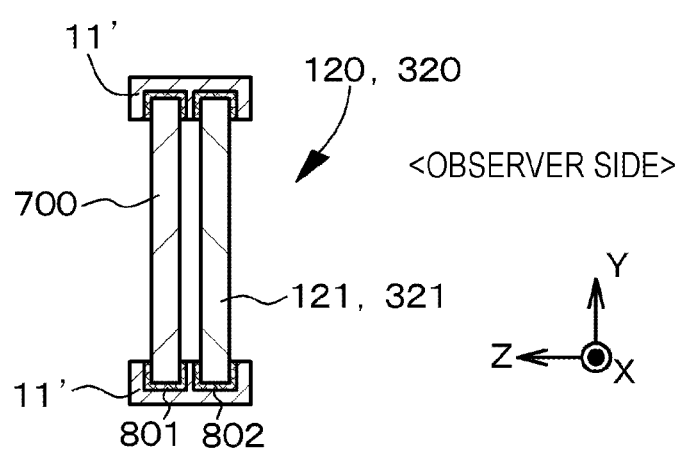
FIG. 7B is a schematic cross-sectional view obtained by cutting a part of the image display device of Example 1 along the arrow B-B (along a YZ plane).
Figure 8A:
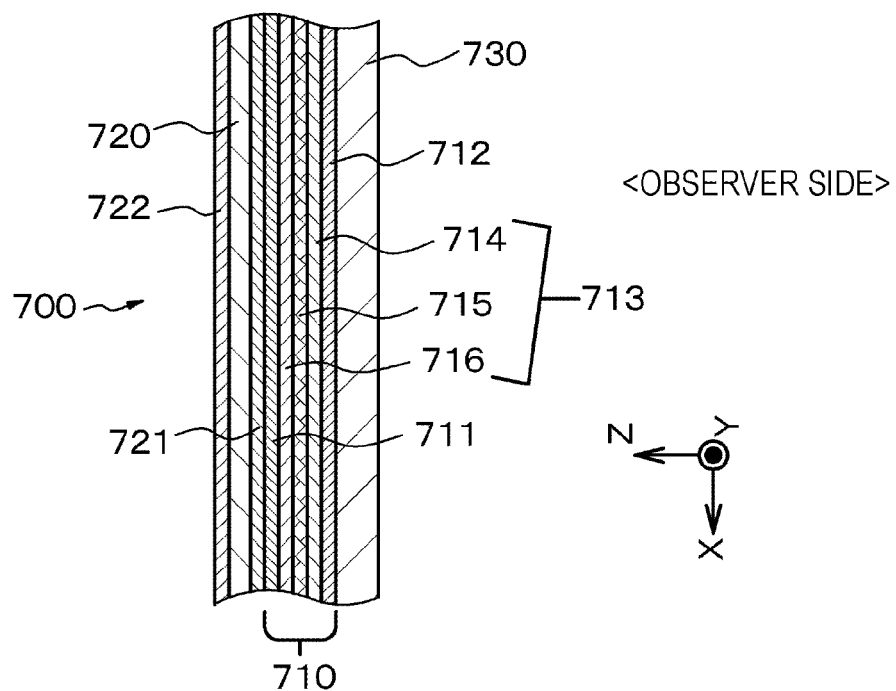
FIG. 8A is a schematic cross-sectional view obtained by cutting a part of a dimming device along an XZ plane.
Figure 8B:
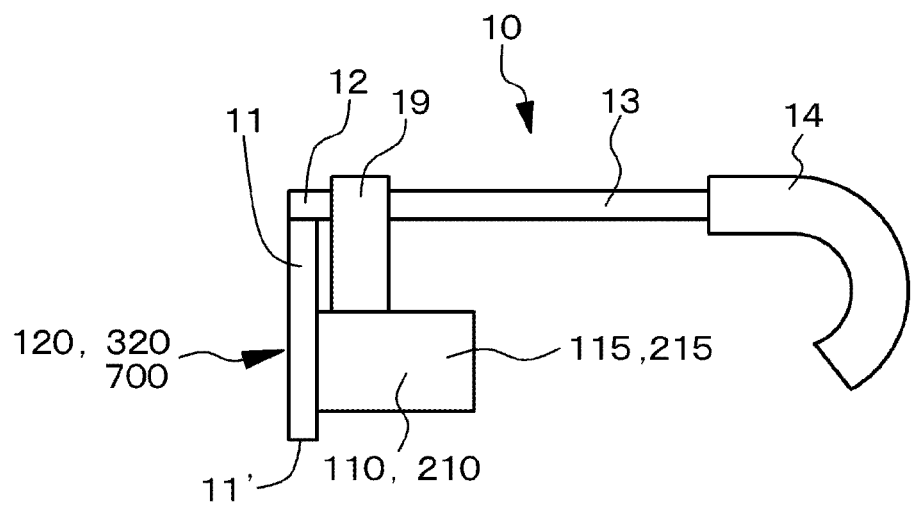
FIG. 8B is a schematic view of a display device as viewed from a side.
Figure 9:
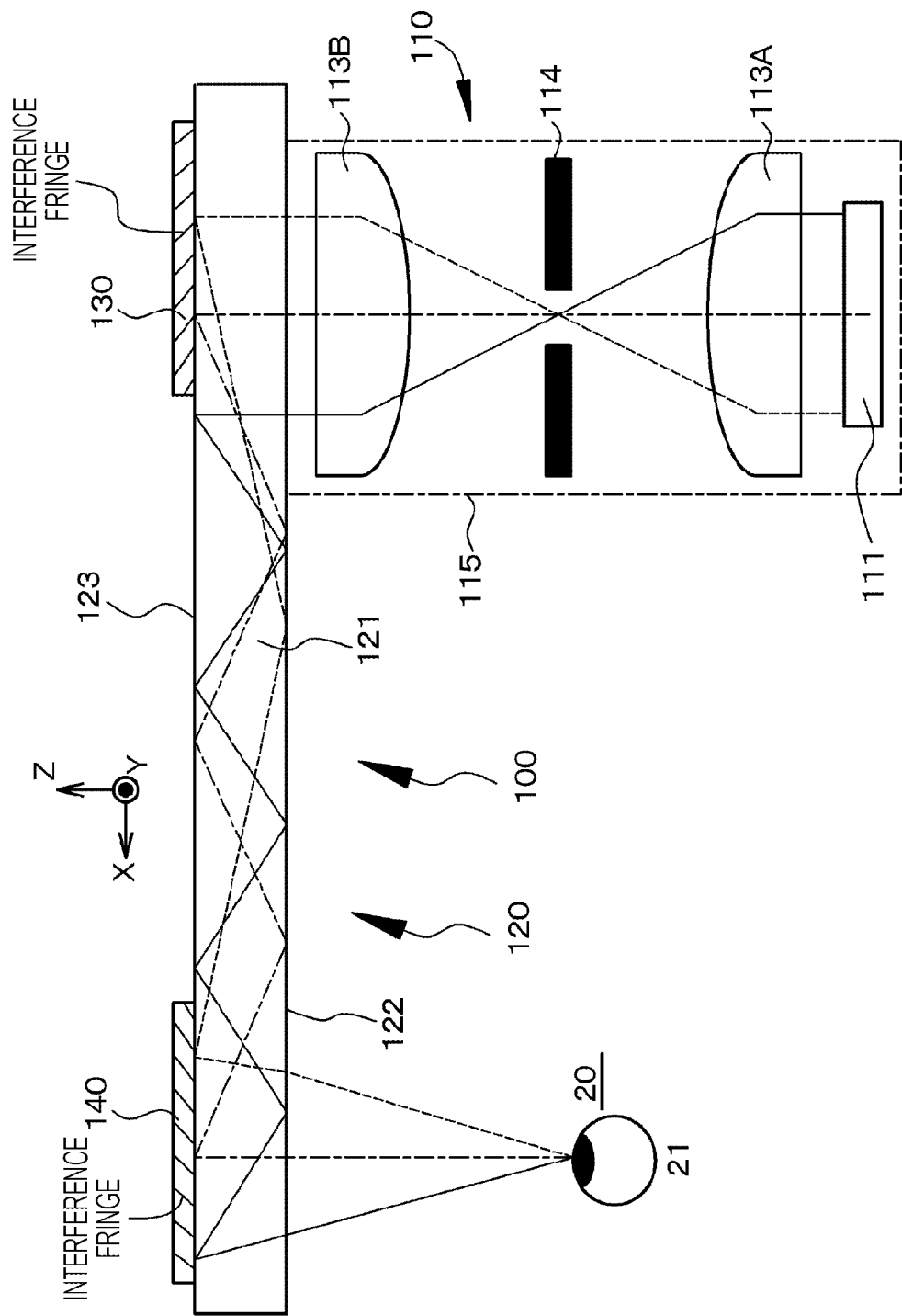
FIG. 9 is a conceptual diagram of the image display device of Example 1.
Figure 10:
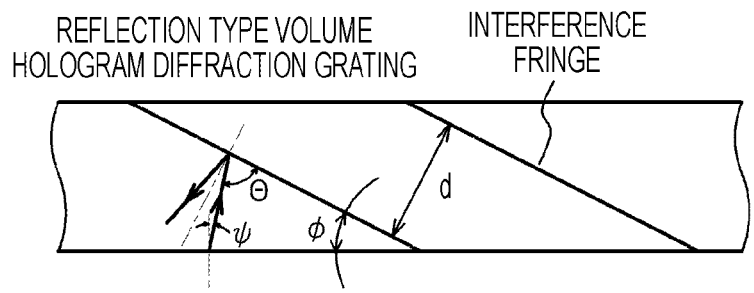
FIG. 10 is a schematic cross-sectional view illustrating a part of a reflection type volume hologram diffraction grating in an enlarged manner.
Figure 11:
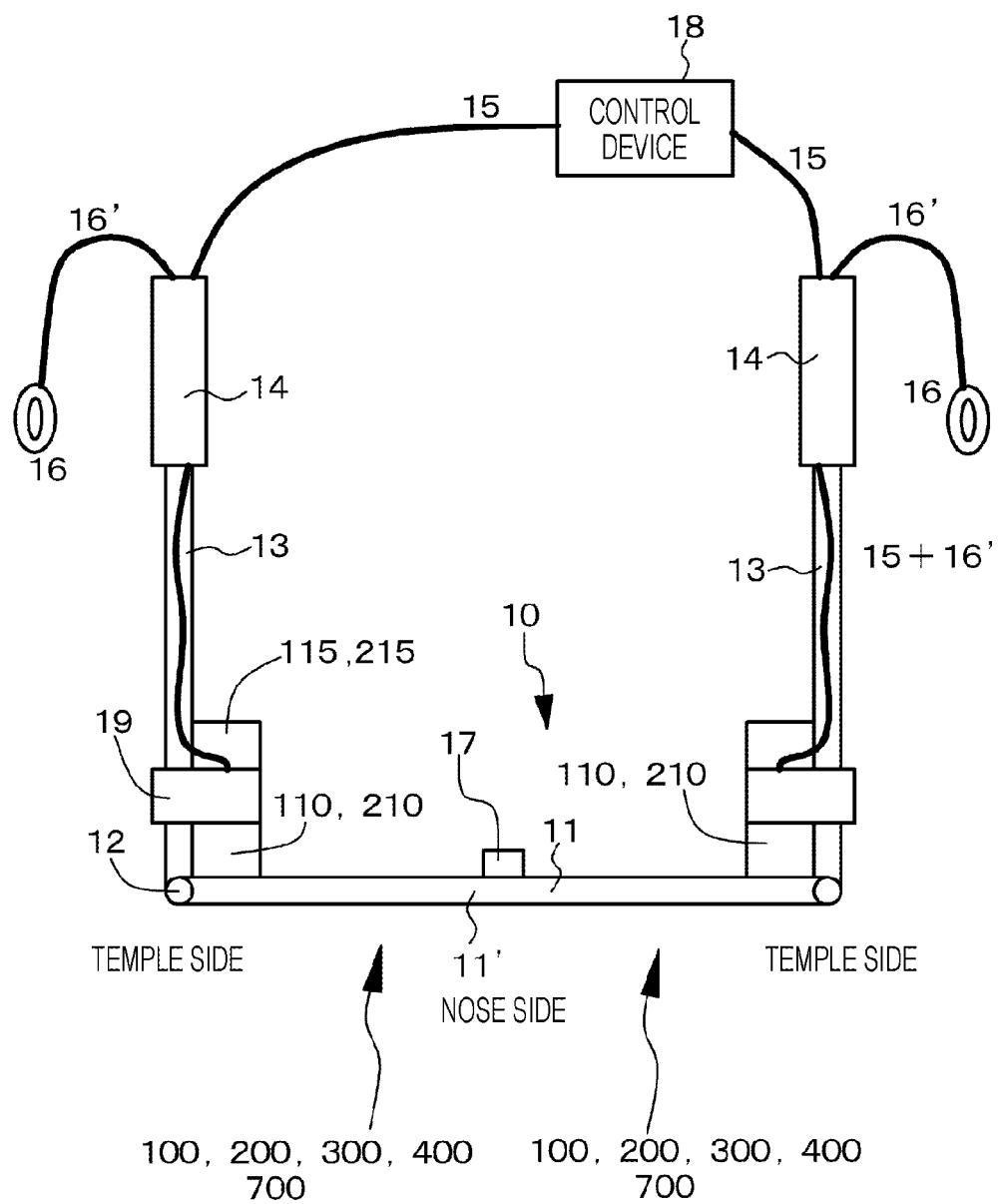
FIG. 11 is a schematic view of a display device of Example 1 as viewed from above.
Figure 12:
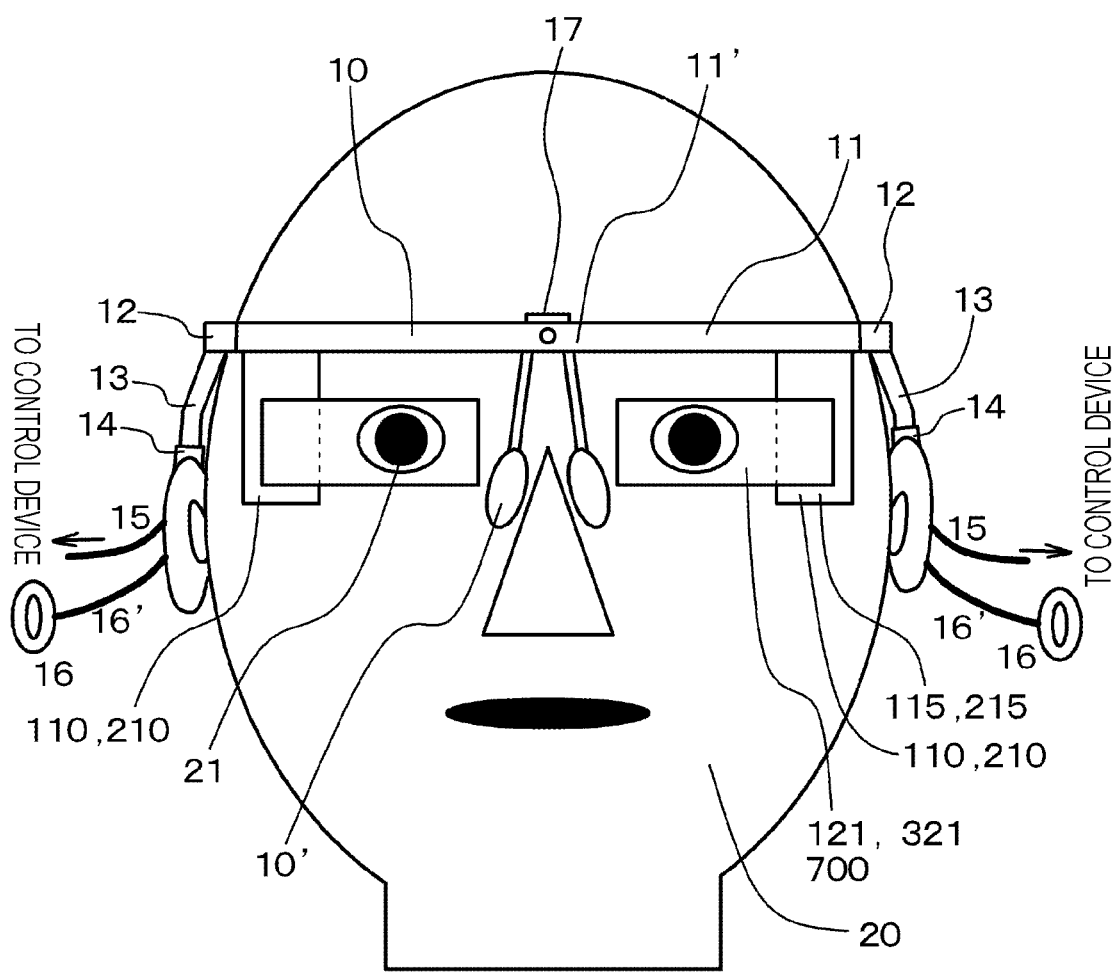
FIG. 12 is a schematic view of the display device of Example 1 as viewed from the front.

Example 1 relates to the image display device of the present disclosure and the display device (specifically, head mounted display (HMD)) of the present disclosure, specifically to the optical device with first structure (more specifically, optical device with structure 1-B) and a display device including the image forming device with first configuration. Furthermore, Example 1 relates to the dimming device of the present disclosure. FIG. 1A illustrates a schematic cross-sectional view obtained by cutting a part of the image display device of Example 1 along an XZ plane. FIG. 7A illustrates a schematic view of the dimming device as viewed from the front. FIG. 7B illustrates a schematic cross-sectional view obtained by cutting a part of the image display device of Example 1 along the arrow B-B, that is obtained by cutting a part of the image display device of Example 1 along a YZ plane. Furthermore, FIG. 8A illustrates a schematic partial cross-sectional view of the dimming device. FIG. 8B illustrates a schematic view of the display device as viewed from a side. Furthermore, FIG. 9 illustrates a conceptual diagram of the image display device of Example 1. FIG. 10 illustrates a schematic cross-sectional view illustrating a part of a reflection type volume hologram diffraction grating in an enlarged manner. FIG. 11 illustrates a schematic view of the display device of Example 1 as viewed from above. FIG. 12 illustrates a schematic view of the display device of Example 1 as viewed from the front.

An image display device 100, 200, 300, 400, 500 of Example 1 or Examples 2 to 8 described later includes:

(a) an image forming device 110, 210;

(b) an optical device 120, 320, 520 having a virtual image forming region where a virtual image is formed on the basis of light emitted from the image forming device 110, 210; and (c) a dimming device 700 for adjusting the amount of external light incident from the outside, disposed so as to face the virtual image forming region and to be away from the optical device 120, 320, 520. In addition, the dimming device 700 includes:

(c-1) a transparent protective substrate (support substrate) 720 on which external light is incident;

(c-2) a dimming layer 710 formed on a surface of the protective substrate 720 facing the optical device 120, 320, 520; and (c-3) a moisture-retaining layer 730 formed on the dimming layer 710. The optical device 120, 320, 520 is a see-through type (semi-transmission type) device. Furthermore, the image forming device 110, 210 displays an image (virtual image) of a single color (for example, green). A connector (not illustrated) is attached to the dimming device 700, and the dimming device 700 is electrically connected to a control circuit (specifically, control device 18 described later) for controlling the light shielding ratio of the dimming device 700 via the connector and wiring.

Furthermore, a display device of Example 1 or Examples 2 to 4 described later is more specifically a head mounted display (HMD), and includes:

(A) a frame 10 (for example, eyeglasses type frame 10) to be mounted on a head of an observer 20; and (B) an image display device attached to the frame 10.

The image display device is constituted by the image display device 100, 200, 300, 400 of Example 1 or Examples 2 to 4 described later. Each of the display devices of Examples is specifically a binocular type device including two image display devices, but may be a single eye type device including one image display device. The display device is a direct drawing type display device for directly drawing an image on a pupil 21 of an observer 20.

In addition, at least an edge portion of the protective substrate 720 is fixed to the frame 10 (specifically, for example, a rim portion 11'). In addition, the edge portion of the protective substrate 720 is fixed to the frame 10 (specifically, the rim portion 11') via an adhesive 801 capable of transmitting water vapor. An edge portion of a light guide plate 121, 321 described later is also fixed (bonded) to the frame 10 (specifically, the rim portion 11') via an adhesive 802 capable of transmitting water vapor. The adhesive 801, 802 is constituted by, for example, a silicone rubber-based adhesive. A value of moisture transmittance of the adhesive 801, 802 is $2.6 \times 10^2$ g/m²·day.

In Example 1 or Examples 2 to 8 described later, the optical device 120, 320, 520 overlaps with at least a part of the dimming device 700 which is a kind of optical shutter. Specifically, in the example illustrated in FIG. 1A, the optical device 120, 320, 520 overlaps with the dimming device 700. In other words, the light guide plate 121, 321 has the same (or substantially the same) outer shape as the protective substrate 720. However, the present disclosure is not limited thereto. The optical device 120, 320, 520 may overlap with a part of the dimming device 700, or the dimming device 700 may overlap with a part of the optical device 120, 320, 520. The dimming device 700 overlaps with a large part of the light guide plate 121, 321. Furthermore, from an observer side, the optical device 120, 320, 520 and the dimming device 700 are disposed in this order, but the dimming device 700 and the optical device 120, 320, 520 may be disposed in this order.

The protective substrate 720 is constituted by, for example, a polyethylene terephthalate resin having a thickness of 0.5 mm and has a moisture transmittance of $10^{-2}$ g/m$^2$·day or less, specifically $2 \times 10^{-4}$ g/m$^2$·day. Furthermore, the moisture-retaining layer 730 contains an epoxy-based resin (containing an amine-based curing agent), and has a water absorption of, for example, 0.5% by mass to 2% by mass. In Example 1, a water vapor barrier layer 721 containing, for example, aluminum oxide ($Al_2O_3$) having a thickness of 50 nm is formed between the protective substrate 720 and the dimming layer 710. A hard coat layer 722 containing acrylic modified colloidal silica particles, phenyl ketone-based and acrylic organic substances, and methyl ethyl ketone is formed on an outer surface of the protective substrate 720.

The dimming device 700 is constituted by an optical shutter to which a color change of a substance generated by a redox reaction of an electrochromic material is applied. Specifically, the dimming layer includes an electrochromic material. In other words, the dimming layer 710 constituting the dimming device 700 includes an electrochromic material layer. Specifically, the dimming layer 710 has a laminated structure of a first electrode 711, an electrochromic material layer 713, and a second electrode 712. The electrochromic material layer 713 has a laminated structure of a reduction coloring layer 714, an electrolyte layer 715, and an oxidation coloring layer 716. More specifically, each of the first electrode 711 and the second electrode 712 is constituted by a transparent conductive material such as ITO. The reduction coloring layer 714 is constituted by a $WO_3$ layer. The electrolyte layer 715 is constituted by a $Ta_2O_5$ layer. The oxidation coloring layer 716 is constituted by an $Ir_XSn_{1-X}O$ layer. The $WO_3$ layer reductively develops a color. Furthermore, the $Ir_XSn_{1-X}O$ layer oxidatively develops a color. The first electrode 711 and the second electrode 712 constituted by ITO are not patterned but are so-called solid electrodes. The first electrode 711 and the second electrode 712 are connected to a connector (not illustrated) via a wiring layer (not illustrated), and are further electrically connected to the control device 18 via wiring (not illustrated).

In the $Ir_XSn_{1-X}O$ layer, Ir and $H_2O$ react with each other, and exist as iridium hydroxide $Ir(OH)_n$. If a negative potential is applied to the first electrode 711 and a positive potential is applied to the second electrode 712, a proton $H^+$ moves from the $Ir_XSn_{1-X}O$ layer to the $Ta_2O_5$ layer, an electron is released to the second electrode 712, the following oxidation reaction proceeds, and the $Ir_XSn_{1-X}O$ layer is colored.

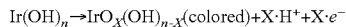

Meanwhile, a proton $H^+$ in the $Ta_2O_5$ layer moves into the $WO_3$ layer, and an electron is injected from the first electrode 711 into the $WO_3$ layer. In the $WO_3$ layer, the following reduction reaction proceeds, and the $WO_3$ layer is colored.

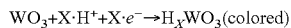

Conversely, if a positive potential is applied to the first electrode 711 and a negative potential is applied to the second electrode 712, in the $Ir_XSn_{1-X}O$ layer, a reduction reaction proceeds in the opposite direction to the above, and decoloring occurs. In the $WO_3$ layer, an oxidation reaction proceeds in the opposite direction to the above, and decoloring occurs. The $Ta_2O_5$ layer contains $H_2O$. $H_2O$ is ionized by applying a voltage to the first electrode and the second electrode. The $Ta_2O_5$ layer includes a proton $H^+$ and an $OH^-$ ion, contributing to a coloring reaction and a decoloring reaction.

The optical device 120, 320 of Example 1 or Examples 2 to 4 described later has a first structure, and includes:

(b-1) the light guide plate 121, 321 in which light incident from the image forming device 110, 210 is propagated by total reflection through the inside, and then the light is emitted toward the observer 20;

(b-2) a first deflecting unit 130, 330 for deflecting light incident on the light guide plate 121, 321 such that the light incident on the light guide plate 121, 321 is totally reflected inside the light guide plate 121, 321; and (b-3) a second deflecting unit 140, 340 for deflecting light propagated by total reflection through the inside of the light guide plate 121, 321 and emitting the light from the light guide plate 121, 321. In addition, the second deflecting unit 140, 340 forms a virtual image forming region of the optical device. Furthermore, the second deflecting unit (virtual image forming region) 140, 340 is located in a projection image of the dimming device 700.

In Example 1 or Examples 2 to 8 described later, the light guide plate 121, 321 containing an optical glass or a plastic material has two parallel surfaces (first surface 122, 322 and a second surface 123, 323) extending parallel to a light propagation direction (X direction) due to total internal reflection of the light guide plate 121, 321. The first surface 122, 322 faces the second surface 123, 323. In addition, parallel light is incident on the first surface 122, 322 corresponding to a light incident surface, propagated by total reflection through the inside, and then emitted from the first surface 122, 322 corresponding to a light emission surface. However, the present disclosure is not limited thereto. The light incident surface may be constituted by the second surface 123, 323, and the light emission surface may be constituted by the first surface 122, 322.

In Example 1, the optical device is the optical device with structure 1-B, and the image display device is the image forming device with first configuration. Specifically, the first deflecting unit and the second deflecting unit are disposed on (specifically, stuck to) a surface of the light guide plate 121 (specifically, the second surface 123 of the light guide plate 121). In addition, the first deflecting unit diffracts and reflects light incident on the light guide plate 121, and the second deflecting unit diffracts and reflects light propagated by total reflection through the inside of the light guide plate 121. Each of the first deflecting unit and the second deflecting unit is constituted by a diffraction grating element, specifically a reflection type diffraction grating element, more specifically a reflection type volume hologram diffraction grating. In the following description, a first deflecting unit constituted by a hologram diffraction grating is referred to as a "first diffraction grating member 130" for convenience, and a second deflecting unit constituted by a hologram diffraction grating is referred to as a "second diffraction grating member 140" for convenience.

In addition, in Example 1 or Example 2 described later, each of the first diffraction grating member 130 and the second diffraction grating member 140 is constituted by a single diffraction grating layer. In each diffraction grating layer containing a photopolymer material, an interference fringe corresponding to one type of wavelength band (or wavelength) is formed, and is manufactured by a conventional method. A pitch of the interference fringe formed in the diffraction grating layer (optical diffraction element) is constant, and the interference fringe is linear and parallel to the direction. The axes of the first diffraction grating member 130 and the second diffraction grating member 140 are parallel to the X direction, and the normal lines thereof are parallel to the Z direction.

FIG. 10 illustrates a schematic cross-sectional view illustrating a part of a reflection type volume hologram diffraction grating in an enlarged manner. In the reflection type volume hologram diffraction grating, an interference fringe having an inclination angle (slant angle) φ is formed. The inclination angle φ refers to an angle formed by a surface of the reflection type volume hologram diffraction grating and an interference fringe. The interference fringe is formed from the inside to a surface of the reflection type volume hologram diffraction grating. The interference fringe satisfies a Bragg condition. The Bragg condition means a condition satisfying the following formula (A). In formula (A), m represents a positive integer, λ represents a wavelength, d represents a pitch of a lattice plane (an interval in a normal direction of a virtual plane including an interference fringe), and Θ represents a complementary angle of an angle incident on the interference fringe. Furthermore, a relationship among Θ, an inclination angle φ, and an incident angle ψ in a case where light enters a diffraction grating member at the incident angle ψ is as illustrated in formula (B).

$$m \cdot \lambda = 2 \cdot d \cdot \sin(\Theta) \tag{A}$$

$$\Theta = 90° - (\varphi + \psi) \tag{B}$$

As described above, the first diffraction grating member 130 is disposed on (bonded to) the second surface 123 of the light guide plate 121, and diffracts and reflects parallel light incident on the light guide plate 121 from the first surface 122 such that the parallel light incident on the light guide plate 121 is totally reflected inside the light guide plate 121. Furthermore, as described above, the second diffraction grating member 140 is disposed on (bonded to) the second surface 123 of the light guide plate 121, diffracts and reflects the parallel light propagated by total reflection through the inside of the light guide plate 121, and emits the parallel light from the first surface 122 of the light guide plate 121 in the form of parallel light.

In addition, the parallel light is propagated by total reflection through the inside of the light guide plate 121 and then emitted. At this time, the light guide plate 121 is thin, and a path through which light travels inside the light guide plate 121 is long. Therefore, the number of times of total reflection before the light reaches the second diffraction grating member 140 differs depending on an angle of view. More specifically, in the parallel light incident on the light guide plate 121, the number of times of reflection of the parallel light incident at an angle in a direction approaching the second diffraction grating member 140 is smaller than the number of times of reflection of the parallel light incident on the light guide plate 121 at an angle in a direction away from the second diffraction grating member 140. This is because the parallel light diffracted and reflected by the first diffraction grating member 130 and incident on the light guide plate 121 at an angle in a direction approaching the second diffraction grating member 140 has a smaller angle formed with the normal line of the light guide plate 121 when light propagated through the inside of the light guide plate 121 collides with an inner surface of the light guide plate 121 than the parallel light incident on the light guide plate 121 at an angle in the opposite direction thereto. Furthermore, the shape of an interference fringe formed inside the second diffraction grating member 140 and the shape of an interference fringe formed inside the first diffraction grating member 130 have a symmetrical relationship with respect to a virtual plane perpendicular to the axis of the light guide plate 121. A surface of each of the first diffraction grating member 130 and the second diffraction grating member 140 not facing the light guide plate 121 may be covered with a transparent resin plate or a transparent resin film, and the first diffraction grating member 130 and the second diffraction grating member 140 may be prevented from being damaged. Furthermore, a transparent protective film may be stuck to the first surface 122 to protect the light guide plate 121.

Basically, the light guide plate 121 in Example 2 described later has the same configuration and structure as those of the above-described light guide plate 121.

In Example 1 or Example 3 described later, the image forming device 110 is the image forming device with first configuration and has a plurality of pixels arranged in a two-dimensional matrix. Specifically, the image forming device 110 is constituted by an organic EL display device 111. Light emitted from the organic EL display device 111 passes through a first convex lens 113A constituting a lens system, further passes through a second convex lens 113B constituting the lens system, and is converted into parallel light to travel toward the light guide plate 121. A front focal point $f_{2F}$ of the second convex lens 113B is located at a rear focal point $f_{1B}$ of the first convex lens 113A. Furthermore, a diaphragm 114 is disposed at the position of the rear focal point $f_{1B}$ of the first convex lens 113A (the front focal point $f_{2F}$ of the second convex lens 113B). The diaphragm 114 corresponds to an image emitting portion. The entire image forming device 110 is housed in a casing 115. The organic EL display device 111 includes a plurality of (for example, 640×480) pixels (organic EL elements) arranged in a two-dimensional matrix.

The frame 10 includes a front portion 11 disposed in front of the observer 20, two temple portions 13 rotatably attached to both ends of the front portion 11 via hinges 12, and a modern portion (also referred to as a leading cell, an earmuff, or an ear pad) 14 attached to a distal end portion of each of the temple portions 13. Furthermore, a nose pad 10' (refer to FIG. 12) is attached. In other words, basically, an assembly of the frame 10 and the nose pad 10' has substantially the same structure as ordinary eyeglasses. Furthermore, each casing 115 is attached to each of the temple portions 13 by an attachment member 19. The frame 10 is manufactured from metal or plastic. Each casing 115 may be detachably attached to each of the temple portions 13 by the attachment member 19. Furthermore, for an observer owing and wearing eyeglasses, each casing 115 may be detachably attached to each of the temple portions 13 of the frame 10 of the eyeglasses owned by the observer by the attachment member 19. Each casing 115 may be attached to the outside or the inside of each of the temple portions 13. Alternatively, the light guide plate 121 may be fitted in the rim portion 11' included in the front portion 11.

Furthermore, wiring (signal line, power supply line, or the like) 15 extending from one of the image forming devices 110, 210 extends to the outside from a distal end portion of the modern portion 14 via each of the temple portions 13 and the inside of the modern portion 14, and is connected to a control device (control circuit or control unit) 18. Each of the image forming devices 110, 210 includes a headphone portion 16. Headphone portion wiring 16' extending from each of the image forming devices 110, 210 extends from a distal end portion of the modern portion 14 to the headphone portion 16 via each of the temple portions 13 and the inside of the modern portion 14. More specifically, the headphone portion wiring 16' extends from a distal end portion of the modern portion 14 to the headphone portion 16 so as to go around a back side of the auricle (auditory capsule). With such a configuration, an impression that the headphone portion 16 or the headphone portion wiring 16' is disorderedly disposed is not given, and a simple display device can be obtained. As described above, the wiring (signal line, power supply line, or the like) 15 is connected to the control device (control circuit) 18, and the control device 18 performs processing for image display. The control device 18 can be constituted by a well-known circuit.

A camera 17 including a solid-state imaging element including a CCD or CMOS sensor and a lens (these are not illustrated) is attached to a central portion of the front portion 11 with a suitable attachment member (not illustrated), if necessary. A signal from the camera 17 is sent to the control device (control circuit) 18 via wiring (not illustrated) extending from the camera 17.

For example, the dimming device 700 can be manufactured by the following method. In other words, first, the protective substrate 720 on which the hard coat layer 722 and the water vapor barrier layer 721 are formed is prepared. Then, the first electrode 711 constituted by ITO having a thickness of 0.35 µm is formed on the water vapor barrier layer 721. Subsequently, the oxidation coloring layer 716 constituted by an $Ir_xSn_{1-x}O$ layer (iridium tin oxide layer) having a thickness of 0.12 µm is formed on the first electrode 711 on the basis of a reactive sputtering method, and the electrolyte layer 715 constituted by a $Ta_2O_5$ layer (tantalum oxide) 715 having a thickness of 0.40 µm is further formed thereon. Subsequently, the reduction coloring layer 714 constituted by a $WO_3$ layer (tungsten oxide) having a thickness of 0.40 µm is formed on the basis of a reactive sputtering method. The oxidation coloring layer 716, the electrolyte layer 715, and the reduction coloring layer 714 can be formed also by a magnetron sputtering method, an anodic oxidation method, a plasma CVD method, a sol-gel method, or the like. During film formation, the oxidation coloring layer 716, the electrolyte layer 715, and the reduction coloring layer 714 may be formed using a metal mask. Thereafter, the second electrode 712 constituted by ITO having a thickness of 0.25 µm is formed on the reduction coloring layer 714. The first electrode 711 and the second electrode 712 can be formed on the basis of a PVD method such as an ion plating method or a vacuum vapor deposition method, a sol-gel method, or a CVD method. During film formation, the first electrode 711 and the second electrode 712 may be formed using a metal mask. Thereafter, a wiring layer (not illustrated) constituted by nickel having a thickness of 0.35 µm is formed by an electron beam vapor deposition method. Subsequently, an epoxy-based resin is mixed with an amine-based curing agent, and the resulting mixture is defoamed for 30 minutes under a reduced pressure environment of $10^{-2}$ Pa or lower. Then, the resulting product is applied onto the second electrode 712, for example, using a dispenser and cured at ambient temperature in the atmosphere to form the moisture-retaining layer 730. The resulting product can be also applied using a flow coater, a spin coater, screen printing, a gravure coater, or the like. In this way, the dimming device 700 can be obtained. The obtained dimming device 700 is stored for 12 hours, for example, in an environment of normal temperature/normal humidity. Moisture is retained in the moisture-retaining layer 730 in the previous steps. Moreover, a state in which moisture is transferred to and from an external environment is achieved.

In the display device of Example 1, by applying a DC voltage of 1.8 V between the first electrode 711 and the second electrode 712 for 30 seconds, the total light transmittance in the visible light region was reduced from 76% to 4%. Subsequently, when the application of a voltage to the first electrode 711 and the second electrode 712 was stopped, the total light transmittance was maintained at 8% even after one hour passed. By applying a voltage to a decoloring side in this state, decoloring occurred. Specifically, by applying a DC voltage of 1.8 V for four seconds, the total light transmittance in the visible light region returned to 76%.

A cycle test was performed in which a constant voltage of 1.8 V or −1.8 V was continuously applied between the first electrode 711 and the second electrode 712 at a cycle of 60 seconds. As a result, deterioration of the dimming device was not observed even after 30,000 cycles, and coloring/decoloring was repeated.

Furthermore, when a drying environment having a dew point of −40° C. was formed in a glove box, and the display device was stored in the glove box for 30 days. Thereafter, the display device was driven in the glove box. At this time, it was confirmed that the total light transmittance in the visible light region was 5% or less.

Furthermore, the display device was stored in an environment of 60° C. or higher and 10% RH or less for 32 hours, and then a DC voltage of 1.8 V was applied between the first electrode 711 and the second electrode 712 for 30 seconds. At this time, the total light transmittance in the visible light region was reduced to 7%. Thereafter, the display device was stored in an environment of normal temperature/normal humidity for 10 hours, and then a DC voltage of 1.8 V was applied between the first electrode 711 and the second electrode 712 for 30 seconds. At this time, the total light transmittance in the visible light region was reduced to 4%. In other words, the display device recovered to an initial state.

As described above, each of the image display device and the display device of the present disclosure includes the moisture-retaining layer. Therefore, it is possible to suppress a phenomenon that a color change does not occur in the dimming device when moisture disappears in the dimming device. Therefore, it is possible to provide a dimming device, an image display device, and a display device each having high long-term reliability. Note that even if a side surface of the dimming device is covered with a frame, moisture can be easily exchanged with an external environment. Choices of materials for the protective substrate are not limited. In addition, a hard coat layer, an antireflection layer, and the like are easily formed on the protective substrate.

Figure 1B:
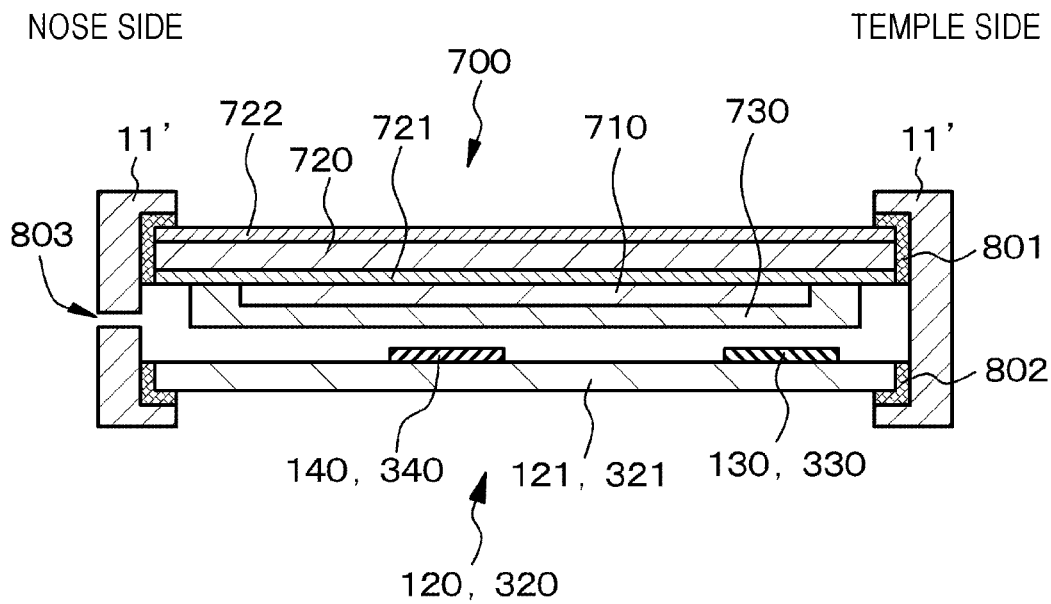

In the above-described dimming device 700, an edge portion of the protective substrate 720 is fixed (bonded) to the frame 10 (specifically, the rim portion 11') via the adhesive 801 capable of transmitting water vapor. However, as illustrated in a schematic cross-sectional view when the dimming device 700 is cut along the XZ plane in FIG. 1B, in addition to this form, or without using the adhesive 801 capable of transmitting water vapor, a through hole 803 may be formed in the frame 10 (specifically, the rim portion 11'), and a space between the dimming device 700 and the optical device 120, 320 may communicate with the outside.

Figure 2A:
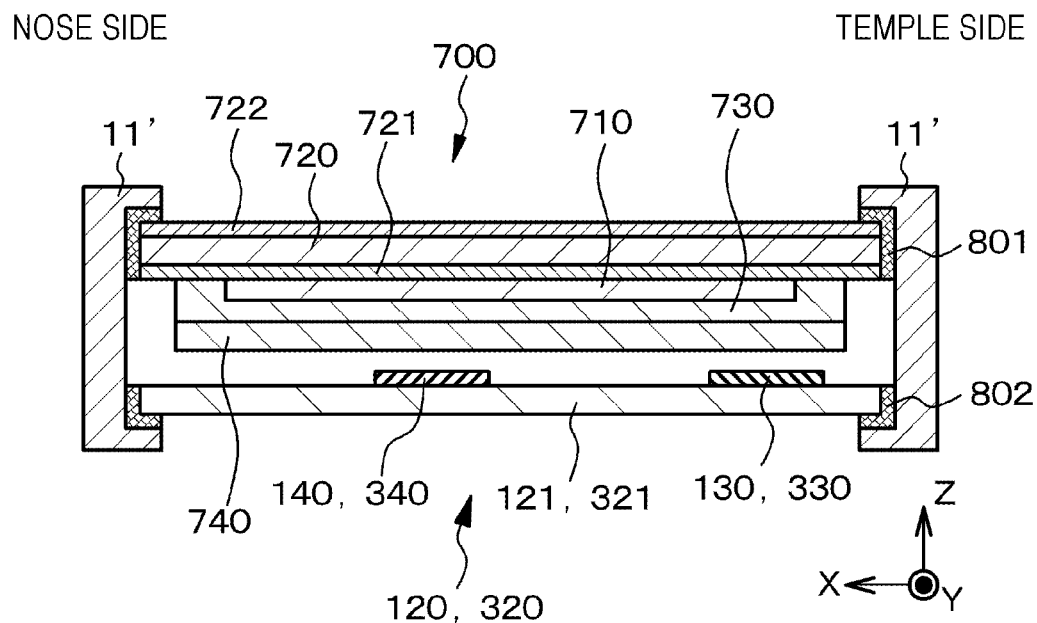
FIGS. 2A and 2B are each a schematic cross-sectional view obtained by cutting a part of a modified example of the image display device of Example 1 along an XZ plane.
Figure 2B:
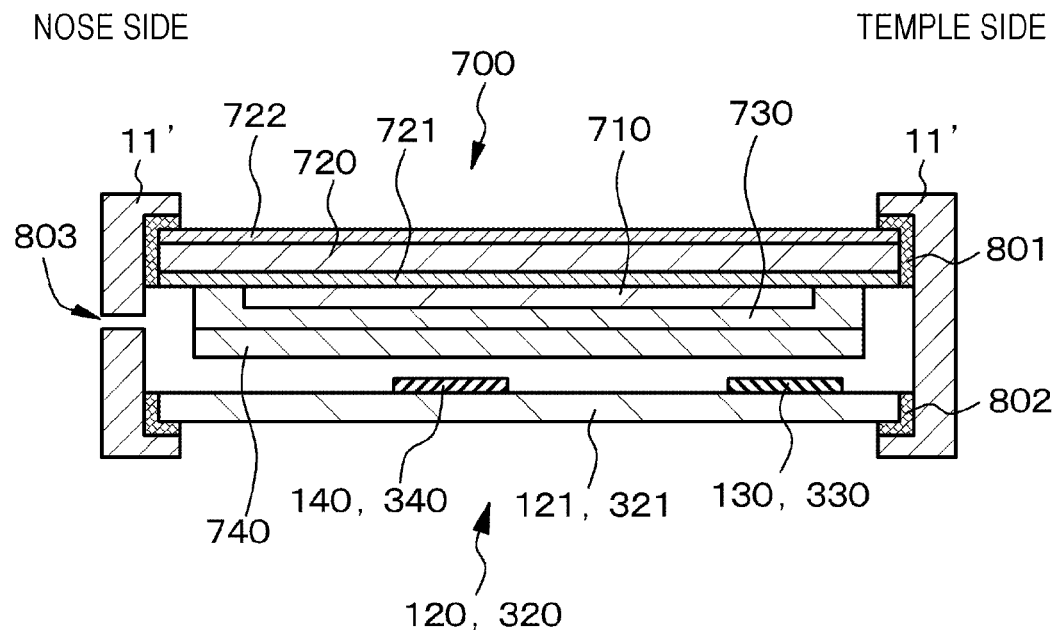
Figure 3A:
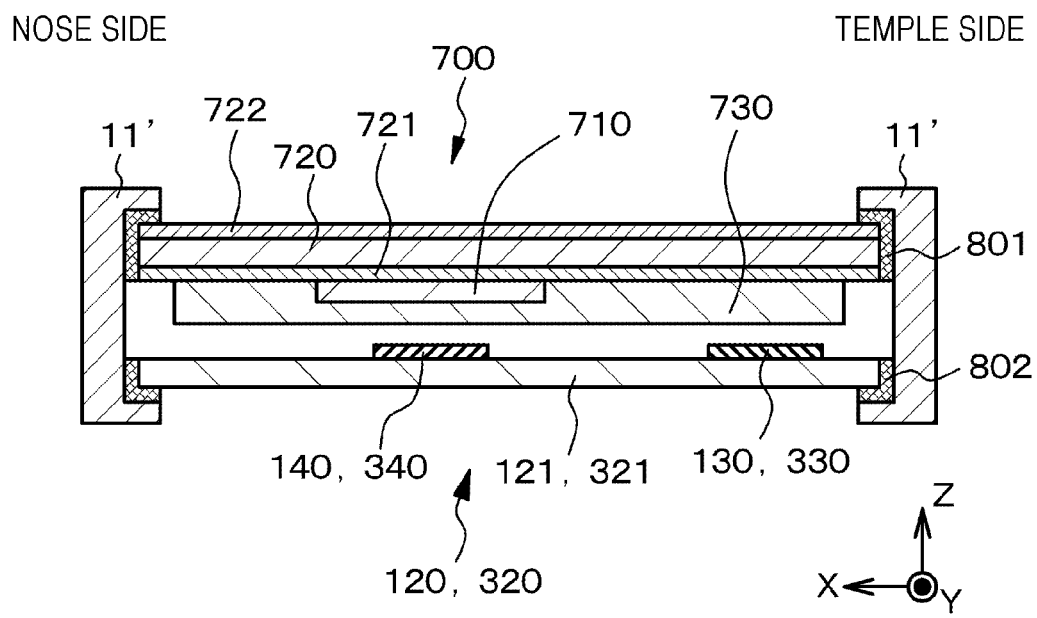
FIGS. 3A and 3B are each a schematic cross-sectional view obtained by cutting a part of a modified example of the image display device of Example 1 along an XZ plane.
Figure 3B:
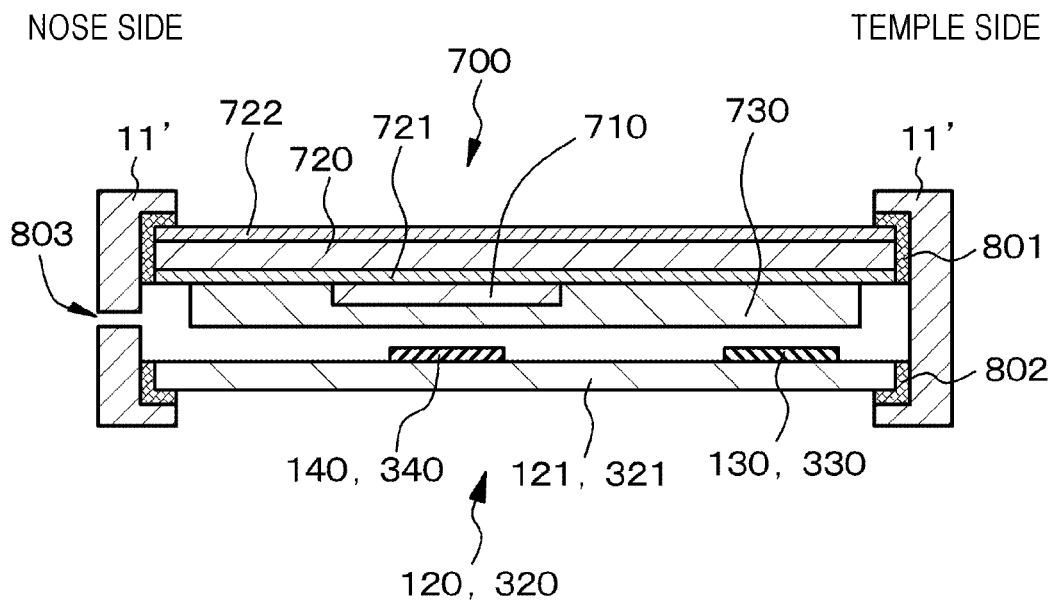
Figure 4A:
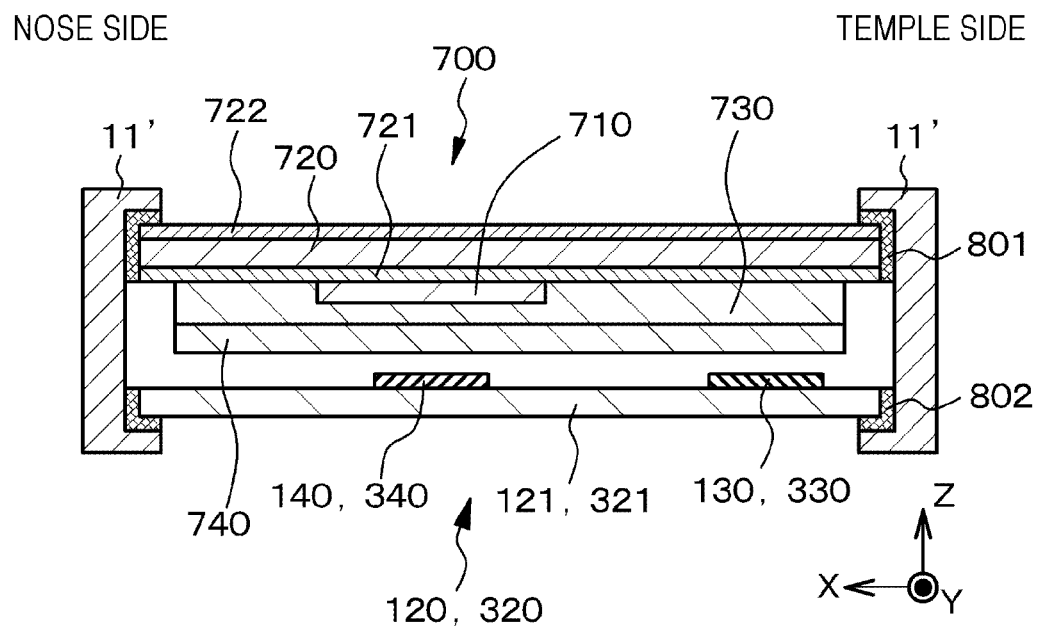
FIGS. 4A and 4B are each a schematic cross-sectional view obtained by cutting a part of a modified example of the image display device of Example 1 along an XZ plane.
Figure 4B:
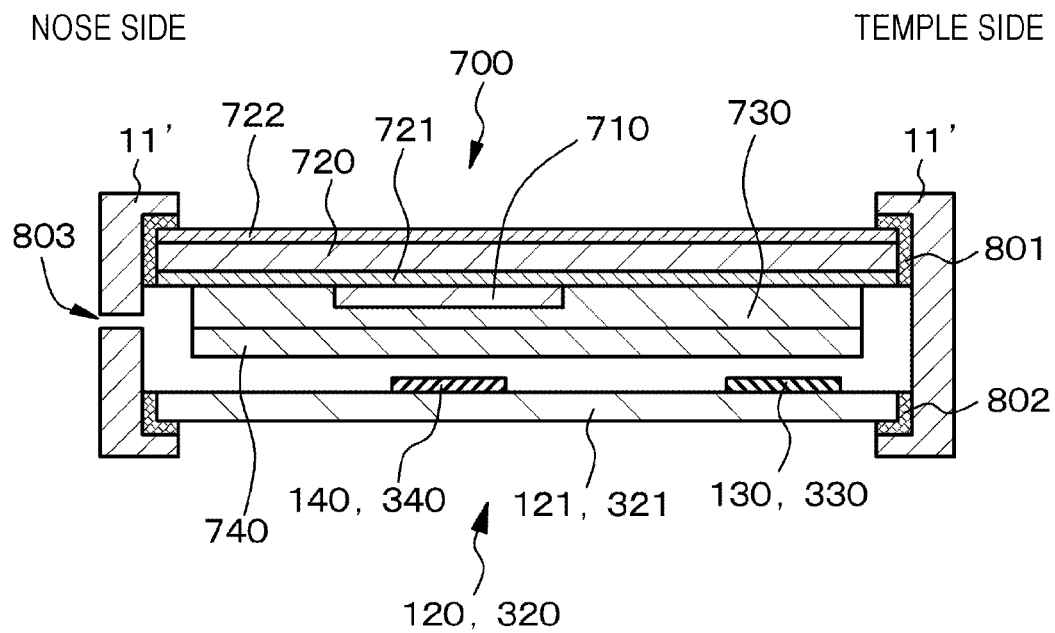
Figure 5A:
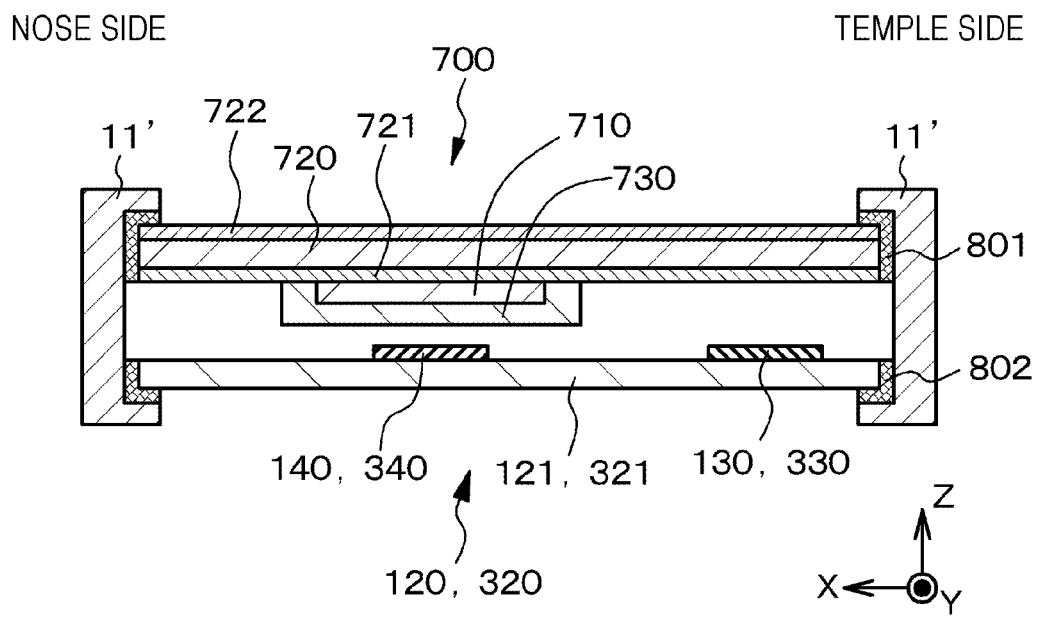
FIGS. 5A and 5B are each a schematic cross-sectional view obtained by cutting a part of a modified example of the image display device of Example 1 along an XZ plane.
Figure 5B:
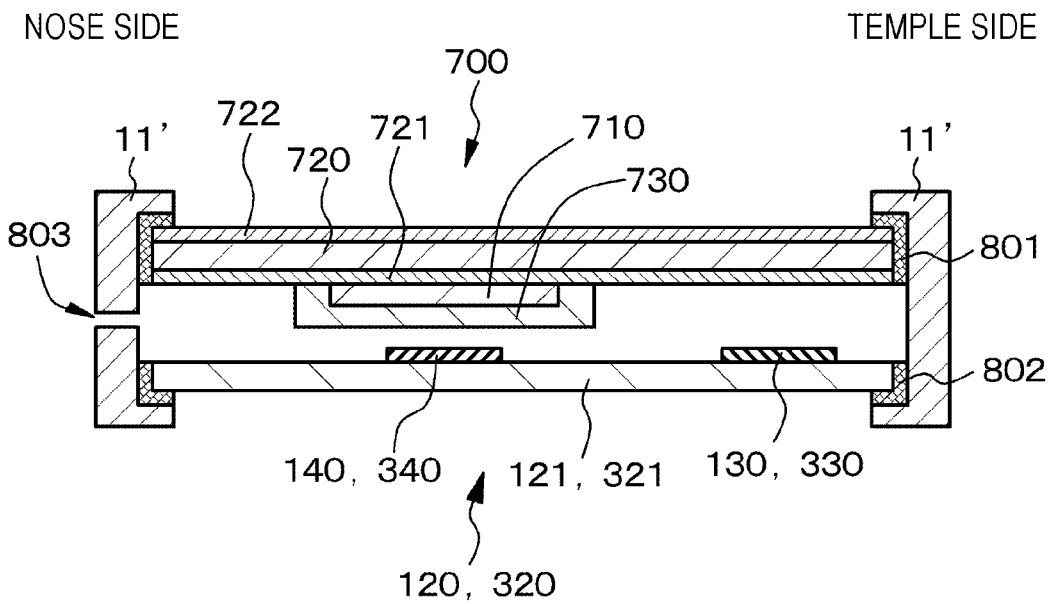
Figure 6A:
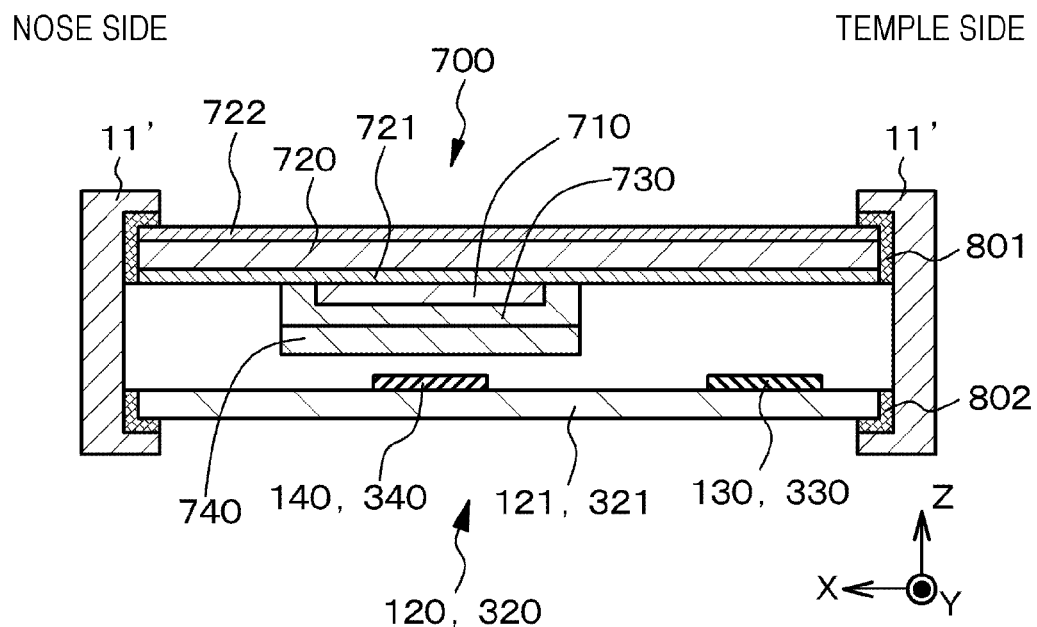
FIGS. 6A and 6B are each a schematic cross-sectional view obtained by cutting a part of a modified example of the image display device of Example 1 along an XZ plane.
Figure 6B:
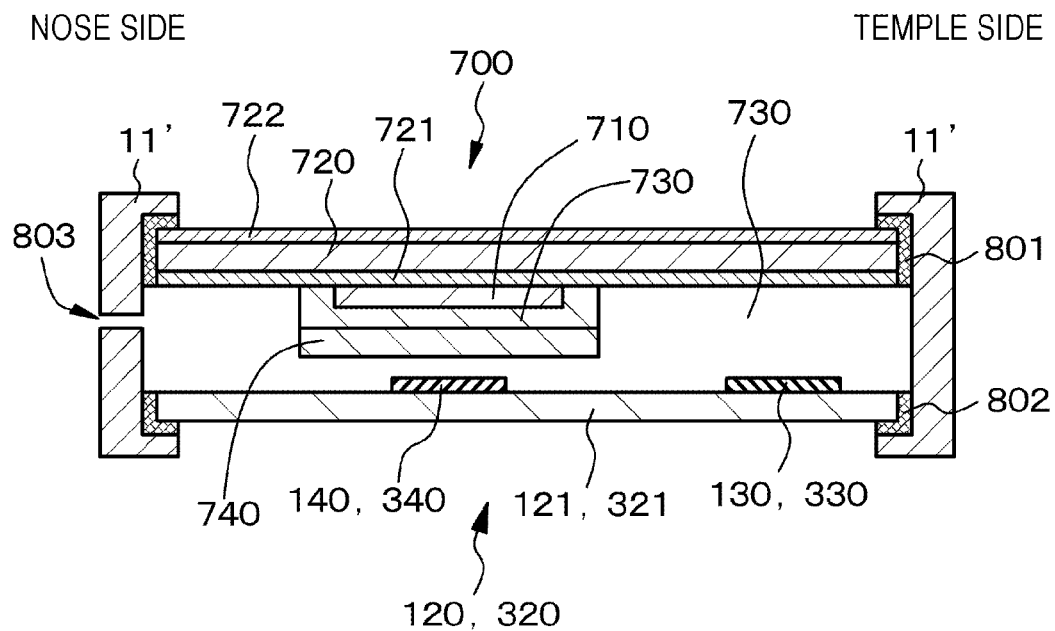

Alternatively, as illustrated in schematic cross-sectional views when the dimming device 700 is cut along the XZ plane in FIGS. 2A and 2B, for example, a water vapor transmissive transparent substrate 740 containing a polycarbonate resin (moisture transmittance: 5×10 g/m²·day) may be disposed on the moisture-retaining layer 730. The moisture transmittance of a material constituting the water vapor transmissive transparent substrate 740 is 10 times or more the moisture transmittance of a material constituting the protective substrate 720. The water vapor transmissive transparent substrate 740 is bonded to the moisture-retaining layer 730 when the moisture-retaining layer 730 is cured. For bonding, it is only required to apply uniform pressure into a plane, for example, using a roller. Furthermore, it is also possible to perform sticking using a sticking apparatus for a display device or a touch panel.

In other words, the dimming device 700 illustrated in FIGS. 2A and 2B is the dimming device of the present disclosure, and includes:

the transparent protective substrate 720 on which external light is incident;

the dimming layer 710 formed on the protective substrate 720;

the moisture-retaining layer 730 formed on the dimming layer 710; and the water vapor transmissive transparent substrate 740 disposed on or above the moisture-retaining layer 730. In the illustrated example, the water vapor transmissive transparent substrate 740 is disposed on the moisture-retaining layer 730.

Alternatively, as illustrated in schematic cross-sectional views when the dimming device 700 is cut along the XZ plane in FIGS. 3A, 3B, 4A, 4B, 5A, 5B, 6A, and 6B, the dimming device 700 may be disposed so as to substantially overlap with a virtual image forming region (second deflecting unit 140, 340) where a virtual image is formed on the basis of light emitted from the image forming device. In other words, the size of the dimming layer 710 may be set to a size capable of forming a virtual image projection region corresponding to a maximum virtual image forming region, or a size slightly larger than the size (for example, a size of about 110% to 150%). Furthermore, as illustrated in schematic cross-sectional views when the dimming device 700 is cut along the XZ plane in FIGS. 5A, 5B, 6A, and 6B, the moisture-retaining layer 730 and the water vapor transmissive transparent substrate 740 may be disposed on the dimming layer 710 or in the vicinity thereof.

Information and data regarding an image to be displayed on the image display device 100, 200, 300, 400, 500 or a signal to be received by a receiving device is recorded, stored, and saved, for example, in a so-called cloud computer or a server. By inclusion of a communication unit (sending/receiving device) such as a mobile phone or a smartphone in the display device or by incorporation of a communication unit (receiving device) into the control device (control circuit or control unit) 18, various kinds of information, data, and signals can be transmitted and exchanged between the cloud computer or the server and the display device via the communication unit, a signal based on various kinds of information and data, that is, a signal for displaying an image in the image display device 100, 200, 300, 400, 500 can be received, and the receiving device can receive the signal.

Specifically, if an observer inputs a request for "information" to be obtained to a mobile phone or a smartphone, the mobile phone or the smartphone accesses a cloud computer or a server to obtain "information" from the cloud computer or the server. In this way, the control device 18 receives a signal for displaying an image in the image display device 100, 200, 300, 400, 500. The control device 18 performs well-known image processing on the basis of this signal, and displays "information" in the image forming device 110 as an image. The "information" is displayed as a virtual image at a predetermined position controlled by the control device 18 on the basis of light emitted from the image forming device 110, 210 in the light guide plate 121, 321. In other words, a virtual image is formed in a part of the virtual image forming region (second deflecting unit 140, 340, or the like).

In addition, in a case where the dimming device 700 is disposed, the dimming device 700 is controlled such that the light shielding ratio of the virtual image projection region of the dimming device 700 including a projected image of a virtual image on the dimming device 700 is higher than the light shielding ratio of another region of the dimming device 700. Specifically, the control device 18 controls voltages applied to the first electrode 711 and the second electrode 712. Here, the size and position of the virtual image projection region of the dimming device 700 are determined on the basis of a signal for displaying an image in the image forming device 110.

In some cases, a signal for displaying an image in the image display device 100, 200, 300, 400, 500 may be stored in the display device (specifically, the control device 18).

Alternatively, an image imaged by the camera 17 included in the display device may be sent to a cloud computer or a server via a communication unit. The cloud computer or the server may retrieve various kinds of information and data corresponding to the image imaged by the camera 17. The various kinds of information and data retrieved may be sent to the display device via the communication unit. An image of the various kinds of information and data retrieved may be displayed on the image display device 100, 200, 300, 400, 500. Furthermore, if input of "information" is performed together with such a form, for example, information such as a place where an observer is located or a direction in which the observer is facing can be weighted. Therefore, "Information" can be displayed on the image forming device 110, 210 with higher accuracy.

The light shielding ratio of the virtual image projection region of the dimming device 700 may be increased before a virtual image is formed on the light guide plate 121, 321 on the basis of light emitted from the image forming device 110, 210. Time from an increase in the light shielding ratio of the virtual image projection region of the dimming device 700 to formation of a virtual image may be 0.5 to 30 seconds, for example, but is not limited thereto. In this way, an observer can recognize in advance where and when a virtual image is formed in the light guide plate, and therefore virtual image visibility of the observer can be improved. The light shielding ratio of the virtual image projection region of the dimming device 700 may increase sequentially as time elapses. In other words, a so-called fade-in state can be formed.

In a case where no virtual image is formed, the light shielding ratio of the entire dimming device 700 only needs to be set to the same value as the light shielding ratio of another region of the dimming device 700. When formation of a virtual image is completed and the virtual image disappears, the light shielding ratio of the virtual image projection region of the dimming device 700 including a projected image of the virtual image on the dimming device 700 may be immediately set to the same value as the light shielding ratio of another region of the dimming device 700, or may be controlled so as to be the same value as the light shielding ratio of another region of the dimming device 700 over time (for example, in three seconds). That is, a so-called fade-out state can be formed.

It is assumed that one virtual image is formed on the light guide plate 121, 321 on the basis of light emitted from the image forming device 110, 210 and subsequently a subsequent virtual image different from the one virtual image is formed. In this case, if the area of the virtual image projection region of the dimming device 700 corresponding to one virtual image is represented by $S_1$ and the area of the virtual image projection region of the dimming device 700 corresponding to a subsequent virtual image is represented by $S_2$, in a case of $S_2/S_1 < 0.8$ or $1 < S_2/S_1$, the virtual image projection region of the dimming device 700 on which a subsequent virtual image is formed may be a region of the dimming device 700 including a projected image of a subsequent virtual image on the dimming device 700, and in a case of $0.8 \leq S_2/S_1 \leq 1$, the virtual image projection region of the dimming device 700 on which a subsequent virtual image is formed may be a region of the dimming device 700 including a projected image of one virtual image on the dimming device 700. In other words, from formation of one virtual image to formation of a subsequent virtual image, in a case where the area of the virtual image projection region is reduced by 0% to 20%, a virtual image projection region corresponding to one virtual image may be held.

Furthermore, assuming a virtual rectangle circumscribed with a virtual image formed in the light guide plate 121, 321, the virtual image projection region of the dimming device 700 may be larger than the virtual rectangle. In addition, in this case, if the lengths of the virtual rectangle circumscribed with a virtual image formed in the light guide plate 121, 321 in a transverse direction and a longitudinal direction are represented by $L_{1-T}$ and $L_{1-L}$, respectively, and the shape of the virtual image projection region of the dimming device 700 is a rectangular shape having lengths of $L_{2-T}$ and $L_{2-L}$ in the transverse direction and the longitudinal direction, respectively, $1.0 \leq L_{2-T}/L_{1-T} \leq 1.5$ and $1.0 \leq L_{2-L}/L_{1-L} \leq 1.5$ are preferably satisfied.

The dimming device 700 may be in an operation state all the time, may be determined to be in an operation/non-operation (ON/OFF) state by instruction (operation) of an observer, or may be normally in a non-operation state while starting operation on the basis of a signal for displaying an image in the image display device 100, 200, 300, 400, 500. In order to determine an operation/non-operation state by instruction (operation) of an observer, for example, the display device only needs to further include a microphone via which a voice is input and the dimming device 700 is thereby controlled. Specifically, switching of operation/non-operation of the dimming device 700 only needs to be controlled according to an instruction based on a real voice of an observer. Alternatively, information to be obtained may be input by voice input. Alternatively, the display device only needs to further include an infrared input/output device to control operation of the dimming device 700. Specifically, switching of operation/non-operation of the dimming device 700 only needs to be controlled by detection of a blink of an observer by the infrared input/output device.

Example 2

Figure 13:
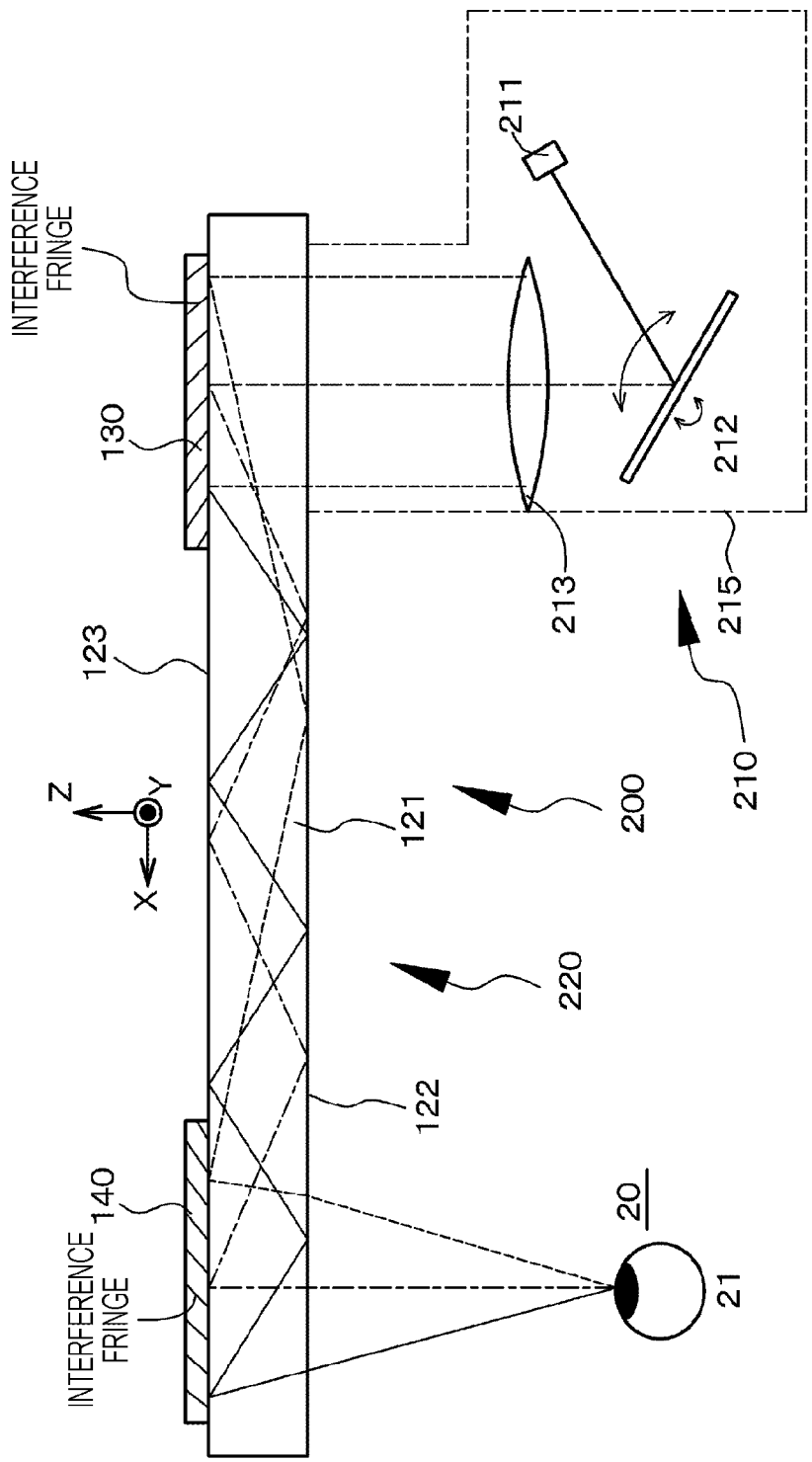
FIG. 13 is a conceptual diagram of an image display device of Example 2.

Example 2 is a modification of Example 1, and relates to the optical device with structure 1-B and the image forming device with second configuration. As illustrated in a conceptual diagram of the image display device 200 in a display device (head mounted display) of Example 2 in FIG. 13, the image forming device 210 of Example 2 is constituted by the image forming device with second configuration. In other words, the image forming device 210 includes a light source 211, a scanning unit 212 for scanning parallel light emitted from the light source 211, and a lens system 213 for converting light emitted from the light source 211 into parallel light. The entire image forming device 210 is housed in a casing 215, and an opening (not illustrated) is formed in the casing 215, and light is emitted from the lens system 213 via the opening. In addition, each casing 215 is detachably attached to each of the temple portions 13 by the attachment member 19. Furthermore, in FIGS. 13, 14, 15, 22, 23, 25A, 25B, 26A, and 26B, a dimming device is not illustrated.

The light source 211 is constituted by, for example, a semiconductor laser element. In addition, light emitted from the light source 211 is converted into parallel light by a lens (not illustrated). The parallel light is horizontally and vertically scanned by the scanning unit 212 including a MEMS mirror that can make a micromirror rotatable in a two-dimensional direction and can scan incident parallel light two-dimensionally, and formed into a kind of two-dimensional image to generate virtual pixels (the number of pixels can be the same as, for example, that of Example 1). Then, then, the light from the virtual pixels (the scanning unit 212 corresponding to an image emitting portion) passes through the lens system 213 having a positive optical power, and a light flux that has been converted into parallel light is incident on the light guide plate 121.

The optical device 120 has the same configuration and structure as those of the optical device described in Example 1. Therefore, a detailed description thereof will be omitted. Furthermore, as described above, the display device of Example 2 has substantially the same configuration and structure as the display device of Example 1 except for a difference in the image forming device 210. Therefore, a detailed description thereof will be omitted.

Example 3

Example 3 is also a modification of Example 1, but relates to the optical device with structure 1-A and the image forming device with first or second configuration.

Figure 14:
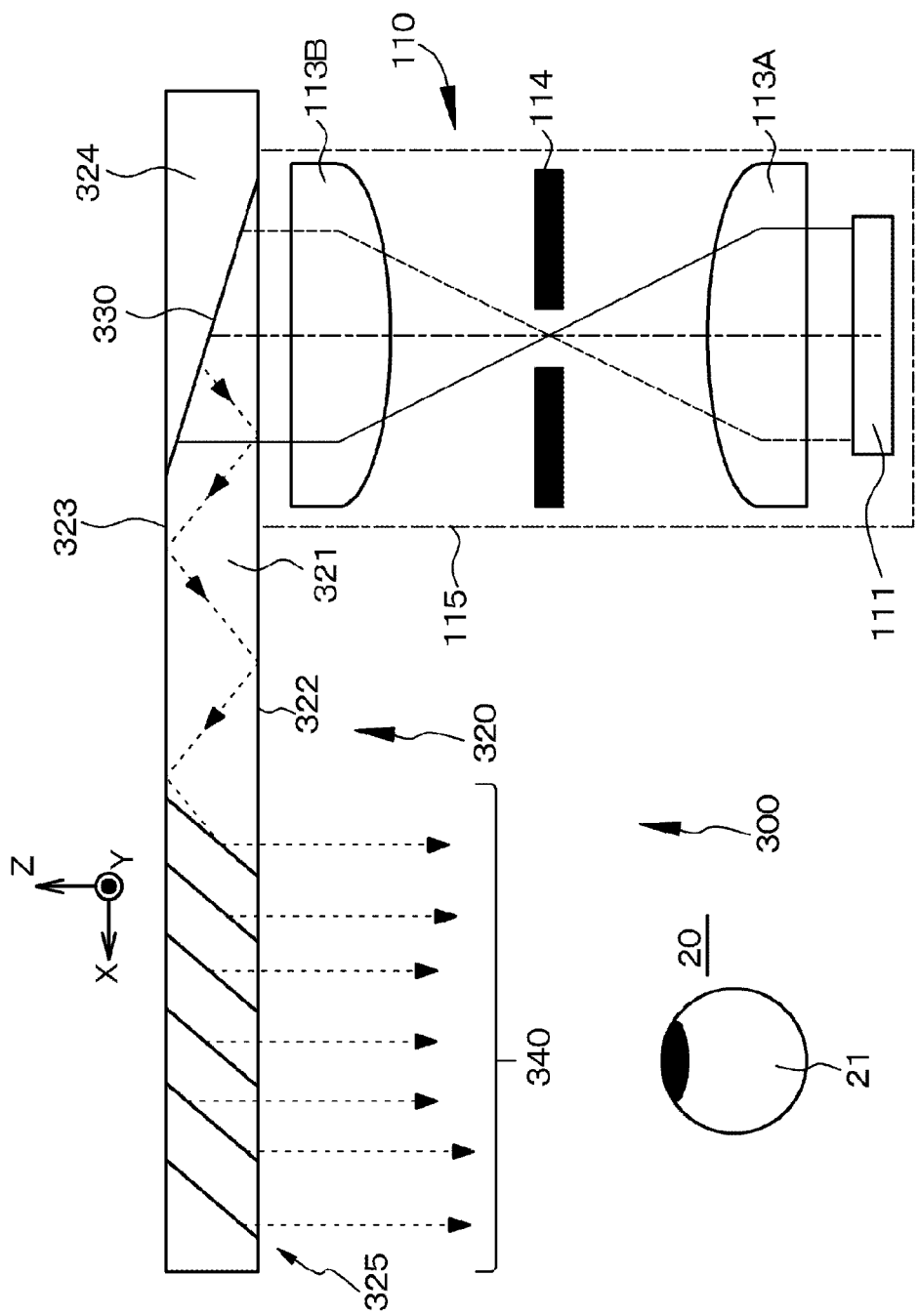
FIG. 14 is a conceptual diagram of an image display device of Example 3 (modified example of Example 1).

As illustrated in a conceptual diagram of the image display device 300 in a display device (head mounted display) of Example 3 in FIG. 14, the first deflecting unit 330 and the second deflecting unit 340 of Example 3 are disposed inside the light guide plate 321. In addition, the first deflecting unit 330 reflects light incident on the light guide plate 321, and the second deflecting unit 340 transmits and reflects light propagated by total reflection through the inside of the light guide plate 321 a plurality of times. In other words, the first deflecting unit 330 functions as a reflecting mirror, and the second deflecting unit 340 functions as a semi-transmissive mirror. More specifically, the first deflecting unit 330 disposed inside the light guide plate 321 is constituted by a light reflecting film (a kind of mirror) that is constituted by aluminum (Al) and reflects light incident on the light guide plate 321. Meanwhile, the second deflecting unit 340 disposed inside the light guide plate 321 is constituted by a multilayer laminated structure in which many dielectric laminated films are laminated. The dielectric laminated film includes, for example, a $TiO_2$ film as a high dielectric constant material and a $SiO_2$ film as a low dielectric constant material. Japanese Translation of PCT International Application No. 2005-521099 discloses a multilayer laminated structure in which many dielectric laminated films are laminated. Six layers of dielectric laminated films are illustrated in the drawings, but the present disclosure is not limited thereto. A thin piece containing the same material as a material constituting the light guide plate 321 is sandwiched between dielectric laminated films. In the first deflecting unit 330, parallel light incident on the light guide plate 321 is reflected so as to be totally reflected inside the light guide plate 321. Meanwhile, in the second deflecting unit 340, parallel light propagated by total reflection through the inside of the light guide plate 321 is reflected a plurality of times, and emitted from the light guide plate 321 toward the pupil 21 of the observer 20 in the state of parallel light.

As for the first deflecting unit 330, it is only required to perform the following. That is, by cutting out a portion 324 in which the first deflecting unit 330 is to be disposed in the light guide plate 321, a slope to form the first deflecting unit 330 is formed in the light guide plate 321, a light reflecting film is formed on the slope, and then the cut-out portion 324 of the light guide plate 321 is bonded to the first deflecting unit 330. Furthermore, as for the second deflecting unit 340, it is only required to perform the following. That is, a multilayer laminated structure obtained by laminating many layers of the same material (for example, glass) as a material constituting the light guide plate 321 and dielectric laminated films (for example, the dielectric laminated films can be formed by a vacuum vapor deposition method) is manufactured, a portion 325 in which the second deflecting unit 340 is to be disposed in the light guide plate 321 is cut out to form a slope, the multilayer laminated structure is bonded to the slope, and polishing or the like is performed to adjust an outer shape. In this way, the optical device 320 in which the first deflecting unit 330 and the second deflecting unit 340 are disposed inside the light guide plate 321 can be obtained.

Figure 15:
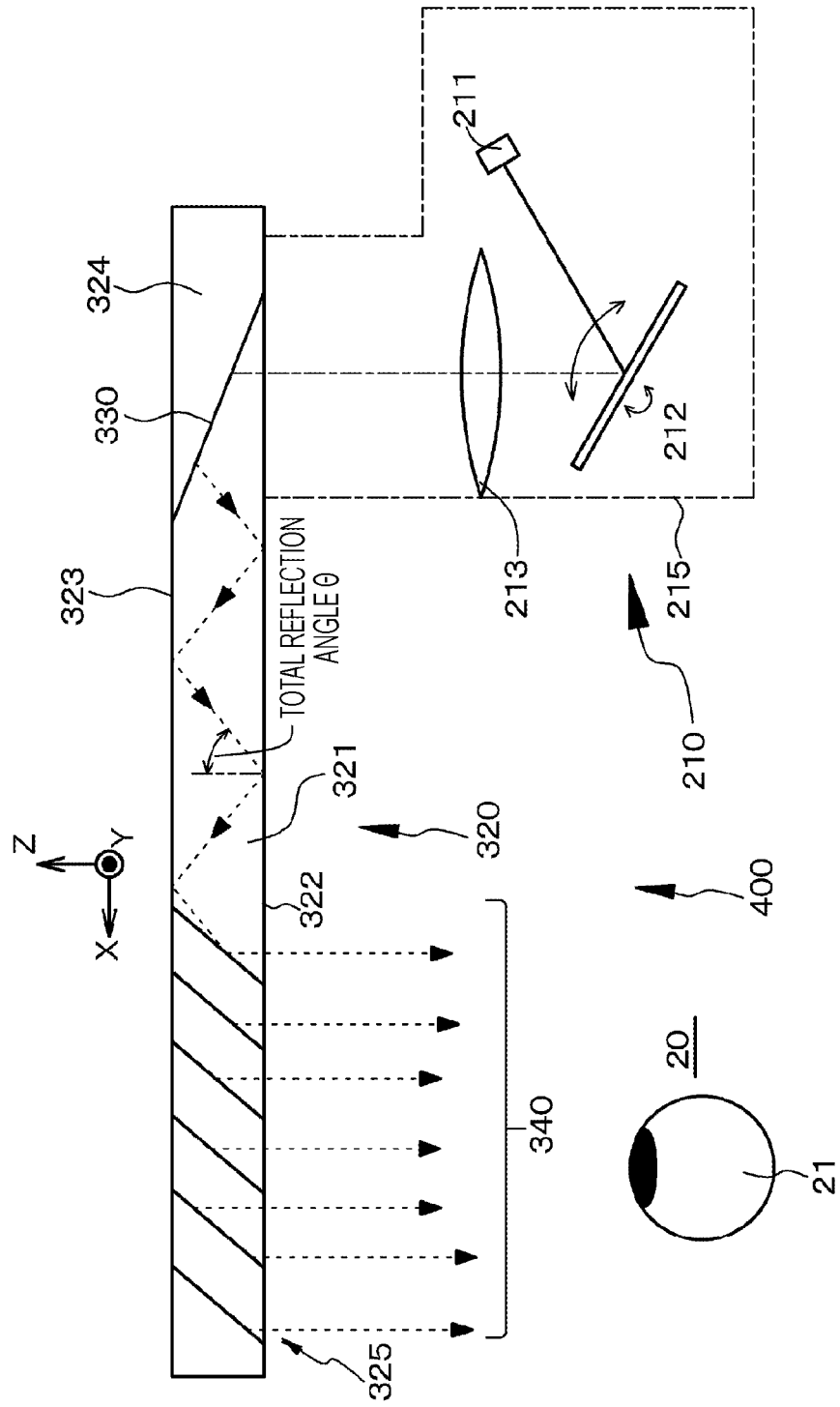
FIG. 15 is a conceptual diagram of the image display device of Example 3 (modified example of Example 2).

Alternatively, FIG. 15 illustrates a conceptual diagram of the image display device 400 in the display device (head mounted display) of Example 3. In the example illustrated in FIG. 15, the image forming device 210 is constituted by the image forming device with second configuration in a similar manner to Example 2.

The display device of Example 3 has substantially the same configuration and structure as those of the display devices of Examples 1 and 2 except for the above difference, and therefore detailed description thereof will be omitted.

Example 4

Figure 16:
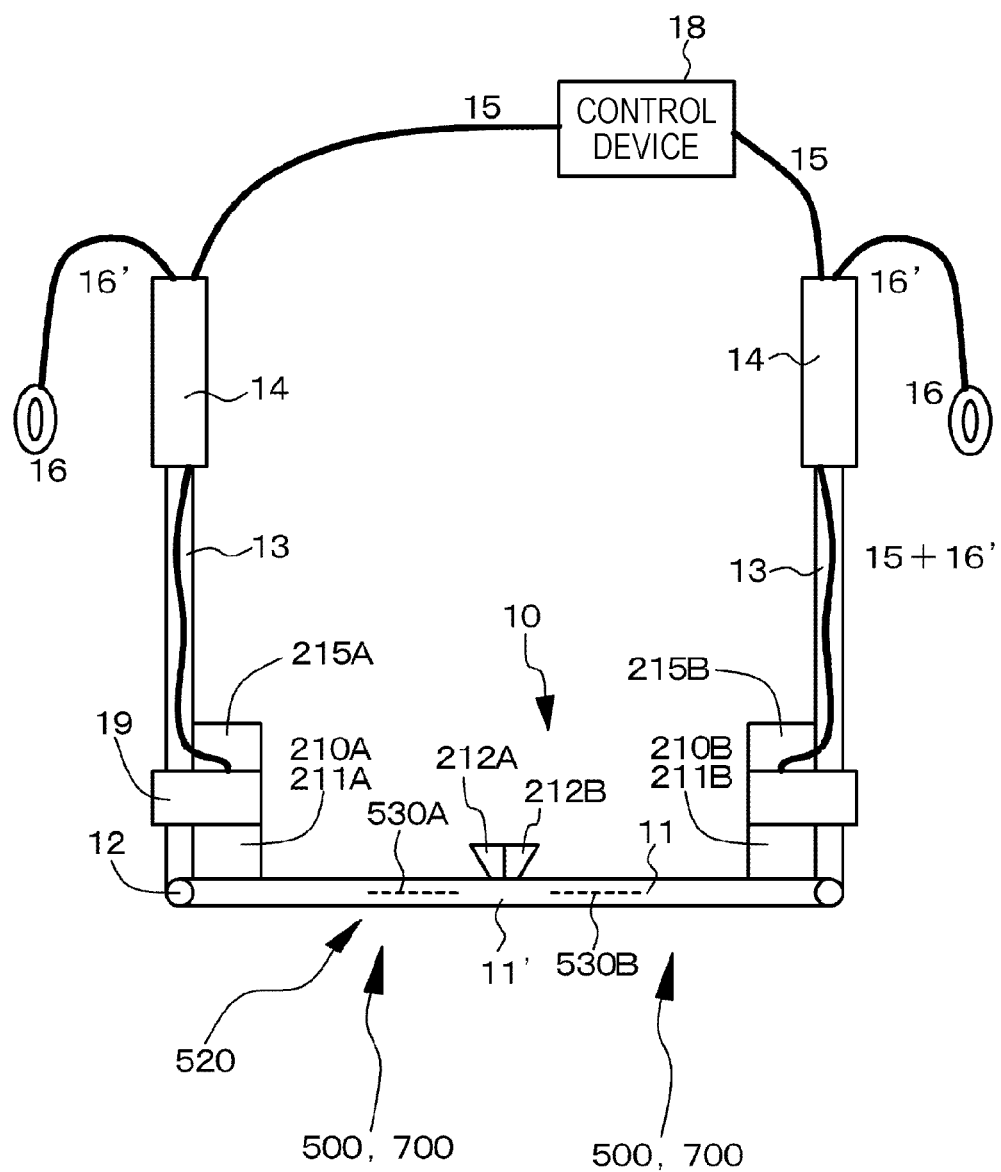
FIG. 16 is a conceptual diagram of an image display device in a display device of Example 4.

Example 4 is a modification of the image display devices of Examples 2 and 3, and relates to the optical device with second structure and the image forming device with second configuration. FIG. 16 illustrates a schematic view of a display device of Example 4 as viewed from above.

In Example 4, the optical device 520 constituting the image display device 500 includes a semi-transmissive mirror 530A, 530B on which light emitted from a light source is incident and from which the light is emitted toward the pupil 21 of the observer 20. In Example 4, light beams emitted from light sources 211A and 211B disposed in casings 215A and 215B are propagated through the inside of an optical fiber (not illustrated), and incident on, for example, scanning units 212A and 212B attached to the rim portion 11' in the vicinity of a nose pad, and the light beams scanned by the scanning units 212A and 212B are incident on the semi-transmissive mirrors 530A and 530B, respectively. Alternatively, light beams emitted from the light sources 211A and 211B disposed in the casings 215A and 215B are propagated through the inside of an optical fiber (not illustrated), and incident on, for example, the scanning units 212A and 212B attached above the rim portion 11' corresponding to both eyes, and the light beams scanned by the scanning units 212A and 212B are incident on the semi-transmissive mirrors 530A and 530B, respectively. Alternatively, light beams emitted from the light sources 211A and 211B disposed in the casings 215A and 215B are incident on the scanning units 212A and 212B disposed in the casings 215A and 215B, and the light beams scanned by the scanning units 212A and 212B are directly incident on the semi-transmissive mirrors 530A and 530B, respectively. Then, the light beams reflected by the semi-transmissive mirrors 530A and 530B are incident on the pupils 21 of the observer 20. The image forming device 210A, 210B can be substantially the image forming device 210 described in Example 2. The display device of Example 4 has substantially the same configuration and structure as those of the display devices of Examples 2 and 3 except for the above difference, and therefore detailed description thereof will be omitted.

Example 5

Figure 17A:
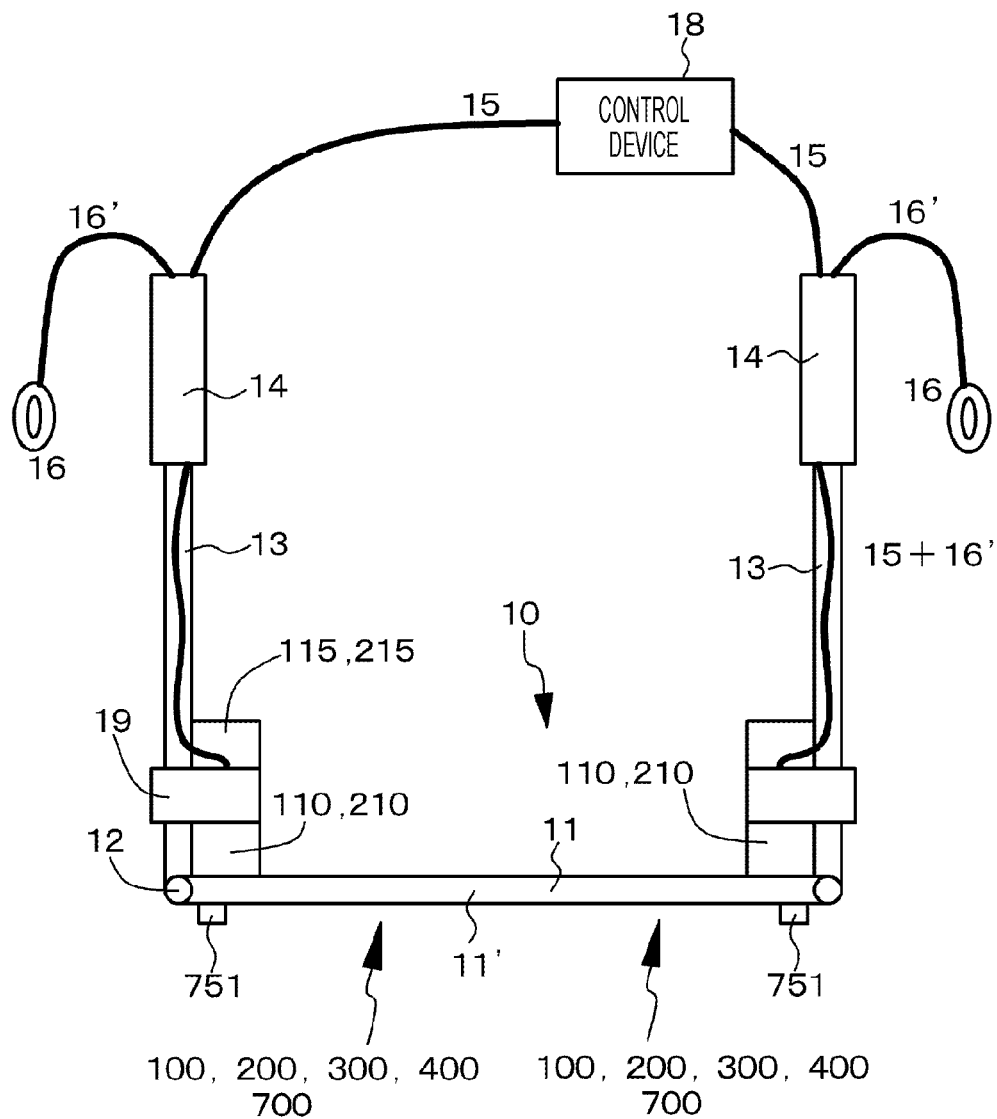
FIG. 17A is a schematic view of a display device of Example 5 as viewed from above.
Figure 17B:
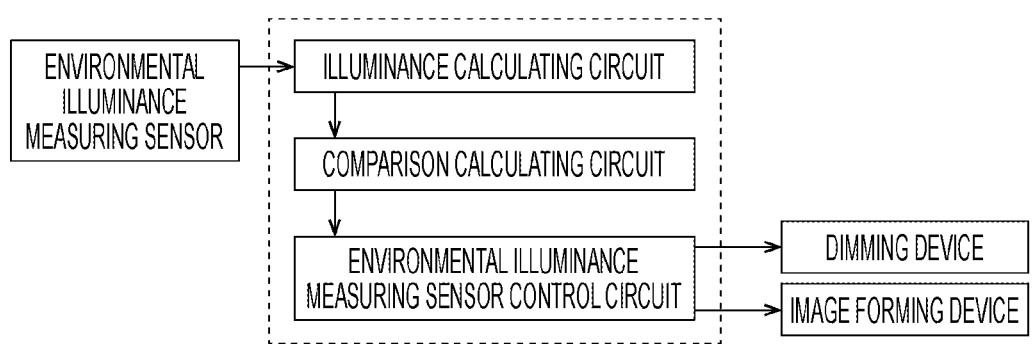
FIG. 17B is a schematic diagram of a circuit for controlling an illuminance sensor.

Example 5 is a modification of Example 1. FIG. 17A illustrates a schematic view of a display device of Example 5 as viewed from above. Furthermore, FIG. 17B illustrates a schematic diagram of a circuit for controlling an illuminance sensor.

The display device of Example 5 further includes an environmental illuminance measuring sensor 751 for measuring the illuminance of an environment where the display device is placed, and controls the light shielding ratio of the dimming device 700 on the basis of a measurement result of the environmental illuminance measuring sensor 751. At the same time, or independently, the display device of Example 5 controls the brightness of an image formed by the image forming device 110, 210 on the basis of the measurement result of the environmental illuminance measuring sensor 751. The environmental illuminance measuring sensor 751 having a well-known configuration and structure only needs to be disposed, for example, at an outer end portion of the dimming device 700. The environmental illuminance measuring sensor 751 is connected to the control device 18 via a connector and wiring (not illustrated). The control device 18 includes a circuit for controlling the environmental illuminance measuring sensor 751. The circuit for controlling the environmental illuminance measuring sensor 751 includes an illuminance calculating circuit for receiving a measurement value from the environmental illuminance measuring sensor 751 to determine illuminance, a comparison calculating circuit for comparing an illuminance value determined by the illuminance calculating circuit with a standard value, and an environmental illuminance measuring sensor control circuit for controlling the dimming device 700 and/or the image forming device 110, 210 on the basis of the value determined by the comparison calculating circuit. These circuits may be constituted by well-known circuits. In control of the dimming device 700, the light shielding ratio of the dimming device 700 is controlled. Meanwhile, in control of the image forming device 110, 210, the brightness of an image formed by the image forming device 110, 210 is controlled. Control of the light shielding ratio in the dimming device 700 and control of the brightness of an image in the image forming device 110, 210 may be performed independently or with correlation.

For example, when a measurement result of the environmental illuminance measuring sensor 751 becomes a predetermined value (first illuminance measurement value) or more, the light shielding ratio of the dimming device 700 is set to a predetermined value (first light shielding ratio) or more. Meanwhile, when a measurement result of the environmental illuminance measuring sensor 751 becomes a predetermined value (second illuminance measurement value) or less, the light shielding ratio of the dimming device 700 is set to a predetermined value (second light shielding ratio) or less. The first illuminance measurement value may be 10 lux. The first light shielding ratio may be any value of 99% to 70%. The second illuminance measurement value may be 0.01 lux. The second light shielding ratio may be any value of 49% to 1%.

The environmental illuminance measuring sensor 751 in Example 5 can be applied to the display device described in any one of Examples 2 to 4. Furthermore, in a case where the display device includes the camera 17, the environmental illuminance measuring sensor 751 can be constituted by a light receiving element for exposure measurement included in the camera 17.

In the display device of Example 5 or Example 6 described below, the light shielding ratio of the dimming device is controlled on the basis of a measurement result of the environmental illuminance measuring sensor, the brightness of an image formed by the image forming device is controlled on the basis of a measurement result of the environmental illuminance measuring sensor, the light shielding ratio of the dimming device is controlled on the basis of a measurement result of the transmitted light illuminance measuring sensor, and the brightness of an image formed by the image forming device is controlled on the basis of a measurement result of the transmitted light illuminance measuring sensor. Therefore, it is possible not only to impart a high contrast to a virtual image observed by an observer but also to optimize an observation state of a virtual image depending on the illuminance of an environment around the display device.

Example 6

Figure 18A:
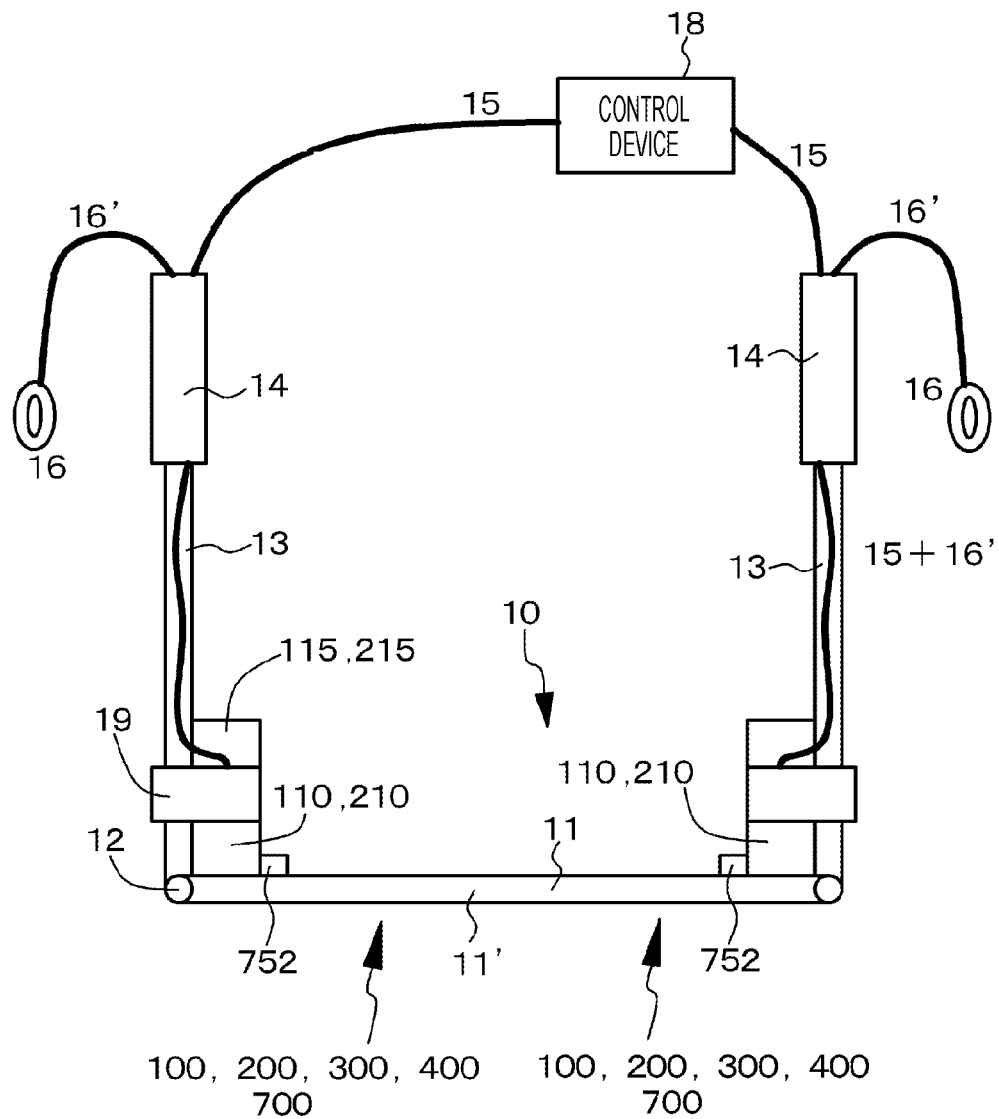
FIG. 18A is a schematic view of a display device of Example 6 as viewed from above.
Figure 18B:
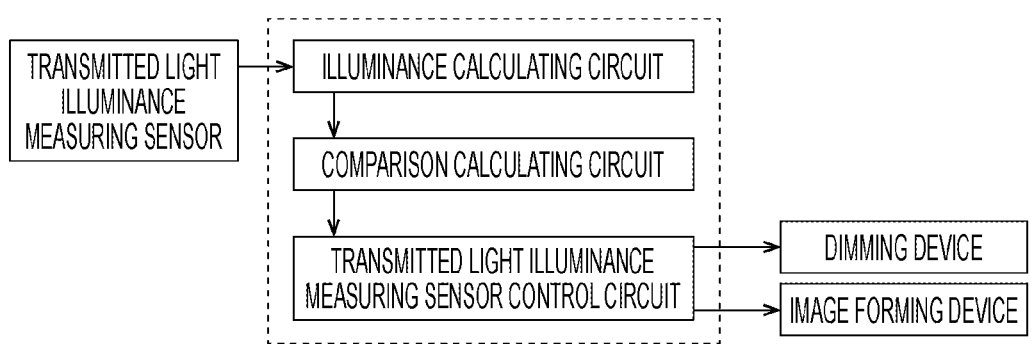
FIG. 18B is a schematic diagram of a circuit for controlling an illuminance sensor.

Example 6 is also a modification of Example 1. FIG. 18A illustrates a schematic view of a display device of Example 6 as viewed from above. Furthermore, FIG. 18B illustrates a schematic diagram of a circuit for controlling a second illuminance sensor.

The display device of Example 6 further includes a transmitted light illuminance measuring sensor 752 for measuring illuminance based on light which has passed through the dimming device from an external environment, that is, for measuring whether environmental light passes through the dimming device and is incident at desired illuminance adjusted, and controls the light shielding ratio of the dimming device 700 on the basis of a measurement result of the transmitted light illuminance measuring sensor 752. At the same time, or independently, the display device of Example 6 controls the brightness of an image formed by the image forming device 110, 210 on the basis of the measurement result of the transmitted light illuminance measuring sensor 752. The transmitted light illuminance measuring sensor 752 having a well-known configuration and structure is disposed closer to an observer than the optical device 120, 320. Specifically, it is only required to dispose the transmitted light illuminance measuring sensor 752, for example, on an inner surface of the casing 115, 215 or on a surface of the light guide plate 121, 321 on an observer side. The transmitted light illuminance measuring sensor 752 is connected to the control device 18 via a connector and wiring (not illustrated). The control device 18 includes a circuit for controlling the transmitted light illuminance measuring sensor 752. The circuit for controlling the transmitted light illuminance measuring sensor 752 includes an illuminance calculating circuit for receiving a measurement value from the transmitted light illuminance measuring sensor 752 to determine illuminance, a comparison calculating circuit for comparing an illuminance value determined by the illuminance calculating circuit with a standard value, and a transmitted light illuminance measuring sensor control circuit for controlling the dimming device 700 and/or the image forming device 110, 210 on the basis of the value determined by the comparison calculating circuit. These circuits may be constituted by well-known circuits. In control of the dimming device 700, the light shielding ratio of the dimming device 700 is controlled. Meanwhile, in control of the image forming device 110, 210, the brightness of an image formed by the image forming device 110, 210 is controlled. Control of the light shielding ratio in the dimming device 700 and control of the brightness of an image in the image forming device 110, 210 may be performed independently or with correlation. Furthermore, in a case where a measurement result of the transmitted light illuminance measuring sensor 752 cannot be controlled to desired illuminance in view of the illuminance of the environmental illuminance measuring sensor 751, that is, in a case where a measurement result of the transmitted light illuminance measuring sensor 752 is not desired illuminance, or in a case where even more delicate illumination adjustment is desired, it is only required to adjust the light shielding ratio of the dimming device while a value of the transmitted light illuminance measuring sensor 752 is monitored. At least two transmitted light illuminance measuring sensors may be disposed, and illuminance based on light which has passed through a portion with a high light shielding ratio and illuminance based on light which has passed through a portion with a low light shielding ratio may be measured.

The transmitted light illuminance measuring sensor 752 in Example 6 can be applied to the display device described in any one of Examples 2 to 4. Alternatively, the transmitted light illuminance measuring sensor 752 in Example 6 and the environmental illuminance measuring sensor 751 in Example 5 may be combined with each other. In this case, various tests may be performed, and control of a light shielding ratio in the dimming device 700 and control of the brightness of an image in the image forming device 110, 210 may be performed independently or with correlation. By adjusting voltages applied to the first electrode and the second electrode in each of the right eye dimming device and the left eye dimming device, light shielding ratios in the right eye dimming device and the left eye dimming device can be equalized. A potential difference between the first electrode and the second electrode may be controlled, or a voltage applied to the first electrode and a voltage applied to the second electrode may be independently controlled. The light shielding ratios in the right eye dimming device and the left eye dimming device can be controlled, for example, on the basis of a measurement result of the transmitted light illuminance measuring sensor 752, or can be controlled and adjusted manually by observation of the lightness of light which has passed through the right eye dimming device and optical device and the lightness of light which has passed through the left eye dimming device and optical device by an observer and operation of a switch, a button, a dial, a slider, a knob, or the like by the observer.

Example 7

Figure 19:
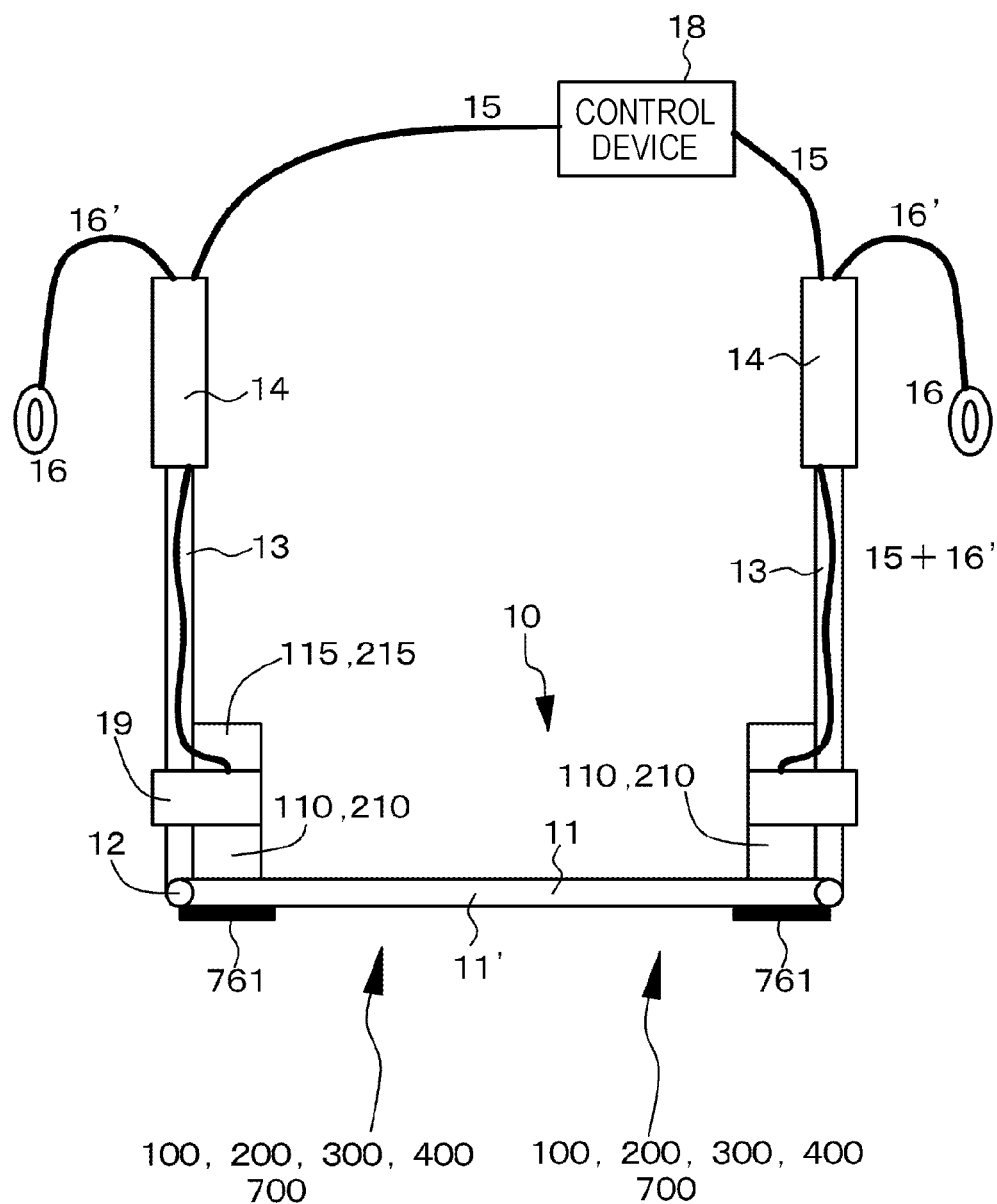
FIG. 19 is a schematic view of a display device of Example 7 as viewed from above.
Figure 20:
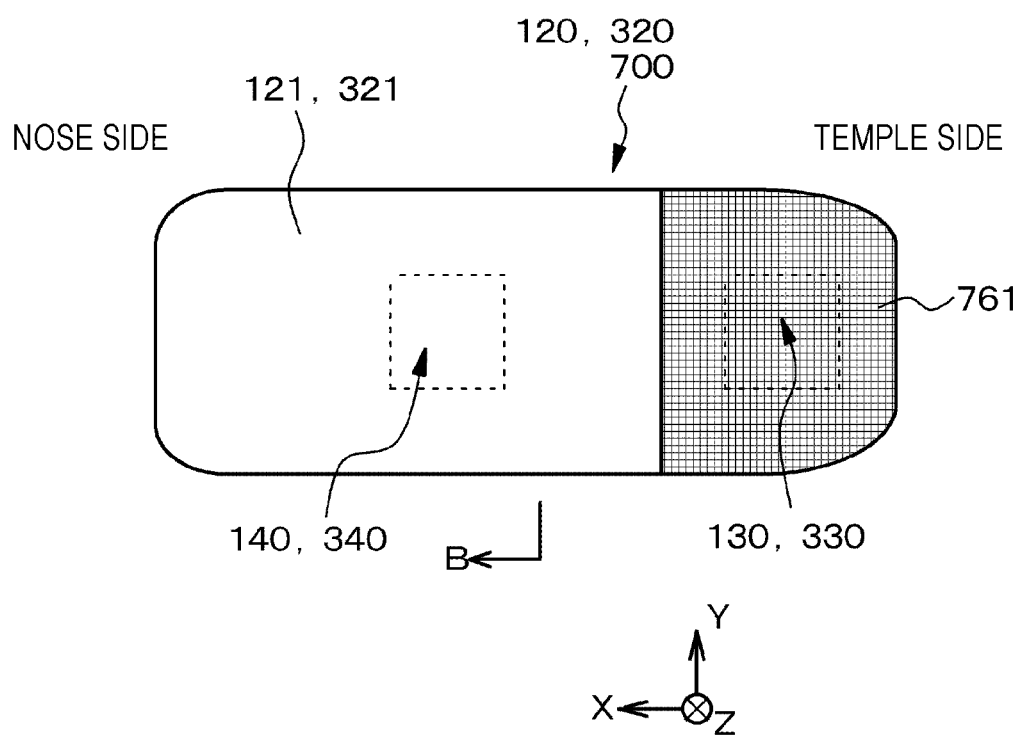
FIG. 20 is a schematic front view of an optical device and a dimming device in the display device of Example 7 illustrated in FIG. 19.
Figure 21:
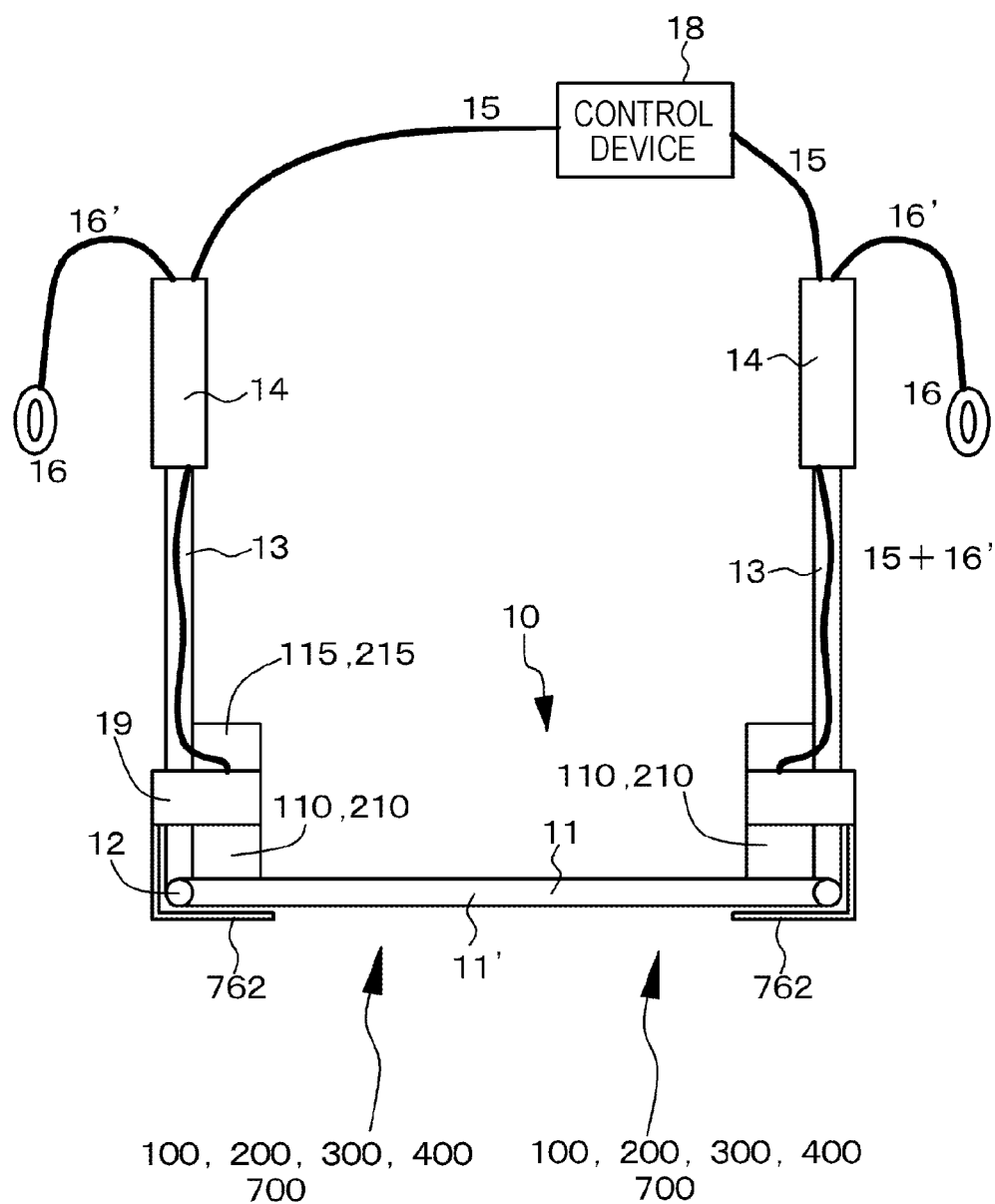
FIG. 21 is a schematic view of another display device of Example 7 as viewed from above.
Figure 22:
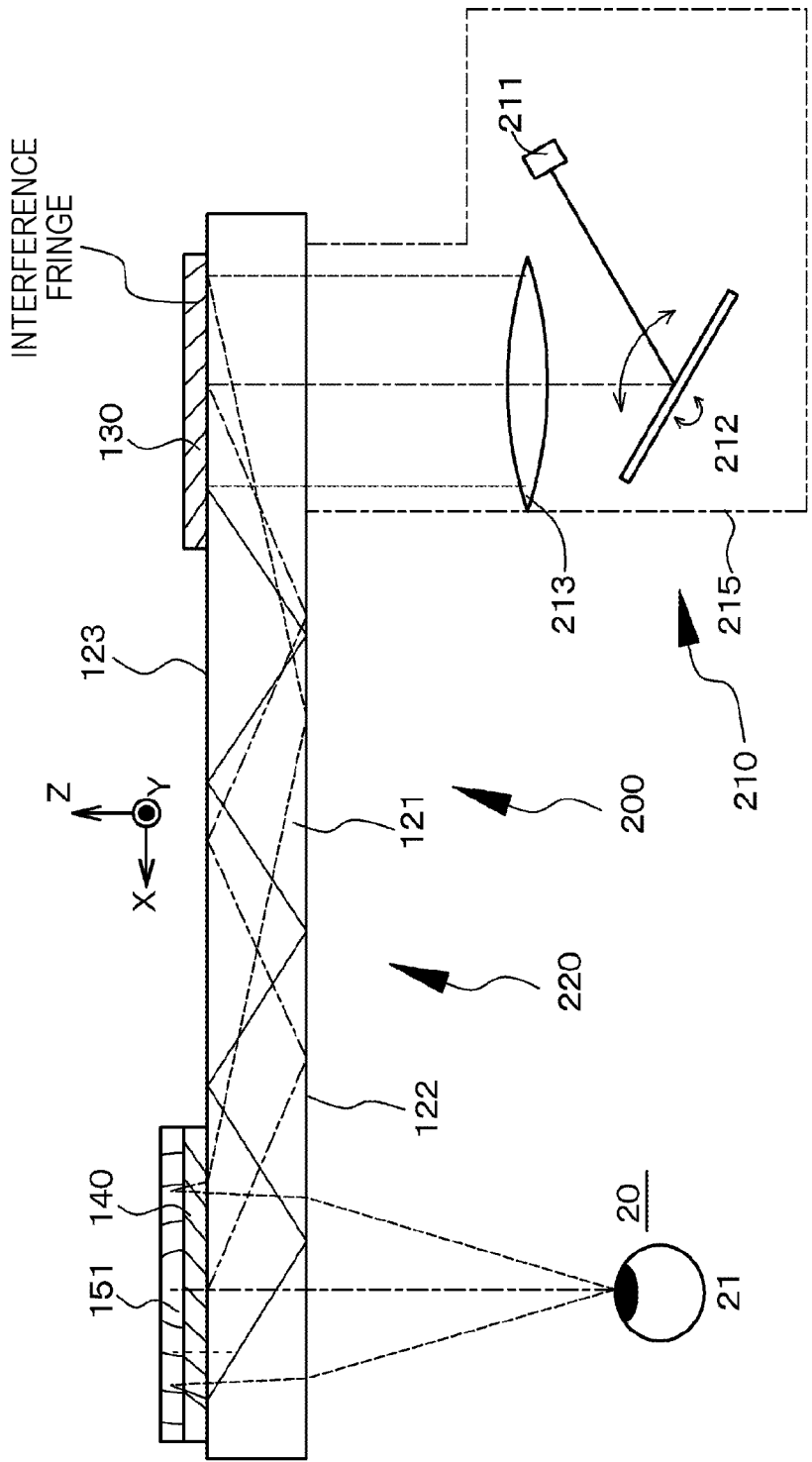
FIG. 22 is a conceptual diagram of an image display device of Example 8.
Figure 23:
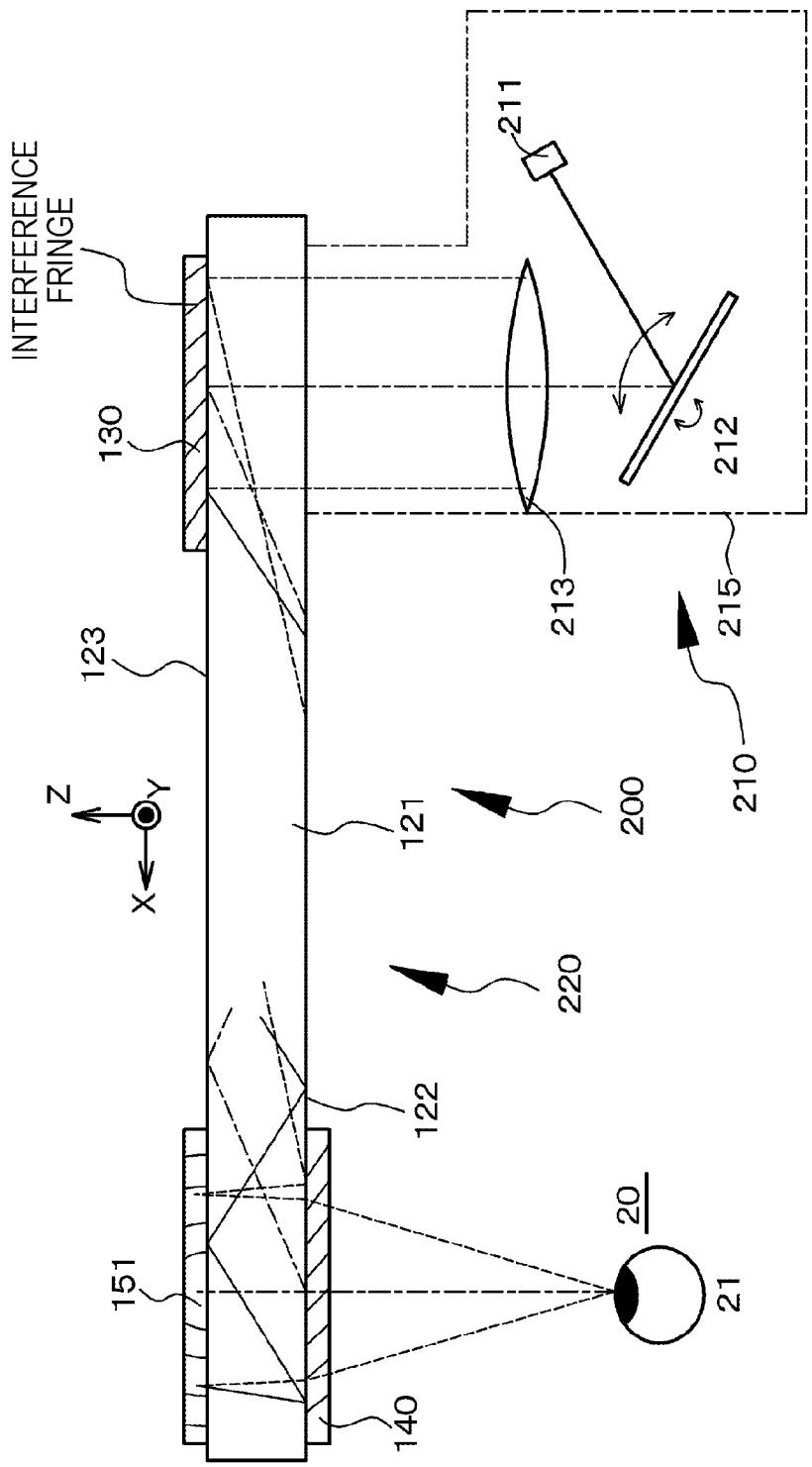
FIG. 23 is a conceptual diagram of the image display device of Example 8.

Example 7 is a modification of Examples 1 to 6. FIG. 19 illustrates a schematic view of a display device of Example 7 as viewed from above. FIG. 20 illustrates a schematic front view of an optical device and a dimming device of Example 7. In the display device of Example 7, a light shielding member 761 is formed on an outer surface of the dimming device 700 facing the first deflecting unit 130, 330 in order to prevent light from leaking to the outside of the light guide plate 121, 321 to reduce light utilization efficiency. Alternatively, as illustrated in a schematic view viewed from above in FIG. 21, the light shielding member 762 is disposed outside the second surface 123, 323 of the light guide plate 121, 321 so as to cover the first deflecting unit 130, 330. An orthogonally projected image of the first deflecting unit 130, 330 on the light guide plate 121, 321 is included in an orthogonally projected image of the light shielding member 761, 762 on the light guide plate 121, 321. Specifically, for example, in a region of the light guide plate 121, 321 on which light emitted from the image forming device 110, 210 is incident, more specifically, in a region where the first deflecting unit 130, 330 is disposed, the light shielding member 761, 762 for shielding incidence of external light on the light guide plate 121, 321 is disposed. The region of the light guide plate 121, 321 on which light emitted from the image forming device 110, 210 is incident is included in an orthogonally projected image of the light shielding member 761, 762 on the light guide plate 121, 321.

The light shielding member 761, 762 is disposed away from the light guide plate 121, 321 on the opposite side to a side where the image forming device 110, 210 is disposed in the light guide plate 121, 321. The light shielding member 761 is disposed on a part of the protective substrate 720. Specifically, by printing opaque ink on the protective substrate 720, the light shielding member 761 can be formed. The light shielding member 762 is manufactured, for example, from an opaque plastic material. The light shielding member 762 integrally extends from the casing 115, 215 of the image forming device 110, 210, is attached to the casing 115, 215 of the image forming device 110, 210, extends integrally from the frame 10, is attached to the frame 10, or is attached to the light guide plate 121, 321. In the illustrated example, the light shielding member 762 integrally extends from the casing 115, 215 of the image forming device 110, 210. In this way, the light shielding member 761, 762 for shielding incidence of external light on the light guide plate 121, 321 is disposed in a region on which light emitted from the image forming device 110, 210 is incident in the light guide plate 121, 321. Therefore, external light is not incident on the region on which light emitted from the image forming device 110, 210 is incident in the light guide plate 121, 321, specifically on the first deflecting unit 130, 330. Therefore, deterioration in image display quality of the display device due to generation of undesirable stray light or the like does not occur. The light shielding member 761 can be combined with the light shielding member 762.

Example 8

Example 8 is a modification of Example 2. As illustrated in a conceptual diagram of an image display device of Example 8 in FIG. 22 or 23, an optical member 151 may be disposed in the optical device 120 so as to face the second deflecting unit 140. Light from the image forming device 210 is deflected (or reflected) by the first deflecting unit 130, propagated by total reflection through the inside of the light guide plate 121, deflected by the second deflecting unit 140, and incident on the optical member 151. The optical member 151 emits the incident light toward the pupil 21 of the observer 20. A large part of the light passing through the second deflecting unit 140 does not satisfy diffraction conditions in the second deflecting unit 140, and therefore is not diffracted or reflected by the second deflecting unit 140 and is incident on the pupil 21 of the observer 20. The optical member 151 is constituted, for example, by a hologram lens, and is disposed, for example, on a second surface side of the light guide plate 121. The second deflecting unit 140 is disposed on the second surface side of the light guide plate 121 (refer to FIG. 22) or on a first surface side (refer to FIG. 23).

In addition, in this case, the lens system 213 on which light from the image forming device 210 is incident and from which the light is emitted toward the light guide plate 121 may be further included. The image forming device 210 may be in a conjugate relationship with the pupil 21 of the observer 20. The lens system 213 and the optical member 151 may form a both-side telecentric system. Alternatively, an image emitting portion from which an image is emitted in the image forming device 210 may be located at a front focal point of the lens system 213 having a positive optical power, the pupil 21 (more specifically, a crystalline lens) of the observer 20 may be located at a rear focal point of the optical member 151 having a positive optical power, and a front focal point of the optical member 151 may be located at a rear focal point of the lens system 213. Here, when the image forming device 210 is in a conjugate relationship with the pupil 21 of the observer 20, if the image forming device 210 is placed at the position of the pupil 21 of the observer 20, an image is formed at the original position of the image forming device 210. Furthermore, when the lens system 213 and the optical member 151 form a both-side telecentric system, an incident pupil of the lens system 213 is at infinity, and an emission pupil of the optical member 151 is at infinity.

As described above, examples of the lens system 213 include an optical system having a positive optical power as a whole, such as a convex lens, a concave lens, a free cured surface prism, a hologram lens, or a combination thereof. A value of the positive optical power possessed by the lens system 213 may be larger than a value of the positive optical power possessed by the optical member 151. The optical power is a reciprocal of a focal length. Therefore, in other words, the focal length of the optical member 151 may be longer than the focal length of the lens system 213. In some cases, the diaphragm 114 is disposed at a position of a front focal point (focal point on the image forming device side) of the lens system 213. In some cases, the optical member 151 constitutes a kind of concave mirror, and the pupil 21 of the observer 20 (specifically, a crystalline lens of the observer) is located at a position of a rear focal point of the optical member 151.

Examples of a material constituting the hologram lens include a photopolymer material. The constituent material and basic structure of the hologram lens only need to be the same as those of a conventional hologram lens. An interference fringe for exerting a function as a lens (more specifically, a concave mirror) is formed in the hologram lens. A method for forming the interference fringe itself only needs to be the same as a conventional forming method. Specifically, for example, by irradiating a member constituting the hologram lens (for example, a photopolymer member) with object light from a first predetermined direction on one side, and at the same time, by irradiating the member constituting the hologram lens with reference light from a second predetermined direction on the other side, it is only required to record an interference fringe formed by the object light and the reference light inside the member constituting the hologram lens. For example, one of the object light and the reference light is a divergent beam, and the other is a focused beam. By appropriately selecting the first predetermined direction, the second predetermined direction, and the wavelengths of the object light and the reference light, an appropriate interference fringe can be formed in the hologram lens, and a desired positive optical power can be thereby imparted.

Figure 24:
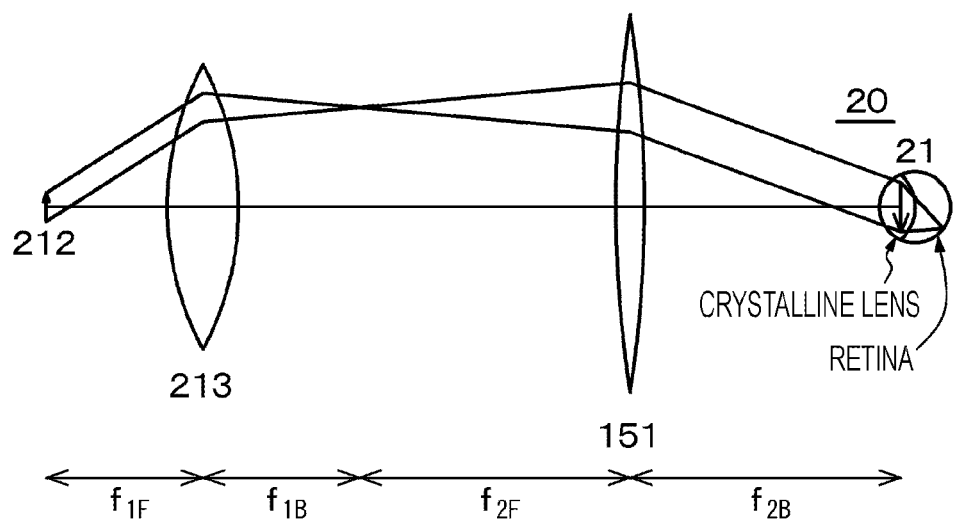
FIG. 24 is a conceptual diagram for explaining an optical system in a modified example of the image display device of Example 8.

As illustrated in a conceptual diagram illustrating the optical system in FIG. 24, as described above, a structure in which the image forming device 210 (specifically, an image emitting portion) is in a conjugate relationship with the pupil 21 (specifically, a crystalline lens) of the observer 20, and the lens system 213 and the optical member 151 form a both-side telecentric system can be cited. Alternatively, an image emitting portion (specifically, the scanning unit 212) from which an image is emitted in the image forming device 210 may be located at a front focal point $f_{1F}$ of the lens system 213 having a positive optical power, the pupil 21 (more specifically, a crystalline lens) of the observer 20 may be located at a rear focal point $f_{2B}$ of the optical member 151 having a positive optical power, and the front focal point $f_{2F}$ of the optical member 151 may be located at the rear focal point $f_{1B}$ of the lens system 213. Furthermore, as described above, the lens system 213 and the optical member 151 each have a positive optical power. In addition, in this case, a value of the positive optical power possessed by the lens system 213 may be larger than a value of the positive optical power possessed by the optical member 151. In other words, the focal length ($f_{2B}$) of the optical member 151 may be longer than the focal length ($f_{1F}$) of the lens system 213. Here, the scanning unit 212 corresponding to an image emitting portion is disposed at the position of the front focal point $f_{1F}$ (focal point on the image forming device side) of the lens system 213. Meanwhile, the optical member 151 constitutes a kind of concave mirror, and the pupil 21 (specifically, a crystalline lens) of the observer 20 is located at the position of the rear focal point $f_{2B}$ of the optical member 151.

In the image display device having such a structure and configuration, as described above, light (for example, corresponding to the size of one pixel or one subpixel) emitted from the light source 211 at a certain moment is converted into parallel light, scanned by the scanning unit 212, and incident on the lens system 213 in the form of parallel light. The light emitted from the lens system 213 forms an image once at the rear focal point (which is also the front focal point of the optical member 151) of the lens system 213, and is incident on the optical member 151. The light emitted from the optical member 151 is converted into parallel light and reaches the pupil 21 (specifically, a crystalline lens) of the observer 20 in the form of parallel light. Then, the light that has passed through the crystalline lens ultimately forms an image on a retina of the pupil 21 of the observer 20.

It goes without saying that the configuration and structure of the above-described image display device of Example 8 can be applied to Examples 1 and 3 to 7.

Example 9

Figure 25A:
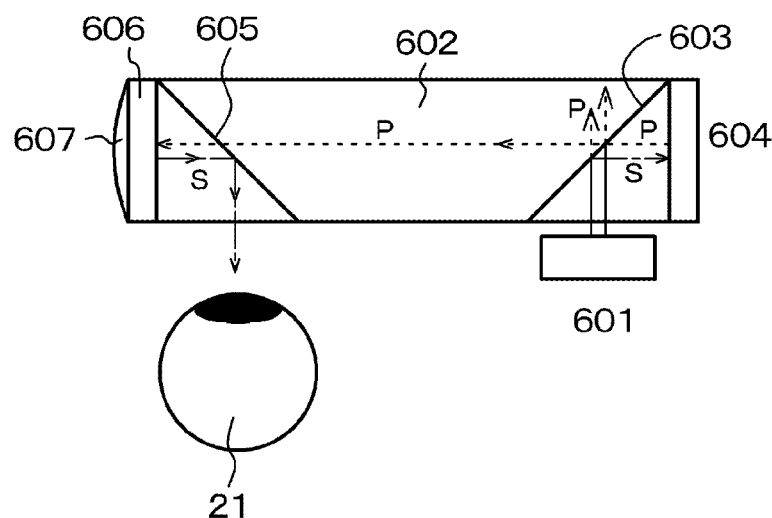
FIGS. 25A and 25B are schematic views of an optical device in a display device of Example 9 as viewed from above.
Figure 25B:
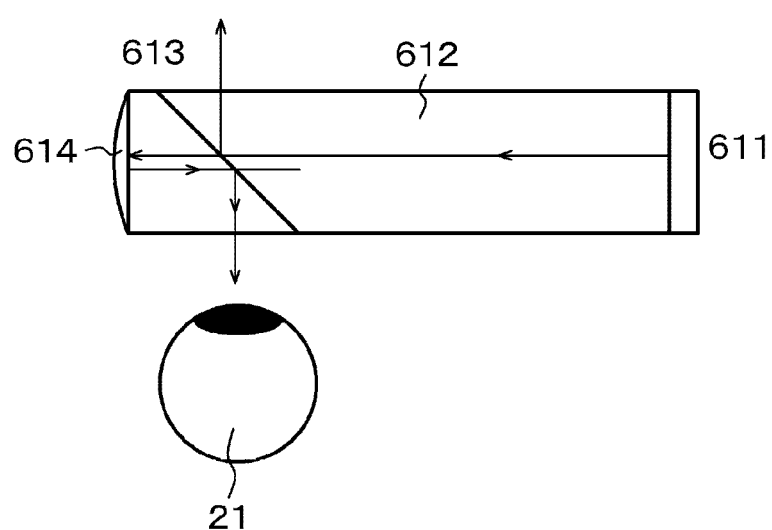

Example 9 is a modification of the optical device constituting the optical device with second structure described in Example 4. FIGS. 25A and 25B illustrate schematic views of a display device of Example 9 as viewed from above.

In the example illustrated in FIG. 25A, light emitted from a light source 601 enters a light guide member 602 and collides with a polarization beam splitter 603 disposed in the light guide member 602. In the light that has been emitted from the light source 601 and has collided with the polarization beam splitter 603, a P polarization component passes through the polarization beam splitter 603, and an S polarization component is reflected by the polarization beam splitter 603 to travel toward a liquid crystal display device (LCD) 604 constituted by LCOS as a light valve. The liquid crystal display device (LCD) 604 forms an image. A polarization component of the light reflected by the liquid crystal display device (LCD) 604 is occupied by the P polarization component. Therefore, the light reflected by the liquid crystal display device (LCD) 604 passes through the polarization beam splitter 603, 605, passes through a quarter wave plate 606, collides with and reflected by a reflecting plate 607, passes through the quarter wave plate 606, and travels toward the polarization beam splitter 605. The polarization component of light at this time is occupied by the S polarization component. Therefore, the light is reflected by the polarization beam splitter 605 and travels toward the pupil 21 of an observer. As described above, the image forming device includes the light source 601 and the liquid crystal display device (LCD) 604. The optical device includes the light guide member 602, the polarization beam splitter 603, 605, the quarter wave plate 606, and the reflecting plate 607. The polarization beam splitter 605 corresponds to a virtual image forming region of the optical device.

In the example illustrated in FIG. 25B, light coming from an image forming device 611 travels through a light guide member 612 and collides with a semi-transmissive mirror 613. A part of the light passes through the semi-transmissive mirror 613, collides with and reflected by a reflecting plate 614, and collides with the semi-transmissive mirror 613 again. A part of the light is reflected by the semi-transmissive mirror 613 and travels toward the pupil 21 of an observer. As described above, the optical device includes the light guide member 612, the semi-transmissive mirror 613, and the reflecting plate 614. The semi-transmissive mirror 613 corresponds to a virtual image forming region of the optical device.

Figure 26A:
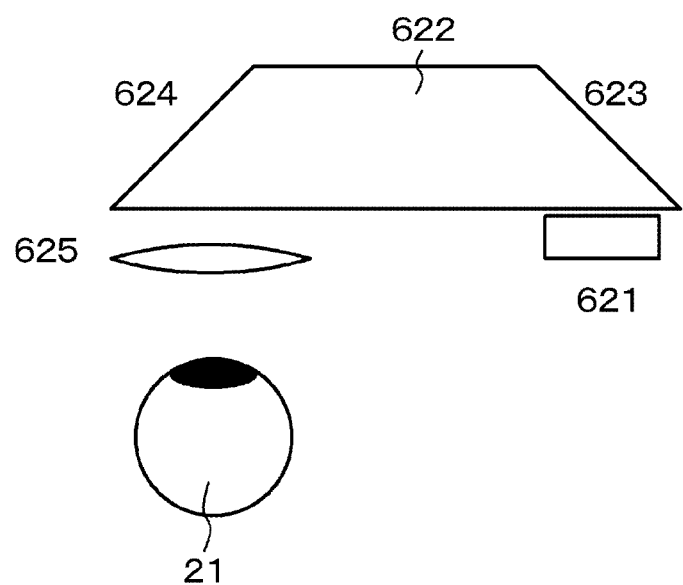
FIGS. 26A and 26B are schematic views of an optical device in a modified example of the display device of Example 9 as viewed from above and as viewed from a side, respectively.
Figure 26B:
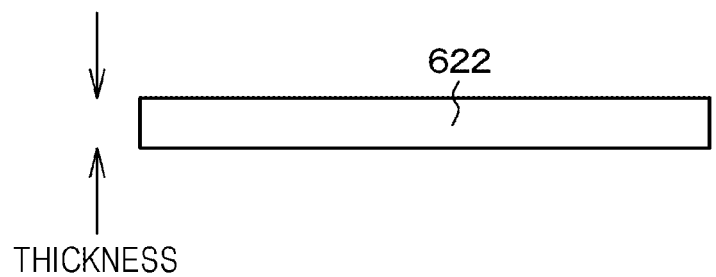

Alternatively, FIGS. 26A and 26B illustrate schematic views of a modified example of the display device of Example 9 as viewed from above and as viewed from a side, respectively. This optical device includes a hexahedron prism 622 and a convex lens 625. Light emitted from the image forming device 621 is incident on the prism 622, collides with and reflected by a prism surface 623, travels through the prism 622, collides with and reflected by a prism surface 624, and reaches the pupil 21 of an observer via the convex lens 625. The prism surface 623 and the prism surface 624 are inclined in a facing direction, and the planar shape of the prism 622 is a trapezoid, specifically, an isosceles trapezoid. Mirror coating has been applied to the prism surface 623, 624. If the thickness (height) of a portion of the prism 622 facing the pupil 21 is thinner than 4 mm which is an average pupil diameter of a human, an observer can view a virtual image from the prism 622 superimposed on an image of an outside world.

Example 10

Figure 27A:
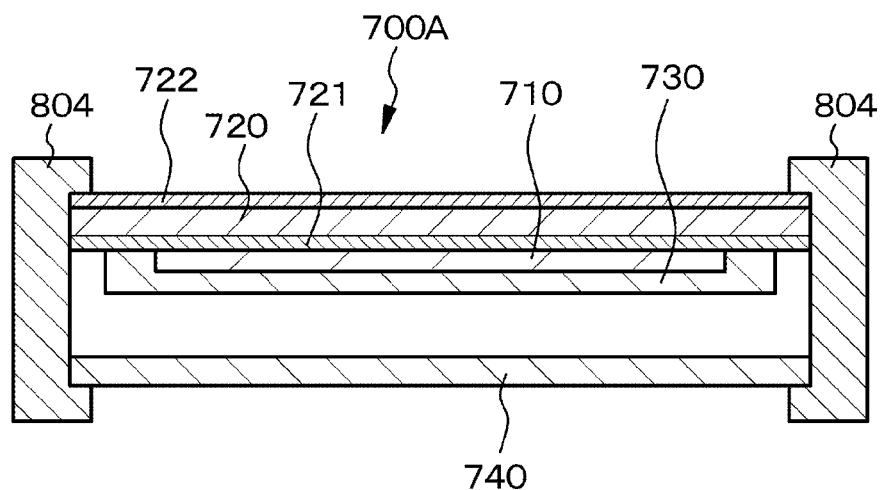
FIGS. 27A and 27B are schematic cross-sectional views of a dimming device of Example 10.
Figure 27B:
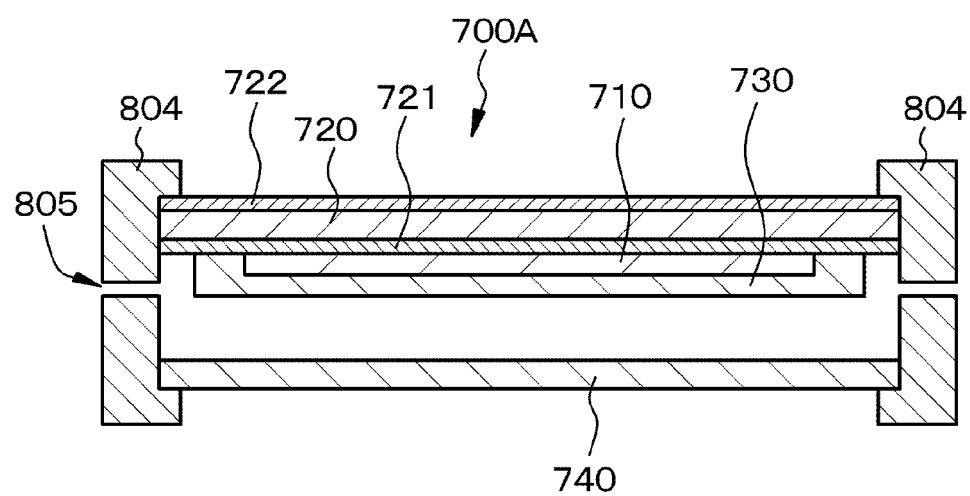
Figure 28A:
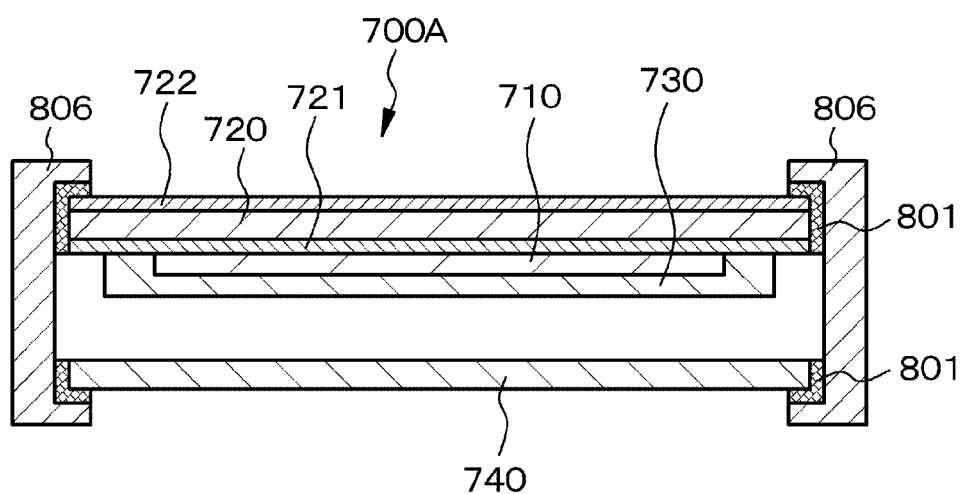
FIGS. 28A and 28B are schematic cross-sectional views of the dimming device of Example 10.
Figure 28B:
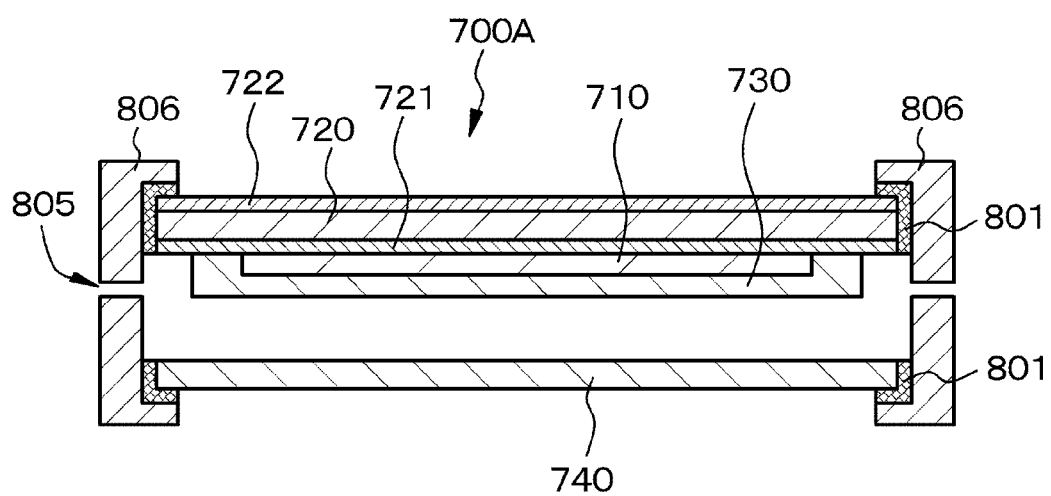

In Example 1, the dimming device incorporated in the image display device has been described, but the dimming device of the present disclosure can be used independently without being incorporated in the image display device. That is, such a dimming device 700A of the present disclosure can be applied to, for example, a window, and as illustrated in a schematic cross-sectional view in FIG. 27A, includes:

the transparent protective substrate 720 on which external light is incident;

the dimming layer 710 formed on the protective substrate 720;

the moisture-retaining layer 730 formed on the dimming layer 710; and the water vapor transmissive transparent substrate 740 disposed on or above the moisture-retaining layer 730. Here, in the illustrated example, the water vapor transmissive transparent substrate 740 is disposed above the moisture-retaining layer 730. Furthermore, an outer edge of the protective substrate 720 and an outer edge of the water vapor transmissive transparent substrate 740 are sealed to each other with a water vapor transmissive sealing member 804 constituted by, for example, a silicone rubber-based adhesive (moisture transmittance: $2.6 \times 10^2$ g/m²·day). Alternatively, as illustrated in a schematic cross-sectional view in FIG. 27B, a space present between the water vapor transmissive transparent substrate 740 and the moisture-retaining layer 730 communicates with the outside via a through hole 805 formed in the sealing member 804. Note that in a case of forming the through hole 805, the moisture transmittance described above is not required as a sealing member in some cases. Alternatively, as illustrated in a schematic cross-sectional view in FIG. 28A, the outer edge of the protective substrate 720 and the outer edge of the water vapor transmissive transparent substrate 740 are attached to a sealing member 806 via the above-described adhesive 801 capable of transmitting water vapor. Alternatively, as illustrated in a schematic cross-sectional view in FIG. 28B, a space present between the water vapor transmissive transparent substrate 740 and the moisture-retaining layer 730 communicates with the outside via the through hole 805 formed in the sealing member 806. Such a dimming device 700A of the present disclosure can be applied to, for example, a window, a mirror, a reflecting mirror, various display devices, and a screen.

Hitherto, the present disclosure has been described on the basis of the preferable Examples. However, the present disclosure is not limited to these Examples. The configurations and structures of the display device (head mounted display), the image display device, and the image forming device described in Examples are illustrative and can be appropriately changed. For example, a surface relief type hologram (refer to U.S. Pat. No. 20040062505 A1) may be disposed on the light guide plate. In the optical device, the diffraction grating element may be constituted by a transmission type diffraction grating element. Alternatively, one of the first deflecting unit and the second deflecting unit may be constituted by a reflection type diffraction grating element, and the other may be constituted by a transmission type diffraction grating element. Alternatively, the diffraction grating element may be a reflection type blazed diffraction grating member. The display device of the present disclosure can also be used as a stereoscopic displaying device. In this case, if necessary, it is only required to detachably attach a polarizing plate or a polarizing film to the optical device, or to stick the polarizing plate or the polarizing film to the optical device.

The light guide plate and the dimming device may be stuck to each other with a gap therebetween using the above-described water vapor transmissive sealing member.

In Examples, it has been described that the image forming device 110, 210 displays an image of a single color (for example, green), but the image forming device 110, 210 can display a color image. In this case, the light source only needs to include light sources for emitting, for example, red, green, and blue, respectively. Specifically, for example, it is only required to obtain white light by mixing colors of red light, green light, and blue light emitted from the red light emitting element, the green light emitting element, and the blue light emitting element, respectively, using a light pipe and uniformizing brightness. In some cases, light passing through the dimming device may be colored in a desired color by the dimming device. In this case, a color in which light is colored by the dimming device may be variable. Specifically, for example, it is only required to laminate a dimming device for coloring light in red, a dimming device for coloring light in green, and a dimming device for coloring light in blue.

Alternatively, a diffraction grating member (red diffraction grating member) including a diffraction grating layer including a hologram diffraction grating for diffracting and reflecting light having a red wavelength band (or wavelength) may be disposed on a first light guide plate, a diffraction grating member (green diffraction grating member) including a diffraction grating layer including a hologram diffraction grating for diffracting and reflecting light having a green wavelength band (or wavelength) may be disposed on a second light guide plate, a diffraction grating member (blue diffraction grating member) including a diffraction grating layer including a hologram diffraction grating for diffracting and reflecting light having a blue wavelength band (or wavelength) may be disposed on a third light guide plate, and the first light guide plate, the second light guide plate, and the third light guide plate may be stacked with a gap therebetween. Alternatively, one of the red diffraction grating member, the green diffraction grating member, and the blue diffraction grating member may be disposed on the first light guide plate, one of the remaining two diffraction grating members out of the red diffraction grating member, the green diffraction grating member, and the blue diffraction grating member may be disposed on a surface different from the first light guide plate on which the diffraction grating member is disposed, the remaining one diffraction grating member out of the red diffraction grating member, the green diffraction grating member, and the blue diffraction crating member may be disposed on a second light guide plate, and the first light guide plate and the second light guide plate may be stacked with a gap therebetween.

Figure 29:
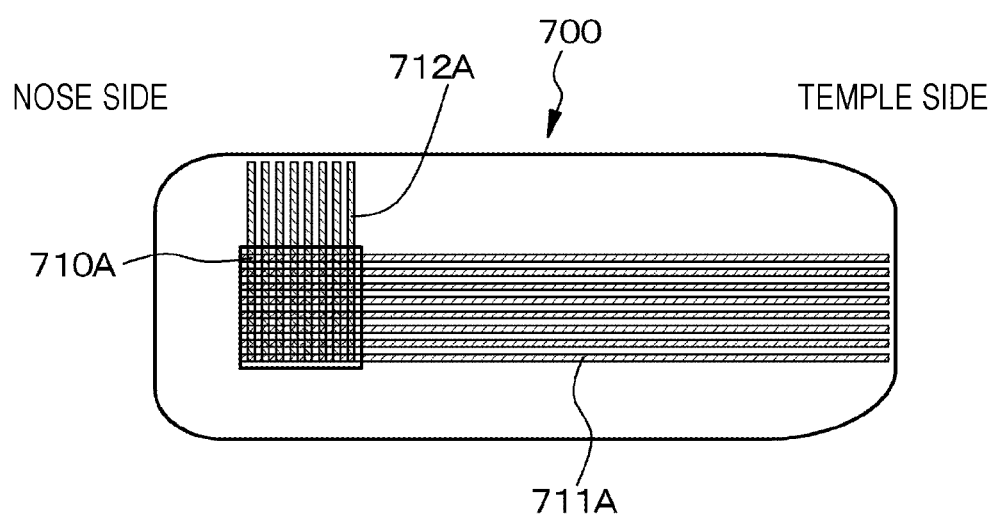
FIG. 29 is a schematic front view of a modified example of a dimming device.

The light shielding ratio in the dimming device can be controlled, for example, on the basis of a simple matrix method. In other words, as Illustrated in a schematic plan view in FIG. 29, the first electrode 711 includes a plurality of band-shaped first electrode segments 711A extending in a first direction, the second electrode 712 includes a plurality of band-shaped second electrode segments 712A extending in a second direction different from the first direction, and the light shielding ratio of a portion of the dimming device corresponding to an overlap region between the first electrode segments 711A and the second electrode segments 712A (minimum unit region 710A in which the light shielding ratio of the dimming device changes) is controlled on the basis of control of voltages applied to the first electrode segments 711A and the second electrode segments 712A. The first direction is perpendicular to the second direction. Specifically, the first direction extends in a transverse direction (X direction), and the second direction extends in a longitudinal direction (Y direction).

Note that the present disclosure may have the following configurations.

[A01] <<Image Display Device>>

An image display device including:

(a) an image forming device;

(b) an optical device having a virtual image forming region where a virtual image is formed on the basis of light emitted from the image forming device; and (c) a dimming device for adjusting the amount of external light incident from the outside, disposed so as to face the virtual image forming region and to be away from the optical device, in which the dimming device includes:

(c-1) a transparent protective substrate on which external light is incident;

(c-2) a dimming layer formed on a surface of the protective substrate facing the optical device; and (c-3) a moisture-retaining layer formed on the dimming layer.

[A02] The image display device according to [A01], in which a material constituting the protective substrate has a moisture transmittance of $10^{-2}$ g/m²·day or less.

[A03] The image display device according to [A01] or [A02], in which the dimming device further includes (c-4) a water vapor transmissive transparent substrate disposed on the moisture-retaining layer.

[A04] The image display device according to [A03], in which the moisture transmittance of a material constituting the water vapor transmissive transparent substrate is 10 times or more the moisture transmittance of a material constituting the protective substrate.

[A05] The image display device according to [A03] or [A04], in which the water vapor transmissive transparent substrate contains a polycarbonate resin, a polyethylene terephthalate resin, a cycloolefin-based resin, an acrylate-based resin, a urethane-based resin, or a styrene-based resin.

[A06] The image display device according to any one of [A01] to [A05], in which the moisture-retaining layer contains at least one material selected from the group consisting of an epoxy-based resin, polyvinyl alcohol, and polyvinyl butyral.

[A07] The image display device according to any one of [A01] to [A06], in which a water vapor barrier layer is disposed between the protective substrate and the dimming layer.

[A08] The image display device according to [A07], in which the water vapor barrier layer contains at least one material selected from the group consisting of aluminum oxide, silicon oxide, silicon nitride, niobium oxide, vinylidene chloride, polyacrylate, and an aluminum foil.

[A09] The image display device according to any one of [A01] to [A08], in which the dimming layer includes an electrochromic material layer.

[A10] The image display device according to [A09], in which the dimming layer has a laminated structure of a first electrode, an electrochromic material layer, and a second electrode, and the electrochromic material layer has a laminated structure of an oxidation coloring layer, an electrolyte layer, and a reduction coloring layer.

[A11] The image display device according to any one of [A01] to [A10], in which the protective substrate contains a polyethylene terephthalate resin, a polycarbonate resin, or glass.

[A12] The image display device according to any one of [A01] to [A11], in which the optical device includes:

(b-1) a light guide plate in which light incident from the image forming device is propagated by total reflection through the inside, and then the light is emitted toward an observer;

(b-2) a first deflecting unit for deflecting light incident on the light guide plate such that the light incident on the light guide plate is totally reflected inside the light guide plate; and (b-3) a second deflecting unit for deflecting light propagated by total reflection through the inside of the light guide plate and emitting the light from the light guide plate, and the second deflecting unit forms a virtual image forming region of the optical device.

[A13] The display device according to any one of [A01] to [A12], further including an environmental illuminance measuring sensor for measuring the illuminance of an environment where the display device is placed, in which the display device controls the light shielding ratio of the dimming device on the basis of a measurement result of the environmental illuminance measuring sensor.

[A14] The display device according to any one of [A01] to [A13], further including an environmental illuminance measuring sensor for measuring the illuminance of an environment where the display device is placed, in which the display device controls the brightness of an image formed by the image forming device on the basis of a measurement result of the environmental illuminance measuring sensor.

[A15] The display device according to any one of [A01] to [A14], further including a transmitted light illuminance measuring sensor for measuring illuminance based on light which has passed through the dimming device from an external environment, in which the display device controls the light shielding ratio of the dimming device on the basis of a measurement result of the transmitted light illuminance measuring sensor.

[A16] The display device according to any one of [A01] to [A15], further including a transmitted light illuminance measuring sensor for measuring illuminance based on light which has passed through the dimming device from an external environment, in which the display device controls the brightness of an image formed by the image forming device on the basis of a measurement result of the transmitted light illuminance measuring sensor.

[A17] The display device according to [A15] or [A16], in which the transmitted light illuminance measuring sensor is disposed closer to an observer than the optical device.

[A18] The display device according to any one of [A01] to [A17], in which light passing through the dimming device is colored in a desired color by the dimming device.

[A19] The display device according to [A18], in which a color in which light is colored by the dimming device is variable.

[A20] The display device according to [A18], in which a color in which light is colored by the dimming device is fixed.

[B01] <<Display Device>>

A display device including:

(A) a frame to be mounted on a head of an observer; and (B) an image display device attached to the frame, in which the image display device includes:

(a) an image forming device;

(b) an optical device having a virtual image forming region where a virtual image is formed on the basis of light emitted from the image forming device; and (c) a dimming device for adjusting the amount of external light incident from the outside, disposed so as to face the virtual image forming region and to be away from the optical device, and the dimming device includes:

(c-1) a transparent protective substrate on which external light is incident;

(c-2) a dimming layer formed on a surface of the protective substrate facing the optical device; and (c-3) a moisture-retaining layer formed on the dimming layer.

[B02] <<Display Device>>

A display device including:

(A) a frame to be mounted on a head of an observer; and (B) an image display device attached to the frame, in which the image display device is constituted by the image display device according to any one of [A01] to [A20].

[B03] The display device according to [B01] or [B02], in which at least an edge portion of the protective substrate is fixed to the frame.

[B04] The display device according to [B03], in which the edge portion of the protective substrate is fixed to the frame via an adhesive capable of transmitting water vapor.

[B05] The display device according to [B03], in which a space between the dimming device and the optical device communicates with the outside.

[C01] <<Dimming Device>>

A dimming device including:

a transparent protective substrate on which external light is incident;

a dimming layer formed on the protective substrate;

a moisture-retaining layer formed on the dimming layer; and a water vapor transmissive transparent substrate disposed on or above the moisture-retaining layer.

[C02] The dimming device according to [C01], in which an outer edge of the protective substrate and an outer edge of the water vapor transmissive transparent substrate are sealed to each other with a sealing member.

[C03] The dimming device according to [C01] or [C02], in which the water vapor transmissive transparent substrate is disposed above the moisture-retaining layer.

[C04] The dimming device according to any one of [C01] to [C03], in which a material constituting the protective substrate has a moisture transmittance of $10^{-2}$ g/m$^2$·day or less.

[C05] The dimming device according to any one of [C01] to [C04], in which the moisture transmittance of a material constituting the water vapor transmissive transparent substrate is 10 times or more the moisture transmittance of a material constituting the protective substrate.

[C06] The dimming device according to any one of [C01] to [C05], in which the water vapor transmissive transparent substrate contains a polycarbonate resin, a polyethylene terephthalate resin, a cycloolefin-based resin, an acrylate-based resin, a urethane-based resin, or a styrene-based resin.

[C07] The dimming device according to any one of [C01] to [C06], in which the moisture-retaining layer contains at least one material selected from the group consisting of an epoxy-based resin, polyvinyl alcohol, and polyvinyl butyral.

[C08] The dimming device according to any one of [C01] to [C07], in which a water vapor barrier layer is disposed between the protective substrate and the dimming layer.

[C09] The dimming device according to [C08], in which the water vapor barrier layer contains at least one material selected from the group consisting of aluminum oxide, silicon oxide, silicon nitride, niobium oxide, vinylidene chloride, polyacrylate, and an aluminum foil.

[C10] The dimming device according to any one of [C01] to [C09], in which the dimming layer includes an electrochromic material layer.

[C11] The dimming device according to [C10], in which the dimming layer has a laminated structure of a first electrode, an electrochromic material layer, and a second electrode, and the electrochromic material layer has a laminated structure of an oxidation coloring layer, an electrolyte layer, and a reduction coloring layer.

[C12] The dimming device according to any one of [C01] to [C11], in which the protective substrate contains a polyethylene terephthalate resin, a polycarbonate resin, or glass.

[C13] The display device according to any one of [C01] to [C12], in which light passing through the dimming device is colored in a desired color by the dimming device.

[C14] The display device according to [C13], in which a color in which light is colored by the dimming device is variable.

[C15] The display device according to [C13], in which a color in which light is colored by the dimming device is fixed.

REFERENCE SIGNS LIST

10 Frame
10' Nose pad
11 Front portion
11' Rim portion
12 Hinge
13 Temple portion
14 Modern portion
15 Wiring (signal line, power supply line, or the like)
16 Headphone portion
16' Headphone portion wiring
17 Camera
18 Control device (control circuit control unit)
19 Attachment member
20 Observer
21 Pupil
100, 200, 300, 400, 500 Image display device
110, 210 Image forming device
111 Organic EL display device
211, 211A, 211B Light source
212 Scanning unit
113A, 113B, 213 Lens system
114 Diaphragm
115, 215 Casing
120, 320, 520 Optical device
121, 321 Light guide plate
122, 322 First surface of light guide plate
123, 323 Second surface of light guide plate
324, 325 Part of light guide plate
130 First deflecting unit (first diffraction grating member)
140 Second deflecting unit (second diffraction grating member virtual image forming region)
330 First deflecting unit
340 Second deflecting unit (virtual image forming region)
151 Optical member (hologram lens)
530A, 530B Semi-transmissive mirror
601 Light source
602 Light guide member 603, 605 Polarization beam splitter
604 Liquid crystal display device
606 Quarter wave plate
607 Reflecting plate
611 Image forming device
612 Light guide member
613 Semi-transmissive mirror
614 Reflecting plate
621 Image forming device
622 Prism
623, 624 Prism surface
625 Convex lens
700, 700A Dimming device
710 Dimming layer
711 First electrode
712 Second electrode
713 Electrochromic material layer
714 Reduction coloring layer ($WO_3$ layer)
715 Electrolyte layer ($Ta_2O_5$ layer)
716 Oxidation coloring layer ($Ir_xSn_{1-x}O$ layer)
720 Protective substrate (support substrate)
721 Water vapor barrier layer
722 Hard coat layer
730 Moisture-retaining layer
740 Water vapor transmissive transparent substrate
751 Environmental illuminance measuring sensor
752 Transmitted light illuminance measuring sensor
761, 762 Light shielding member
801, 802 Adhesive
803, 805 Through hole
804, 806 Sealing member

What is claimed is:

1. An image display device, comprising:
   an image forming device;
   an optical device having a virtual image forming region where a virtual image is formed on the basis of light emitted from the image forming device; and
   a dimming device for adjusting an amount of external light incident from an outside, disposed so as to face the virtual image forming region and to be away from the optical device, wherein
   the dimming device includes:
   a transparent protective substrate on which external light is incident;
   a dimming layer formed on a surface of the transparent protective substrate facing the optical device; and
   a moisture-retaining layer formed on the dimming layer, wherein a space between the dimming device and the optical device communicates with the outside.

2. The image display device according to claim 1, wherein a material constituting the transparent protective substrate has a moisture transmittance of 10−2 g/m2·day or less.

3. The image display device according to claim 1, wherein the dimming device further includes
   a water vapor transmissive transparent substrate disposed on the moisture-retaining layer.

4. The image display device according to claim 3, wherein a moisture transmittance of a material constituting the water vapor transmissive transparent substrate is 10 times or more a moisture transmittance of a material constituting the transparent protective substrate.

5. The image display device according to claim 3, wherein the water vapor transmissive transparent substrate contains a polycarbonate resin, a polyethylene terephthalate resin, a cycloolefin-based resin, an acrylate-based resin, a urethane-based resin, or a styrene-based resin.

6. The image display device according to claim 1, wherein the moisture-retaining layer contains at least one material selected from the group consisting of an epoxy-based resin, polyvinyl alcohol, and polyvinyl butyral.

7. The image display device according to claim 1, wherein a water vapor barrier layer is disposed between the transparent protective substrate and the dimming layer.

8. The image display device according to claim 7, wherein the water vapor barrier layer contains at least one material selected from the group consisting of aluminum oxide, silicon oxide, silicon nitride, niobium oxide, vinylidene chloride, polyacrylate, and an aluminum foil.

9. The image display device according to claim 1, wherein the dimming layer includes an electrochromic material layer.

10. The image display device according to claim 9, wherein
    the dimming layer has a laminated structure of a first electrode, an electrochromic material layer, and a second electrode, and
    the electrochromic material layer has a laminated structure of an oxidation coloring layer, an electrolyte layer, and a reduction coloring layer.

11. The image display device according to claim 1, wherein the transparent protective substrate contains a polyethylene terephthalate resin, a polycarbonate resin, or glass.

12. The image display device according to claim 1, wherein the optical device includes:
    a light guide plate in which light incident from the image forming device is propagated by total reflection through an inside, and then the light is emitted toward an observer;
    a first deflecting unit for deflecting light incident on the light guide plate such that the light incident on the light guide plate is totally reflected inside the light guide plate; and
    a second deflecting unit for deflecting light propagated by total reflection through the inside of the light guide plate and emitting the light from the light guide plate, and
    the second deflecting unit forms a virtual image forming region of the optical device.

13. A display device, comprising:
    a frame to be mounted on a head of an observer; and
    an image display device attached to the frame, wherein the image display device includes:
    an image forming device;
    an optical device having a virtual image forming region where a virtual image is formed on the basis of light emitted from the image forming device; and
    a dimming device for adjusting an amount of external light incident from an outside, disposed so as to face the virtual image forming region and to be away from the optical device, and
    the dimming device includes:
    a transparent protective substrate on which external light is incident;
    a dimming layer formed on a surface of the transparent protective substrate facing the optical device; and
    a moisture-retaining layer formed on the dimming layer, wherein a space between the dimming device and the optical device communicates with the outside.

14. The display device according to claim 13, wherein at least an edge portion of the transparent protective substrate is fixed to the frame.

15. The display device according to claim 14, wherein the edge portion of the transparent protective substrate is fixed to the frame via an adhesive capable of transmitting water vapor.

16. A dimming device that adjusts an amount of external light incident from an outside, comprising:
- a transparent protective substrate on which external light is incident;
- a dimming layer formed on the transparent protective substrate;
- a moisture-retaining layer formed on the dimming layer; and
- a water vapor transmissive transparent substrate disposed on or above the moisture-retaining layer,
- wherein the dimming device is disposed so as to face a virtual image forming region of an optical device and to be away from the optical device, and
- wherein a space between the dimming device and the optical device communicates with the outside.

17. The dimming device according to claim 16, wherein an outer edge of the transparent protective substrate and an outer edge of the water vapor transmissive transparent substrate are sealed to each other with a sealing member.

18. The dimming device according to claim 16, wherein the water vapor transmissive transparent substrate is disposed above the moisture-retaining layer.

19. The dimming device according to claim 16, wherein a material constituting the transparent protective substrate has a moisture transmittance of 10–2 g/m2·day or less.

20. The dimming device according to claim 16, wherein the transparent protective substrate contains a polyethylene terephthalate resin, a polycarbonate resin, or glass.

\* \* \* \* \*